United States Patent
Terry et al.

(10) Patent No.: US 7,602,895 B2
(45) Date of Patent: *Oct. 13, 2009

(54) DYNAMIC CALL RESPONSE SYSTEM

(75) Inventors: George Alexis Terry, San Francisco, CA (US); Bradford Lawrence Spencer, Halifax (CA); David Webster Trueman, Halifax (CA)

(73) Assignee: AOL LLC, Dulles, VA (US)

( * ) Notice: Subject to any disclaimer, the term of this patent is extended or adjusted under 35 U.S.C. 154(b) by 1089 days.

This patent is subject to a terminal disclaimer.

(21) Appl. No.: 10/952,382

(22) Filed: Sep. 29, 2004

(65) Prior Publication Data

US 2005/0123118 A1    Jun. 9, 2005

Related U.S. Application Data

(63) Continuation-in-part of application No. 10/939,996, filed on Sep. 14, 2004, which is a continuation-in-part of application No. 10/674,821, filed on Oct. 1, 2003, now Pat. No. 7,003,087.

(51) Int. Cl.
H04M 3/42 (2006.01)

(52) U.S. Cl. .................. 379/215.01; 379/211.01; 379/211.02; 379/212.01; 379/265.09; 370/352; 370/354

(58) Field of Classification Search ........... 379/92.23, 379/211.01, 212.01, 215.01, 265.09; 370/352, 370/354

See application file for complete search history.

(56) References Cited

U.S. PATENT DOCUMENTS

| | | | |
|---|---|---|---|
| 5,243,645 | A | 9/1993 | Bissell et al. |
| 5,329,578 | A | 7/1994 | Brennan et al. |
| 5,375,161 | A | 12/1994 | Fuller et al. |
| 5,408,526 | A | 4/1995 | McFarland et al. |
| 5,422,942 | A | 6/1995 | Kakwashima |

(Continued)

FOREIGN PATENT DOCUMENTS

EP    0 959 593    11/1999

(Continued)

OTHER PUBLICATIONS

Office Action, Application Serial No. 10/747,256, dated Mar. 25, 2005.

(Continued)

*Primary Examiner*—Ahmad F Matar
*Assistant Examiner*—Khai N Nguyen
(74) *Attorney, Agent, or Firm*—Fish & Richardson P.C.

(57) ABSTRACT

Responding to a telephone call made by a calling party includes receiving a first telephone call and identifying an account associated with the telephone number to which the first calling party directed the first telephone call. Configuration data related to the account is accessed. A first identity associated with the account is identified based on the configuration data accessed. A first electronic communication is sent to a computer of a first called party associated with the first identity. The first called party may respond to the first electronic communication by dynamically and manually inputting a call redirection telephone number, sending an e-mail, or sending an instant message. If a call redirection telephone number is inputted, the first telephone call may be redirected to the call redirection telephone number.

67 Claims, 23 Drawing Sheets

U.S. PATENT DOCUMENTS

| | | | |
|---|---|---|---|
| 5,537,467 A | 7/1996 | Cheng et al. | |
| 5,548,504 A | 8/1996 | Takehara | |
| 5,548,636 A | 8/1996 | Bannister et al. | |
| 5,557,659 A | 9/1996 | Hyde-Thomson | |
| 5,625,676 A | 4/1997 | Greco et al. | |
| 5,631,904 A | 5/1997 | Fitser et al. | |
| 5,651,054 A | 7/1997 | Dunn et al. | |
| 5,668,862 A | 9/1997 | Bannister et al. | |
| 5,703,943 A | 12/1997 | Otto | |
| 5,805,587 A | 9/1998 | Norris et al. | |
| 5,809,128 A | 9/1998 | McMullin | |
| 5,812,653 A | 9/1998 | Jodoin et al. | |
| 5,841,966 A | 11/1998 | Irribarren | |
| 5,848,134 A | 12/1998 | Sekiguchi et al. | |
| 5,894,504 A | 4/1999 | Alfred et al. | |
| 5,937,051 A | 8/1999 | Hurd et al. | |
| 6,038,293 A | 3/2000 | McNerney et al. | |
| 6,144,644 A | 11/2000 | Bajzath et al. | |
| 6,215,857 B1 | 4/2001 | Kasiviswanathan | |
| 6,282,275 B1 | 8/2001 | Gurbani et al. | |
| 6,295,341 B1 | 9/2001 | Muller | |
| 6,301,609 B1 | 10/2001 | Aravamudan et al. | |
| 6,311,231 B1 | 10/2001 | Bateman et al. | |
| 6,353,660 B1 | 3/2002 | Burger et al. | |
| 6,356,633 B1 | 3/2002 | Armstrong | |
| 6,363,258 B1 | 3/2002 | Schmidt et al. | |
| 6,366,661 B1 | 4/2002 | Devillier et al. | |
| 6,373,836 B1 | 4/2002 | Deryugin et al. | |
| 6,377,668 B1 | 4/2002 | Smock et al. | |
| 6,389,007 B1 | 5/2002 | Shenkman et al. | |
| 6,396,908 B1 | 5/2002 | O'Donovan et al. | |
| 6,404,747 B1 | 6/2002 | Berry et al. | |
| 6,421,425 B1 | 7/2002 | Bossi et al. | |
| 6,453,164 B1 | 9/2002 | Fuller et al. | |
| 6,463,038 B1 | 10/2002 | Wilson | |
| 6,463,145 B1 | 10/2002 | O'Neal et al. | |
| 6,477,246 B1 | 11/2002 | Dolan et al. | |
| 6,496,501 B1 * | 12/2002 | Rochkind et al. | 370/354 |
| 6,498,841 B2 | 12/2002 | Bull et al. | |
| 6,518,994 B1 | 2/2003 | Johnson et al. | |
| 6,529,587 B1 | 3/2003 | Cannon et al. | |
| 6,532,286 B1 | 3/2003 | Burg | |
| 6,567,854 B1 | 5/2003 | Olshansky et al. | |
| 6,574,599 B1 | 6/2003 | Lim et al. | |
| 6,577,622 B1 | 6/2003 | Schuster et al. | |
| 6,587,555 B1 | 7/2003 | Cripe et al. | |
| 6,631,399 B1 | 10/2003 | Stanczak et al. | |
| 6,671,365 B2 | 12/2003 | Kemppainen | |
| 6,724,867 B1 | 4/2004 | Henderson | |
| 6,738,461 B2 | 5/2004 | Trandal et al. | |
| 6,757,274 B1 | 6/2004 | Bedingfield et al. | |
| 6,775,378 B1 | 8/2004 | Villena et al. | |
| 6,876,632 B1 * | 4/2005 | Takeda | 370/259 |
| 6,999,577 B2 | 2/2006 | Wang et al. | |
| 7,076,041 B2 | 7/2006 | Brown et al. | |
| 2002/0075304 A1 | 6/2002 | Thompson et al. | |
| 2003/0086432 A1 | 5/2003 | Bartfeld et al. | |
| 2003/0112931 A1 * | 6/2003 | Brown et al. | 379/93.23 |
| 2003/0112952 A1 | 6/2003 | Brown et al. | |
| 2003/0133558 A1 | 7/2003 | Kung et al. | |
| 2003/0215078 A1 | 11/2003 | Brahm et al. | |
| 2003/0236820 A1 | 12/2003 | Tierney et al. | |
| 2004/0091089 A1 | 5/2004 | Wynn | |
| 2004/0141594 A1 * | 7/2004 | Brunson et al. | 379/88.12 |
| 2004/0141596 A1 | 7/2004 | Crockett et al. | |
| 2004/0170266 A1 | 9/2004 | Adams et al. | |
| 2005/0074107 A1 | 4/2005 | Renner et al. | |
| 2006/0080432 A1 | 4/2006 | Spataro et al. | |
| 2006/0088152 A1 | 4/2006 | Green et al. | |

FOREIGN PATENT DOCUMENTS

| | | |
|---|---|---|
| EP | 1 120 954 | 8/2001 |
| EP | 1 148 756 | 10/2001 |
| EP | 1 298 900 | 4/2003 |
| EP | 1 309 164 | 5/2003 |
| JP | 08-314826 | 11/1996 |
| WO | 99/23807 | 5/1999 |
| WO | WO 00/60809 | 10/2000 |
| WO | WO 01/76210 | 10/2001 |
| WO | 02/25907 | 3/2002 |
| WO | 02/078368 | 10/2002 |

OTHER PUBLICATIONS

International Search Report and the Written Opinion of the International Searching Authority, International Application No. PCT/US04/32562, dated Apr. 12, 2005, 9 pages.

International Search Report, Application No. PCT/USO4/23383, dated Mar. 28, 2005.

Anonymous: "Does the Internet Have Call Waiting?", Internet Document, [Online] Copyright 2002, Tech TV, Inc., pp. 1-2, Retrieved from the Internet: www.techtv.com/screensavers/print/0,23102,2256423,00.html, [retrieved on Oct. 2, 2002].

Anonymous: "Did Someone Just Call You?", Internet Document, [Online] Copyright 2002, CallWave, Inc., p. 1, Retrieved from the Internet: www.callwave.com, [retrieved on Oct. 2, 2002].

Anonymous: "Internet Answering Machine™ Software", Internet Document, [Online] Copyright 2002, CallWave, Inc. pp. 1-2, [Retrieved from the Internet: www.callwave.com/findoutmore.asp?ct=hpl_fom, Oct. 2, 2002].

Rick James: "Finally! Interactive 'Call Waiting' While You're Surfing?", Internet Document, [Online], pp. 1-4, Retrieved from the Internet: www.monitor.ca/monitor/issues/vol4iss12/feature7.html, [retrieved on Sep. 2, 2004].

International Search Report issued in PCT/US2004/018785 dated Oct. 27, 2004.

Written Opinion of the International Searching Authority in PCT/US2004/018785.

Rick James: "Finally! Interactive 'Call Waiting' While You're Surfing?", Internet Document, [Online], pp. 1-4, Retrieved from the Internet: www.monitor.ca/monitor/issues/vol4iss12/feature7.html, [retrieved on Sep. 2, 2004].

Office Action, U.S. Appl. No. 10/747,256, dated Mar. 25, 2005.

International Search Report, Application No. PCT/US04/23383, dated Mar. 28, 2005.

Anonymous: "Does the Internet Have Call Waiting?", Internet Document, [Online] Copyright 2002, Tech TV, Inc., pp. 1-2, Retrieved from the Internet: www.techtv.com/screensavers/print/0,23102,2256423,00.html, [retrieved on Oct. 2, 2002].

Anonymous: "Did Someone Just Call You?", Internet Document, [Online] Copyright 2002, CallWave, Inc., p. 1, Retrieved from the Internet: www.callwave.com, [retrieved on Oct. 2, 2002].

Anonymous: "Internet Answering Machine™ Software", Internet Document, [Online] Copyright 2002, CallWave, Inc. pp. 1-2, [Retrieved from the Internet: www.callwave.com/findoutmore.asp?ct=hpl_fom, Oct. 2, 2002].

International Search Report and the Written Opinion of the International Searching Authority, International Application No. PCT/US04/32562, dated Apr. 12, 2005, 9 pages.

* cited by examiner

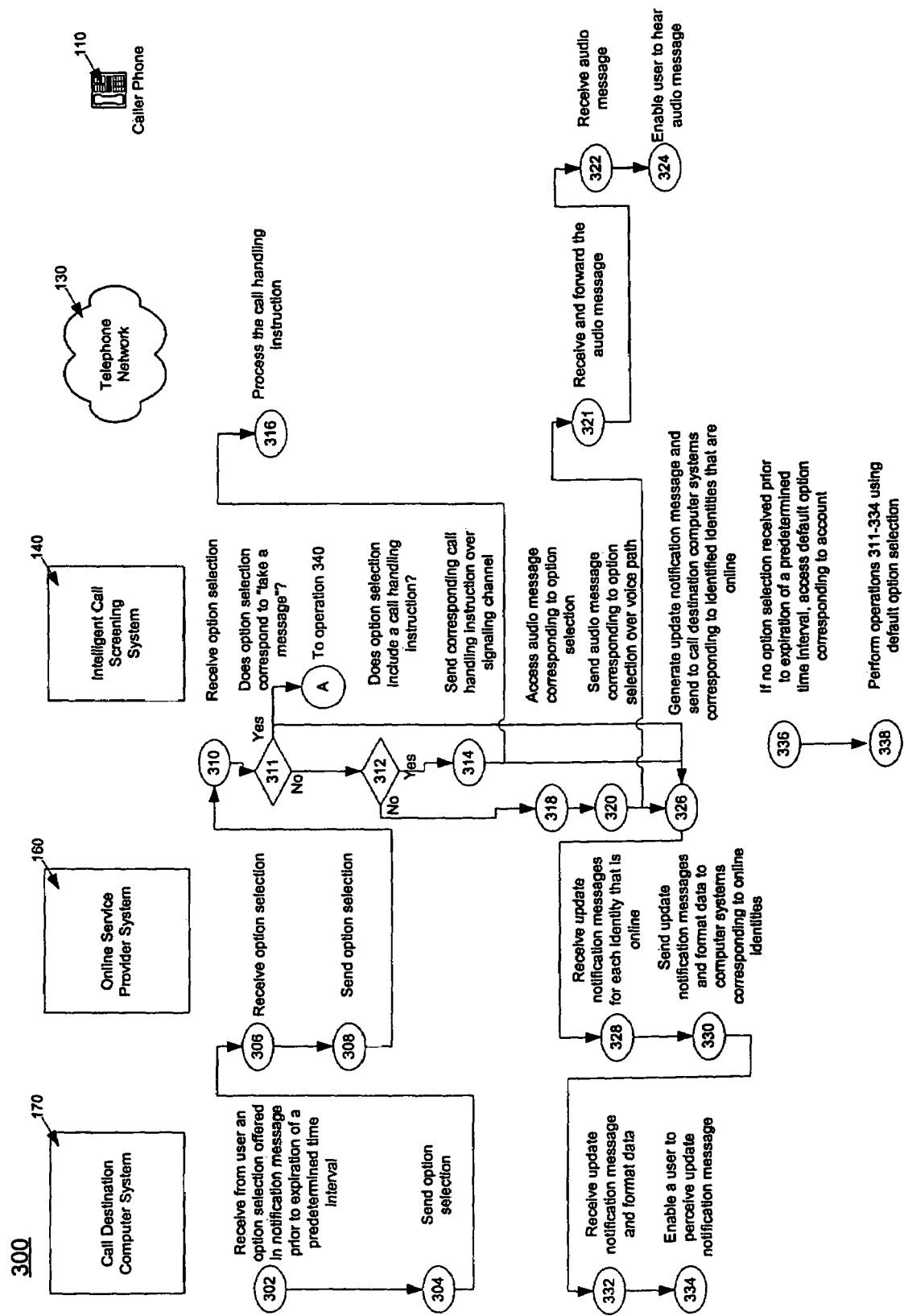

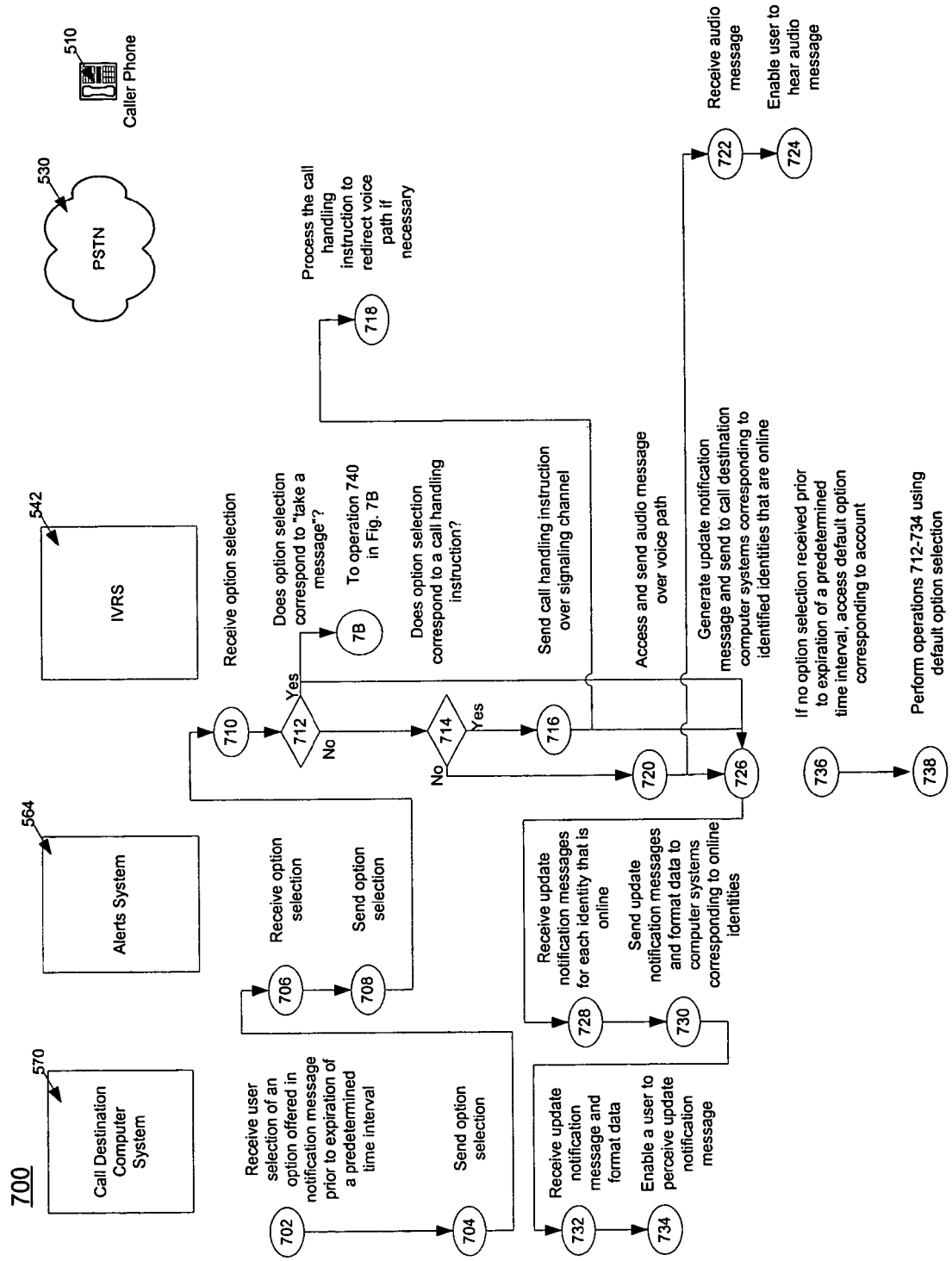

DYNAMIC CALL RESPONSE SYSTEM

CROSS REFERENCE TO RELATED APPLICATION

This application is a continuation-in-part of U.S. patent application Ser. No. 10/939,996, filed Sep. 14, 2004, which is incorporated by reference, and entitled MULTI-USER INTELLIGENT CALL SCREENING, and which is a continuation-in-part of U.S. patent application Ser. No. 10/674,821, filed Oct. 1, 2003, now U.S. Pat No. 7,003,087 which is incorporated by reference, and entitled INTELLIGENT CALL SCREENING OF TRADITIONAL TELEPHONY CALLS. This application also incorporates by reference U.S. patent application Ser. No. 10/414,167, filed Apr. 15, 2003, and entitled COMMUNICATION DEVICE MONITORING; U.S. patent application Ser. No. 10/320,712, filed Dec. 17, 2002, and entitled CASCADED DELIVERY OF AN ELECTRONIC COMMUNICATION; and U.S. patent application Ser. No. 10/895,389, filed Jul. 21, 2004, and entitled CONFERENCE CALLS VIA AN INTELLIGENT CALL WAITING INTERFACE.

TECHNICAL FIELD

This application relates to a network-based call screening service that enables a user to electronically respond to a telephone call upon being notified of the call or while concurrently listening to a voice mail being deposited by a caller, for example, using e-mail or instant messaging communication platforms.

BACKGROUND

Call screening is a telephony service that offers call recipients the ability to listen to a voice message as the voice message is being deposited by a caller. In traditional telephony paradigms, a telephone answering device (TAD) is located at a call recipient's location to enable a call recipient to screen incoming calls. The TAD can record a voice message left by a caller and concurrently play the voice message out loud. If the call recipient is present while the voice message is being recorded, the call recipient may listen to the voice message and identify the calling party without indicating to the calling party that the call recipient is present. In this manner, the call recipient may "screen" the call by taking the call or not taking the call based on recognition of the voice of the caller or based on the contents of the deposited voice message.

SUMMARY

In one general aspect, responding to a telephone call made by a calling party includes receiving a first telephone call and identifying an account associated with the telephone number to which the first calling party directed the first telephone call. Configuration data related to the account is accessed. A first identity associated with the account is identified based on the configuration data accessed. A first electronic communication is sent to a computer of a first called party associated with the first identity. The first called party responds to the first electronic communication by dynamically and manually inputting a call redirection telephone number. The first telephone call is redirected to the call redirection telephone number.

Implementations may include one or more of the following features. For example, the call redirection telephone number may not be stored by the computer prior to receiving the first telephone call. The call redirection telephone number may be typed in by the first called party through a user interface of the computer. The call redirection telephone number may not be the telephone number to which the first calling party directed the incoming first telephone call.

The availability of the first identity to receive the first electronic communication may be determined and sending the first electronic communication to the computer of the first identity may be conditioned on whether the first identity is determined to be available to receive the first electronic communication. Identifying the first identity associated with the account may include identifying several identities associated with the account based on the configuration data accessed and determining the first identity from among the several identities based on the configuration data accessed.

Identifying an account may include identifying an account based on call related information received from a telephone network. The call related information may include a call destination telephone number and may be extracted from an integrated services digital network call setup.

The first identity may be a user identifier through which an online status of the first called party may be determined. The first identity may be a screen name registered for use in conjunction with an instant messaging application.

Enabling the first called party to respond to the first electronic communication may include enabling the first called party to perceive a display corresponding to the first electronic communication. The display may include calendar or address book information associated with the first calling party. The display also may include an e-mail address of the first calling party or a first calling party screen name registered for use in conjunction with an instant messaging application. The display may include a graphical representation of the first calling party.

Responding to a telephone call made by a calling party may further include receiving call origin information from a telephone network. The call origin information may include a first calling party telephone number and may be received through an automatic number identification service. The display may include at least a portion of the call origin information.

The display may include an option selectable by the first called party to dynamically and manually input the calling redirection telephone number. The display may include a set of options including an option selectable by the first called party to dynamically and manually input the call redirection telephone number. The set of options may be tailored to the first identity such that the options differ for at least two of several identities associated with the account. The set of options may include: sending an outbound audio message to be perceived by the first calling party, sending the first telephone call to a predetermined call destination which may be telephone number to which the first calling party directed the incoming first telephone call, responding to the first telephone call by sending an instant message to the first calling party, and responding to the first telephone call by sending an e-mail to the first calling party.

Responding to the first electronic communication may include handling the first telephone call in accordance with the received option selection. Handling the first telephone call may include sending an outbound audio message to be perceived by the first calling party prior to redirecting the first telephone call to the call redirection telephone number. The first called party may respond to the first electronic communication while concurrently enabling the first called party to listen to a voice mail being deposited by the first calling party.

The call redirection telephone number may be stored by the computer after receiving the first telephone call. A second telephone call may be received, and the account may be identified as being associated with a telephone number to which a second calling party directed the second telephone call. Configuration data related to the account may be accessed. The first identity may be identified based on the configuration data accessed, and a second electronic communication may be sent to the computer of the first called party. The first called party may respond to the second electronic communication by selecting the stored call redirection telephone number. The second telephone call may be redirected to the stored call redirection telephone number.

In another general aspect, responding to a telephone call made by a calling party includes receiving a telephone call made by a calling party and identifying an account associated with a telephone number to which the calling party directed the incoming telephone call. Configuration data related to the account is accessed. A first call destination identity associated with the account is identified based on the configuration data accessed. A calling party identity associated with the calling party is identified. The availability of the first call destination identity to receive a first electronic communication associated with the call is determined. The first electronic communication associated with the call is sent to a computer of a first called party associated with the first call destination identity conditioned on whether the first call destination identity is determined to be available to receive the first electronic communication. The availability of the calling party to receive an instant message from the first called party is determined. The first called party responds to the first electronic communication by sending an instant message to the calling party conditioned on whether the calling party identity is determined to be available to receive the instant message.

Implementations may include one or more of the following features. For example, identifying a calling party identity associated with the calling party may include enabling the calling party or the first called party to specify the calling party identity.

The first called party may respond to the first electronic communication by establishing an instant messaging session between the calling party identity and the first call destination identity and sending an instant message from the first call destination identity to the calling party identity. Establishing an instant messaging session may include establishing a direct connection between a computer of the calling party and the computer of the first called party. The call may be disconnected subsequent to establishing the instant messaging session. An audio message may be sent to the calling party prior to disconnecting the telephone call.

In another general aspect, responding to a telephone call made by a calling party includes receiving a telephone call made by a calling party and identifying an account associated with a telephone number to which the calling party directed the incoming telephone call. Configuration data related to the account is accessed. A first identity associated with the account is identified based on the configuration data accessed. A calling party e-mail address associated with the calling party is identified. A first electronic communication associated with the call is sent to a computer of a first called party associated with the first identity. The first called party responds to the first electronic communication by sending an e-mail to the calling party e-mail address.

DESCRIPTION OF DRAWINGS

FIGS. 3A and 3B are flow charts illustrating a process for responding to a user selection of an option in a call notification message.

FIGS. 7A and 7B are flow charts illustrating a process for responding to a user selection of an option in a call notification message.

DETAILED DESCRIPTION

Figure 1:
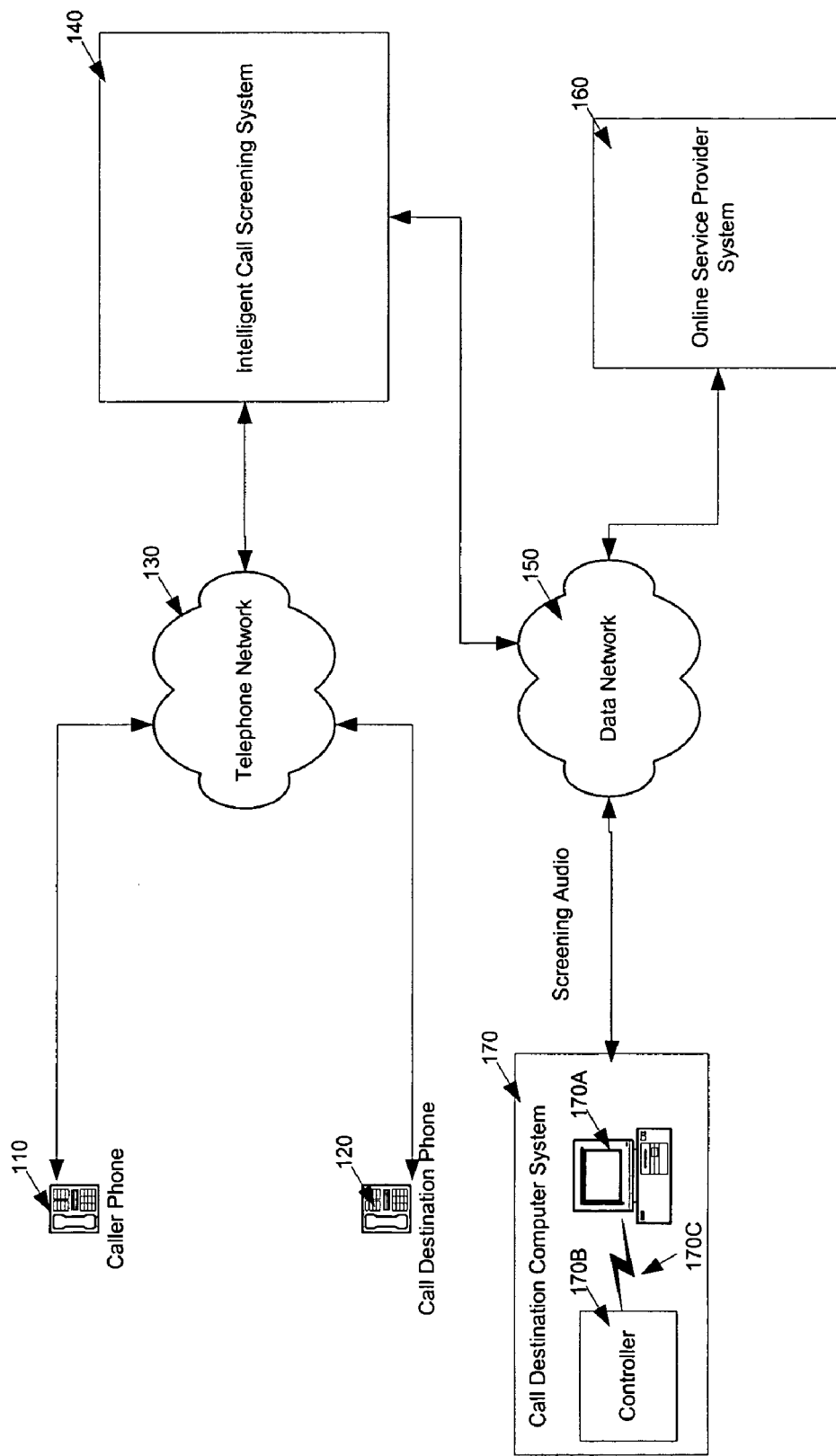
FIG. 1 is a block diagram of a communications system for providing multi-user intelligent call screening.

A communications system enables multiple users associated with a called number to manage an incoming call while listening to a voice mail being deposited by the caller (i.e., the communications system enables multi-user intelligent call screening). The communications system includes a caller telephone used to call a call destination telephone over a telephone network. The telephone network is configured to redirect the call to an intelligent call screening system (ICSS) (or messaging service platform) if the direct number of the call destination telephone is busy, is not answered after a predetermined number of rings, or is otherwise unavailable. For example, the call may be redirected to the ICSS using the telephone network feature SIMRING or using an Advanced Intelligent Network (AIN) trigger. The telephone network may be a traditional circuit-switched telephone network such as, for example, the public-switched telephone network (PSTN). In another implementation, the telephone network may be a Voice over Internet Protocol (VoIP) network and the call may be redirected to the ICSS using a Session Initiation Protocol (SIP) INVITE message.

The ICSS receives the call and identifies one or more identities associated with the direct number of the call destination telephone ("call destination identities") and, in some implementations, an identity associated with the calling party ("calling party identity"). The identities are user identifiers, such as, for example, screen names or instant messaging handles, through which a user's online status may be determined (i.e., online identities).

The ICSS accesses call handling preferences corresponding to the call destination identity or identities and identifies which of the call destination identities may receive a call notification message, e.g., based on the call handling preferences. The ICSS then determines which of the identified call destination identities are online (or otherwise available to receive a call notification message across a data network) by sending a request for presence information to an online service provider system. In some implementations, the ICSS also sends a request for presence information to the online service provider system to determine whether the calling party identity is online. Upon receiving the presence information from the online service provider system, the ICSS generates a call notification message for each identified call destination identity that is online. The ICSS sends the call notification messages to the online service provider system which, in turn, sends the call notification messages across a data network to the call destination computer systems corresponding to the identified call destination identities that are online. The call destination computer systems receive the call notification messages and respond by enabling user perception of the call notification messages.

A call notification message typically includes the identity of the calling party (determined based on, for example, Automatic Number Identification (ANI) information), additional calling party information, and a set of options that may be selected by the user to indicate how the call should be handled. Several options that may be selected include playing a specific audio message, ignoring the call, taking a message (i.e., recording a voice mail message), forwarding the call to a predetermined telephone number (e.g., a cell phone number), forwarding the call to a dynamically inputted telephone number (i.e., a telephone number that is not previously stored or otherwise predetermined by the call recipient), responding to the call by sending an e-mail to the calling party, or responding to the call by sending an instant message (IM) to the calling party. The option to respond to the call by sending an instant message to the calling party may be enabled or presented only when the calling party identity is determined to be online. The call notification message may be presented to a user as a dialog box in a visual display of the call destination computer system. The user may, for example, use a mouse or other input device to click or otherwise select an option presented in the dialog box.

When an option is selected by the user, the option selection is sent to the ICSS in real time through the online service provider system. Since multiple users may receive call notification messages corresponding to the same call and may select conflicting options, the ICSS employs a conflict resolution algorithm to choose one option selection from among the multiple received option selections. If the option selection chosen by the conflict resolution algorithm does not correspond to taking a message (e.g., the option selection corresponds to ignoring the call, taking the call, or redirecting the call to another number), the ICSS processes the call by sending call handling instructions to the telephone network and/or accessing and sending an audio message to the caller telephone. By contrast, if the option selection chosen corresponds to taking a message, the ICSS records the message as audio data as the message is received from the caller telephone over the telephone network. The ICSS streams the audio data over the data network to some or all of the call destination computer systems corresponding to the call destination identities determined to be online. The ICSS also generates and sends call screening messages in accordance with the call handling preferences explicitly expressed by or corresponding to the call destination identities determined to be online. The call screening messages are similar to the call notification messages, with the exception that the users of the call destination computer systems receiving a call screening message are able to select call handling options while concurrently listening to the message being deposited. Additionally, the ICSS typically employs a "first come, first serve" conflict resolution algorithm if conflicting option selections are received in response to the call screening messages. In other words, the first received option selection may or may not be deemed to control the disposition of the call depending upon conflict resolution protocols.

In one implementation example, a family friend calls a number associated with the Jenner family. Sam Jenner is sitting on a park bench and is online using, for example, a laptop computer that is wirelessly connected to the Internet. Tom Jenner, Sam's son, is online at school using a desktop computer that is connected to the Internet using the school's Local Area Network. Each of Sam and Tom receive a call notification message providing notification that the family friend is calling the Jenner family's home telephone number. Sam selects the option to take a message and Tom selects the option to ignore the call. In this implementation, the conflict resolution protocol requires the ICSS to wait a predetermined amount of time to receive option selections from notified users (e.g., 10 seconds). The ICSS receives both option selections and the conflict resolution algorithm chooses to process the option selection corresponding to taking a message. Accordingly, the family friend is prompted by the ICSS to leave a voice message. Both Sam and Tom are able to hear the voice message left by the family friend as the voice message is being recorded by the ICSS (i.e., Tom's preferences indicate that he wishes to hear all voice messages left by a caller regardless of the option Tom selects in response to the call notification message). The ICSS sends call screening messages to Sam and Tom concurrent with the recording of the voice message. Sam determines the message being left by the family friend in the voice message is important, and he decides that he wants to take the call. Sam finds a public telephone booth in the park and selects an option in the call screening message to forward the call to a dynamically inputted telephone number. Sam then inputs the telephone number corresponding to the telephone in the public telephone booth. Sam's option selection is sent by the laptop computer to the ICSS. The ICSS receives Sam's option selection before receiving any option selection from Tom and, accordingly, the call is forwarded to the public telephone booth. The ICSS stops recording the voice message, plays an audio message to inform the family friend that the call is being redirected, and instructs the telephone network to redirect the call. The telephone in the public telephone booth rings, and Sam picks up the telephone to converse with the family friend. Meanwhile, Tom's interface changes to reflect that Sam has taken the call and that Tom may (or may not) join the call. In another example, Sam decides that he wants to talk to the family friend immediately upon being notified of the call. Accordingly, Sam redirects the call to the public telephone booth by selecting the appropriate option in response to a call notification message notifying Sam of the call, rather than in response to a call screening message.

The call between the caller telephone and the call destination telephone that is redirected to the ICSS may be at least partially setup over a telephone network such that one or both of the caller telephone and the destination telephone may employ a conventional or traditional telephone handset.

When both premises endpoints use conventional or traditional handsets, the communications system described above is notably different from a communications system that screens computer telephony calls. Computer telephony calls are a form of telephony in which one of the premises endpoints uses a digital computing device rather than a conventional telephone handset. The digital computing device receives call data over a data network through data network routers. In computer telephony, the voice path of the call traverses, at least at one endpoint, a data network. By contrast, in traditional telephony, the voice path of the call traverses a telephone network and generally does not traverse a data network. Since data networks typically do not offer the quality of service of a traditional telephone network due to such quality problems as latency, packet loss, and jitter, real time dialog over a voice path that traverses a data network may be degraded. The communications system described above offers the advantage that the voice path of the call need not traverse a data network (although, in some implementations, the voice path may traverse a data network). Accordingly, the deposited voice message and, if the call is redirected, the subsequent real time dialog need not be distorted or degraded by quality problems or otherwise impacted by the data network.

The call screening function is not as sensitive to system latency as telephony functions related to real time dialog and therefore, may be advantageously implemented over a data network. For example, while the maximum system latency allowed for telephony functions related to real time dialog is on the order of a few hundred milliseconds, the maximum system latency allowed for a call screening function is near real time and may be on the order of a few seconds. Accordingly, sending the call screening message and the audio data over a data network does not degrade the quality of the call screening function and takes advantage of the ubiquity and highly mobile nature of connections to a data network such as, for example, the Internet.

An example of near real time transmission over a data network is implemented by instant messaging systems to send and receive instant messages. Furthermore, near real time transmission may be achieved by configuring a data transmission system to minimize, avoid or altogether prohibit queuing or further processing of received data in any way that increases transmission delay. Moreover, real time generally implies communication without undue or user-perceived delays. The following characteristics are indicative of near real time: (1) communications over a network capable of showing or monitoring user presence; (2) communication over a network that does not buffer data in a manner that substantially increases transmission delay; and/or (3) communication over a network that does not process data in a manner that substantially increases transmission delay (e.g., end-to-end transmission delay is not increased beyond several seconds).

Referring to FIG. 1, a communications system 100 for providing multi-user intelligent call screening includes a caller telephone 110, a call destination telephone 120, a telephone network 130, an ICSS 140, a data network 150, an online service provider system 160, and a call destination computer system 170.

The caller telephone 110 is configured to place a call to the call destination telephone 120 over the telephone network 130. The caller telephone 110 and the call destination telephone 120 may be landline telephones that allow communications over the telephone network 130. In another implementation, one or both of the caller telephone 110 and the call destination telephone 120 may be a cellular telephone or a mobile personal digital assistant (PDA) with embedded cellular telephone technology. In yet another implementation, the call destination telephone 120 and the call destination computer system 170 are integrated into a single computer system capable of receiving calls over the telephone network 130 and receiving data over the data network 150.

The telephone network 130 is configured to enable direct or indirect voice communications between the caller telephone 110, the call destination telephone 120, and the ICSS 140. If a user of the caller telephone 110 places a call to the call destination telephone 120 and the direct number corresponding to the call destination telephone 120 is busy or not answered after a predetermined number of rings, the telephone network 130 is configured to forward the call to the ICSS 140 (i.e., a call forward busy/no answer service is enabled on the telephone line of the call destination telephone 120). In another implementation, the PSTN SIMRING feature may cause the ICSS 140 to receive the call simultaneously with the call destination telephone 120. In yet another implementation, an Advanced Intelligent Network (AIN) trigger may cause the ICSS 140 to be signaled of the call, and ICSS 140 may request that the call be directed to ICSS 140. In yet another implementation, the telephone network 130 may be a VoIP network and a SIP INVITE message may cause the ICSS 140 to be signaled of the call. The ICSS 140 may then request that the call be directed to the ICSS 140.

When the call is forwarded to the ICSS 140, the telephone network 130 is configured to send call-related information to the ICSS 140 over a signaling channel. The call-related information includes call origin and call destination information. The call origin information may include the direct number of the caller telephone 110 and the time and date when the call was initiated, and the call destination information may include the direct number of the call destination telephone 120. The call origin information may be delivered, for example, through a service known as Automatic Number Identification (ANI), and the call destination information may be delivered, for example, through a service known as Dialed Number Identification Service (DNIS).

The telephone network 130 also is configured to receive call handling instructions from the ICSS 140. The call handling instructions provide instructions to the telephone network 130 for processing a call. The call handling instructions may include, for example, instructions that accept the call (i.e., redirect the call to the call destination telephone 120), refuse the call (i.e., disconnect the call), and forward the call to another telephone number. ICSS 140 may have to execute several instructions to effect each such call treatment.

The telephone network 130 may be of any type including, for example, the public switched telephone network (PSTN), international networks or a combination of networks. For example, the telephone network 130 may include the AT&T interexchange (IXC) network and/or central offices of local exchange carriers (LECs). The telephone network 130 is typically circuit-switched. In some implementations, however, all or a portion of the telephone network 130 may be a packet-switched data network including networks based on the Internet protocol (IP) or asynchronous transfer mode (ATM), and may support voice using, for example, Voice-over-IP, Voice-over-ATM, or other comparable protocols used for voice data communications.

The ICSS 140 is a computer system configured to receive a call from the caller telephone 110 that has been forwarded to the ICSS 140 by the telephone network 130. The ICSS 140 receives the call destination direct number from the telephone network 130, identifies identities associated with the call destination direct number (i.e., call destination identities), and processes the call in accordance with the account-level and/or identity-level call handling preferences associated with the call destination direct number. In some implementations, the ICSS 140 also may identify an identity associated with the direct number of the caller telephone 110 (i.e., calling party identity). The call destination identities may be identified, for example, by accessing an account record indexed by the call destination direct number and stored in a configuration data store. The account record includes the call destination identities and the account-level and identity-level call handling preferences. The calling party identity may be identified, for example, by accessing records indexed by the call origin direct number and stored in the configuration data store.

The account-level call handling preferences are preferences that are not associated with any particular call destination identity but rather are associated with all call destination identities associated with a particular account. For example, account-level call handling preferences may include a "black list" of identified telephone numbers and a "white list" of identified telephone numbers. If the ICSS 140 receives a call from a caller telephone 110 having a direct number on the "black list," the ICSS 140 may automatically ignore the call (i.e., the call is not answered and is allowed to continuously ring) or, alternatively, may send a message to the telephone network 130 or to the caller telephone 110, e.g., an audio message, telling the caller not to call the direct number of the call destination telephone 120 anymore or an electronic message to the telephone network 130 that inspires an audio message to the caller telephone 110 indicating unavailability of the call destination telephone 120. If the ICSS 140 receives a call corresponding to a direct number on the "white list," the ICSS 140 may automatically forward the call to another number (e.g., a specified cell phone number).

The identity-level call handling preferences are preferences that are tailored to each call destination identity. The identity level preferences include, for example, instructions prohibiting the ICSS 140 from sending a call notification and/or a call screening message to a particular identity when the direct number of the caller telephone 110 has been placed on a prohibited list for that call destination identity. Each call destination identity may have its own prohibited and/or white lists. The identity level preferences also may include a preference to never receive a call screening and/or call notification message, irrespective of the direct number of the caller telephone 110. The identity-level preferences also may include preferences to receive or not to receive a call screening message based on the identity's option selection in response to a call notification message. For example, the identity-level preferences may include a preference to not receive a call screening message if the identity did not select to "take a message" in response to a call notification message. Alternatively, the identity level preferences may include a preference to always receive a call screening message irrespective of the identity's option selection in response to the call notification message provided that at least one of the other identities in the same account is sent a call screening message. For example, the identity may have selected to ignore a call in response to a call notification message, but, nevertheless, is sent a call screening message because another associated identity selected to take a message and received a call screening message.

The identity-level preferences also may include instructions regarding how the call notification and/or call screening messages sent to a call destination identity should be formatted and what options should appear in the call notification and/or call screening messages.

The identity-level call handling preferences may further include parental controls. For example, some call destination identities may correspond to children and other call destination identities may correspond to parents. The call handling preferences of call destination identities corresponding to children may include instructions prohibiting the ICSS 140 from sending call notification and/or call screening messages to those call destination identities when they are online or, alternatively, from sending call notification and/or call screening messages to those call destination identities when they are online during certain times of the day (e.g., late at night or when the child is at school).

For example, the Smith account may include two call destination identities associated with it, "jillsmith2" corresponding to a user named Jill and "joesmith3" corresponding to a user named Joe. The Smith account has placed telephone numbers of various telemarketing businesses on a "black list" and the telephone number of Joe's parents on a "white list." Accordingly, the account-level preferences are set to ignore calls from the telemarketing businesses and forward calls from Joe's parents to Joe's cell phone number.

The identity-level preferences for "jillsmith2" are set such that if Jill receives a call notification message, the call notification message includes the following options: ignore the call, take a message, respond by e-mail, and send an audio message stating "Please call back later." The identity-level preferences for "jillsmith2" are also set such that if Jill receives a call screening message, the call screening message includes the following options: ignore the call, take the call, respond by e-mail, and redirect the call to an inputted number.

The identity-level preferences for "joesmith3" are set such that if Joe receives a call notification message, the call notification message includes the following options: ignore the call, take a message, respond by instant message (available if the calling party is determined to be online), forward the call to Joe's cell phone, and send an audio message. The identity-level preferences for "joesmith3" are also set such that Joe will never receive a call screening message, irrespective of the identity of the caller.

If Joe selects the option to send an audio message in response to the call notification message, Joe is presented with a menu from which he may select one of the following audio messages: "Please call back later," "I'll call you back," "I don't know you," and "Please call my cell phone at (202) 123-4567." Joe and Jill may have recorded the audio messages in their own voice to personalize the messages or, alternatively, may have chosen the messages from a list of prerecorded audio messages. In another implementation, Joe may have included the sending of an audio message stating "You are being transferred to my cell phone" prior to the forwarding of the call to his cell phone.

The ICSS 140 processes the call by identifying which call destination identities may receive a call notification message based on the account-level and identity-level call handling preferences. The ICSS 140 requests the online status of the identified call destination identities from the online service provider system 160 and sends call notification messages for each identified call destination identity that is online in accordance with the identity-level preferences. The ICSS 140 sends the call notification messages to the online service provider system 160, which sends along with format data the call notification messages over the data network 150 to one or more call destination computer systems 170 for presentation to users. Each user of a call destination computer system 170 selects an option presented in the call notification message, and the option selection is sent to the online service provider system 160 over the data network 150. The online service provider system 150 relays the option selection to the ICSS 140 which processes the option selection accordingly.

If no user of a call destination computer selects an option prior to expiration of a predetermined interval of time (e.g., 15 seconds) or if no user is online, the ICCS 140 may process a default option selection. The default option selection may be stored as an account-level preference and may correspond to sending an audio message, taking a message, responding by e-mail/IM, and/or forwarding the call to another number (e.g., a cell phone number).

If multiple call destination user identities submit option selections for the same call, the ICSS 140 applies a conflict resolution algorithm to determine which option selection of the several received option selections will be processed. The conflict resolution algorithm may be, for example, a "first come, first serve" algorithm that processes the call in accordance with the first option selection received. Alternatively, the conflict resolution algorithm may include collecting option selections corresponding to different identities over a predetermined interval of time and then processing the call in accordance with the option selection corresponding to the identity assigned the highest rank. The rank assignment for each identity typically is stored as an identity-level preference. As another alternative, the conflict resolution algorithm may include processing the call in accordance with a ranking of the option selections. For example, the option selections may be ranked according to how responsive the option selections are to the call, such that an option selection that forwards the call to another number would be selected over an option selection that sends a message asking the caller to call back. Alternatively, the option selections may be ranked according to how many call destination identities selected each given option (i.e., the option selected by the most call destination identities controls the call).

If the multiple received option selections do not conflict, the option selections may be processed in parallel and a conflict resolution algorithm is not needed. For example, one option selection may correspond to responding to the call by sending the caller an e-mail, another option selection may correspond to responding to the call by sending the caller an IM, and a final option selection may correspond to redirecting the call to a predetermined number. Upon receipt of the three option selections, the ICSS 140 may redirect the call while concurrently sending an e-mail or enabling an IM to be sent to the caller.

If the conflict resolution algorithm chooses an option selection that does not correspond to taking a message, sending an e-mail, or sending an IM, the ICSS 140 processes the option selection by sending a call handling instruction to the telephone network 130 and/or sending an audio message to the caller telephone 110 over the telephone network 130. The ICSS 140 is configured to record, store, access, and play or redirect audio messages. The audio messages may be personalized by subscribers to the intelligent call handling services and may be stored in a data store and indexed, for example, by direct number of the subscriber call destination telephone.

If the conflict resolution algorithm chooses an option selection that corresponds to taking a message, the ICSS 140 is configured to send a greeting message to the caller, and prompt the caller to leave a message. The ICSS 140 records the voice message as audio data as the voice message is received over the telephone network 130. The ICSS 140 sends the audio data as a data stream to the call destination computer systems 170 corresponding to the identified call destination identities that are online and that will receive call screening messages. The ICSS 140 concurrently or subsequently generates a call screening message for each identified call destination identity that is online based on the identity-level call handling preferences. The call screening message is similar to the call notification message in that it includes options regarding how to react to the call. The options include ignoring the call, taking the call, redirecting the call to a predetermined number, redirecting the call to a dynamically inputted number, and responding to the call by sending an e-mail or an IM. However, the call screening message is different than the call notification message in that the users of the call destination computer systems 170 select an option while the voice message is being deposited by the caller. The option presented in the call screening message, therefore, may be selected based on the content of the deposited voice message.

If no user of a call destination computer system 170 selects an option presented by a call screening message prior to the caller finishing leaving a voice message, the completed voice message is stored by the ICSS 140 for subsequent retrieval by the users. If one or more users of a call destination computer system 170 select an option before the caller finishes leaving a voice message, the ICSS 140 typically processes the first option selection received from the users that effects a call treatment (i.e., the first option selection that corresponds to a call handling instruction and optionally delivering an audio message to the caller, "call treatment option selection"). If the first call treatment option selection received corresponds with taking a message, the ICSS 140 ends the transmission of the audio data to the call destination computer systems 170 and completes the recording and storage of the voice message. If the selected call treatment option corresponds with refusing the call, the ICSS 140 disconnects the call and terminates the recording and storage of the voice message. In some implementations, the ICSS 140 also deletes the stored incomplete voice message. If the first received call treatment option selection corresponds with taking the call or redirecting the call to another telephone number, the ICSS 140 sends a call handling instruction to the telephone network 130 and, in some implementations, sends an outbound audio message to the caller telephone 110 over the telephone network 130 indicating that the call is being picked up or redirected. In either case, the incomplete message is typically stored by the ICSS 140 for subsequent retrieval by the user.

This implementation uses a first-come first-serve conflict resolution algorithm to determine which of the multiple call treatment option selections received in response to the call screening messages controls disposition of the call. Other conflict resolution algorithms may be used (e.g., rank-based).

If the call treatment option selection determined by the conflict resolution algorithm to control disposition of the call corresponds with terminating or refusing the call, the call is disconnected and the recording and storage of the voice message is terminated. In another implementation, if a call destination identity selects to refuse the call, the audio data is no longer delivered to that call destination identity's computer system 170, but the call remains connected, the recording and storage of the voice message continues, and the audio data continues to be sent to the call destination computer systems 170 corresponding to one or more of the other call destination identities.

In another implementation, the ICSS 140 waits a predetermined interval of time (e.g., 5 seconds) to receive or process multiple option selections from callers in response to a call screening message. Option selections corresponding to sending an IM or e-mail to the caller may be executed upon receipt of the option selection and are distinguished from call treatment option selections in that the sending an IM or-email option selections typically do not include call handling instructions that dispose of the call. Call treatment option selections received from users during the predetermined interval of time are collected and, at the end of the predetermined interval of time, one of the received call treatment option selections is chosen in accordance with a conflict resolution algorithm to dispose of the call. If no call treatment option selections have been received when the predetermined interval of time has expired, the conflict resolution algorithm may default to a "first come first serve" algorithm and the first call treatment option selection received disposes of the call. Alternatively, the predetermined interval of time may be reset or otherwise lengthened.

In another implementation, the ICSS 140 waits a predetermined interval of time (e.g., 5 seconds) to receive multiple option selections in response to a call notification or call screening message. Upon receiving an option selection, the ICSS 140 alerts some or all of the call destination identities of the received option selection and/or the corresponding call destination identity and provides some or all of the call destination identities with an additional predetermined interval of time (e.g., 5 seconds) in which to enter competing option selections or to express a lack of interest. Such an alert may be provided to only those call destination identities capable of trumping or otherwise effecting (e.g., joining) a first responder's selection.

The data network 150 may be any type of network that carries data including, for example, the Internet, an intranet or any combination of data bearing networks. The data network 150 may be, for example, a data network using Internet Protocol (IP). The term "data" as used herein is representation of information in a formalized manner suitable for communication, interpretation or processing. This information can include, for example, text, audio, image, video, and/or multimedia. Segments of related data being carried within the data network 150 are referred to herein as a "data stream." For example, the data being carried within the data network 150 and representing the audio data used for call screening is referred to as an audio "data stream."

The online service provider system 160 is a computer system configured to provide online data communications services to users, detect online presence of a user of a call destination computer system 170, receive call notification and call screening messages from the ICSS 140, generate format data and send the format data along with the call notification and call screening messages to the call destination computer systems 170, and send option selections from the call destination computer systems 170 to the ICSS 140. The online data communications services may include for example, e-mail services, instant messaging services, Internet access, and/or access to online content.

The online service provider system 160 may, for example, detect online presence of a user of the call destination computer system 170 in a manner similar to that used to detect presence in an Instant Messaging system and/or in a manner similar to that disclosed in application Ser. No. 10/414,167, hereby incorporated by reference in its entirety (in which client-side communication device monitors are used). The online service provider system 160 is also configured to receive call notification and call screening messages from the ICSS 140, generate format data that is used to format the call notification and call screening messages for presentation on the call destination computer systems 170, and send the call notification and call screening messages to the call destination computer systems 170 in near real time.

The online service provider system 160 is also configured to transmit, in near real time, the option selections from the call destination computer systems 170 to the ICSS 140. Since the caller is waiting on the caller telephone 110 during the generation and transmission of call notification messages, the selection of options by users of call destination computer systems 170, and the transmission processing of corresponding option selections, the online service provider system 160 is configured to send information to and receive information from the call destination computer systems 170 in near real time. To the extent that near real time is achieved in an implementation, it is possible to reduce the occurrence of missed opportunities to take calls resulting from transmission delays.

Near real time transmission of the option selection sent by a user in response to a call screening message is also desirable. If the option selection is not received and processed by the ICSS 140 before the caller finishes leaving a voice message, the call may be disconnected and may no longer be redirected in accordance with the received option selection. Furthermore, a noticeable time lag between option selection and call redirection may be particularly undesirable to a call screening subscriber that has become accustomed to the fast responsivity of traditional call screening solutions (e.g., using an answering machine to screen calls). Accordingly, the online service provider system 160 may be configured to avoid or altogether prohibit queuing call notification and call screening messages or option selections or further processing the call notification messages, call screening messages, or option selections in any way that increases transmission delay. The online service provider system 160 may be configured to provide this functionality in a manner similar to that used by instant messaging systems, or even to leverage instant messaging systems to enable transmission and receipt of instant messages in near real time.

The call destination computer system 170 is configured to receive call notification and call screening messages and format data from the online service provider system 160, process the call notification and call screening messages in accordance with the format data to enable a user to perceive the call notification and call screening messages, accept user selection of options offered by the call notification and call screening messages, and send the option selections to the online service provider system 160. The call destination computer system 170 includes a device 170A capable of executing instructions under the command of a controller 170B. The device 170A may be a general purpose computer, such as a workstation or a personal computer, a PDA, a special purpose computer, an intelligent mobile telephone, a pager, or a set top box.

The controller 170B commands and directs communications between the device 170A of the call destination computer system 170 and the online service provider system 160. The controller 170B may include one or more software or hardware applications that enable digital communications to be received from the online service provider system 160. For example, the controller 170B may be a modified instant messaging application configured to receive notification and screening messages and send option selections in a manner similar to that used to receive instant messages and send instant messages. The device 170A is connected to the controller 170B by a wired, wireless or virtual (i.e., when the controller is software running on the device) data pathway 170C capable of delivering data.

While FIG. 1 illustrates a single call destination computer system 170, several call destination computer systems 170 may be associated with the call destination.

Figure 2:
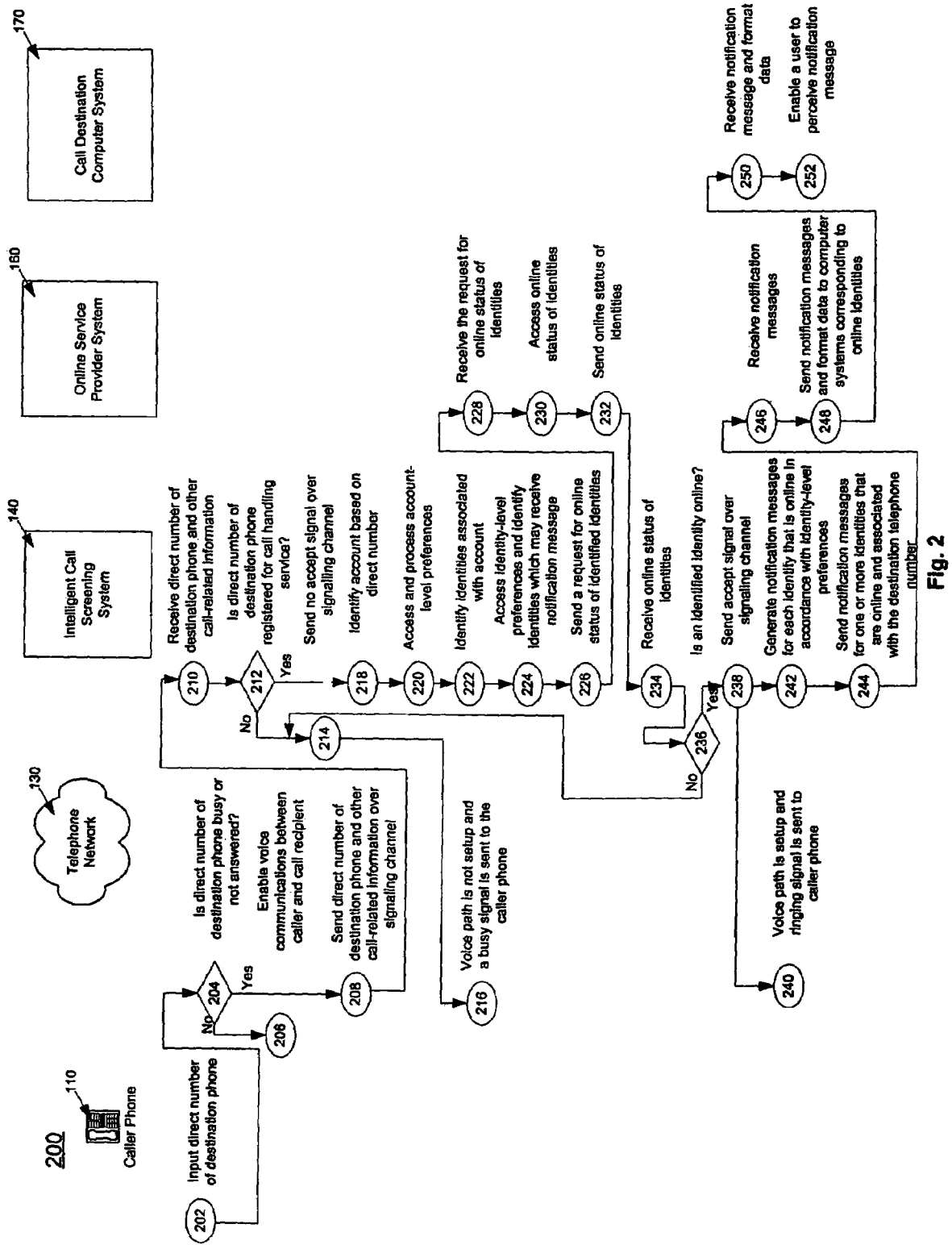
FIG. 2 is a flow chart illustrating a process for generating and delivering call notification messages.

FIG. 2 shows a process 200 for generating and delivering call notification messages. For convenience, particular components described with respect to FIG. 1 are referenced as performing the process 200. However, similar methodologies may be applied in other implementations where different components are used to define the structure of the system, or where the functionality is distributed differently among the components shown by FIG. 1. The process 200 is directed to generating and delivering call notification messages when the direct number of the call destination telephone 120 is busy or not answered after a predetermined number of rings. However, a call notification message may additionally or alternatively be generated and delivered under various other conditions. For example, the call notification message may be generated and delivered every time a call is directed to the direct number of the call destination telephone 120, regardless of the telephone line status.

The user of the caller telephone 110 inputs or selects the direct number of the call destination telephone 120 (202). The telephone network 130 determines whether the direct number of the call destination telephone 120 is busy or is not answered after a predetermined number of rings (204). If the direct number of the call destination telephone 120 is not busy and is answered prior to a predetermined number of rings, the telephone network 130 enables voice communications between the caller and the call recipient (206).

If the direct number of the call destination telephone 120 is busy or is not answered after a predetermined number of rings, the telephone network 130 sends the call destination telephone direct number and other call-related information over a signaling channel to the ICSS 140 (208). The ICSS 140 receives the direct number of the call destination telephone 120 and the other call-related information (210) and determines whether the direct number of the call destination telephone 120 is registered for call handling service (212). The ICSS 140 may determine whether a direct number is registered for call handling service by accessing, for example, a registration data store indexed by telephone numbers and storing records for those direct numbers that are receiving call handling service.

If the direct number of the call destination telephone 120 is not registered for call handling service, the ICSS 140 sends a "no accept" signal over the signaling channel to the telephone network 130 (214). In response to the no accept signal, the telephone network 130 does not setup a voice path between the caller telephone 110 and the ICSS 140 and a busy signal is sent to the caller telephone (216). In another implementation, the ICSS 140 instructs the telephone network 130 to redirect the voice path to a direct number corresponding to a voice messaging or voice mail system rather than instructing the telephone network to send a busy signal.

If the direct number of the call destination telephone 120 is registered for call handling service, the ICSS 140 identifies an account based on the direct number of the call destination telephone 120 (218) and accesses and processes account-level preferences (e.g., account-level white and/or black lists) (220). The account may be identified, for example, by accessing an account record stored in a configuration or registration data store and indexed by direct number of the call destination telephone 120. The account-level preferences also may be stored in the account record. For example, the "Smith" account may be stored in the configuration data store under 703-123-4567 and may include the user call destination identities "JillSmith2" and "JoeSmith3".

Operation 218 may be performed prior to operation 212 to enable a determination of whether call waiting/handling is associated with an account rather than with a phone number. Alternatively, the direct number of the call destination phone may be associated with one or more call destination identities to enable a determination of whether call waiting/handling is associated with one or more call destination identities rather than with a phone number or with an account. Moreover, any arbitrary mapping of call waiting/handling service registration to account, phone number, and/or call destination identity is possible.

FIG. 2 does not show the operations that take place if the call is disposed of by applying account-level preferences. In particular, if the call is disposed of by applying account-level preferences, the call is typically automatically blocked or forwarded to another number. If the call is not disposed of by applying the account-level preferences (e.g., the direct number of the caller telephone 110 is not on a white list or a black list), the ICWCCPS 140 identifies call destination identities associated with the account (222) and accesses identity-level preferences (e.g., identity-level white and/or black lists) (224). In one implementation, the identities associated with an account are stored in an account record while the identity-level preferences are stored in identity records associated with the account record. In another implementation, the call destination identities and the identity-level preferences are stored in an account record.

The ICSS 140 determines which identities may be able to receive a call notification message based on the identity-level preferences (e.g., the direct number of the caller telephone 110 may be on the prohibited list of some of the identities or parental controls may prohibit some of the identities from receiving a call notification message) (224). The ICSS 140 then sends a request to the online service provider system 160 for the online status of the available call destination identities (226). In some implementations, the ICSS 140 also accesses a configuration data store to retrieve the e-mail address and/or calling party identity based on the call-related information received from the telephone network 130. The ICSS 140 additionally sends a request to the online service provider system 160 for the online status of the calling party identity.

The online service provider system 160 receives the request for the online status of the call destination identities (228) and accesses the online status of the call destination identities (230). The online status of the call destination identities may be stored, for example, in a presence data store that is updated in real-time in a manner similar to that used in instant messaging systems to reflect activity of a user at the call destination computer system 170. The online service provider system 160 sends the online status of the call destination identities to the ICSS 140 (232). In some implementations, the online server provider system 160 also receives the request for the online status of the calling party identity, accesses the online status of the calling party identity, and sends the online status of the calling party identity to the ICSS 140.

The ICSS 140 receives the online status of the call destination identities (234) and determines whether at least one identified call destination identity is online (236). If no identified call destination identities are online, process 200 proceeds to operation 214. In another implementation, rather than proceeding to operation 214, the ICSS 140 accesses a default option selection in the account record associated with the direct number of the call destination telephone 120. The ICSS 140 then processes the default option selection in accordance with operations 312-334 to dispose of the call. For example, the default option selection may be to redirect the call to another number or to a voice mail or voice messaging system internal or external to the ICSS 140.

If at least one identified identity is online, the ICSS 140 sends an accept signal over the signaling channel to the telephone network 130 (238). In response to the accept signal, the telephone network 130 may send a ringing signal to the caller telephone 110 and set up a communications (e.g., voice) path with the caller telephone 110 (240).

The ICSS 140 generates a call notification message in accordance with identity-level preferences for each identified call destination identity that is online (242). The ICSS 140 sends the call notification messages for each identified call destination identity that is online to the online service provider system 160 (244). The call notification messages typically are sent out in parallel by the ICSS 140 to minimize transmission delays and the arrival time difference between call destination computer systems 170.

The online service provider system 160 receives the call notification messages for each identified call destination identity that is online (246) and sends the call notification messages along with format data to call destination computer systems 170 corresponding to the online identities (248). The receiving of the call notification messages and sending of the call notification messages and format data is performed in real time. The call notification messages typically are sent out in parallel by the online service provider system 160 to minimize transmission delays and the arrival time difference between call destination computer systems 170. In another implementation, operations 238-248 may be implemented by the online service provider system 160, rather than by the ICSS 140. In this implementation, the online service provider system 160 is configured to store and/or access the online identity-level preferences.

Each call destination computer system 170 receives the call notification message and format data (250) and enables a user to perceive the call notification message (252). In one implementation, the call destination computer system 170 enables the user to perceive the call notification message as a pop-up window or dialog box that appears on a visual display of the call destination computer system 170.

Figure 3B:
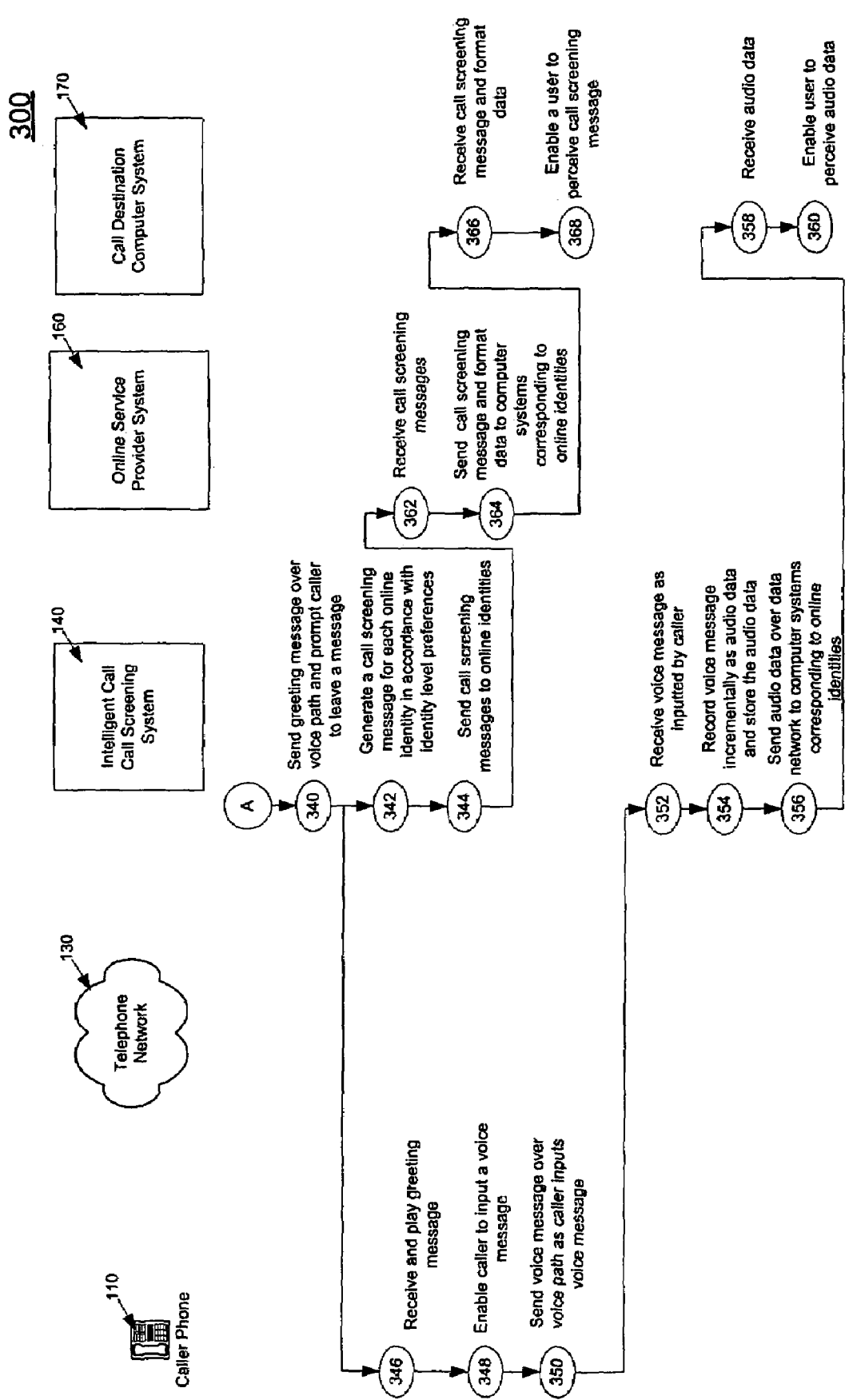

FIGS. 3A and 3B show a process 300 for responding to a user selection of an option in a call notification message. For ease of discussion, particular components described with respect to FIG. 1 are referenced as performing the process 300. However, similar methodologies may be applied in other implementations where different components are used to define the structure of the system, or where the functionality is distributed differently among the components shown by FIG. 1.

The call destination computer system 170 enables a user to select an option offered in the call notification message prior to expiration of a predetermined time interval (e.g., 15 seconds) (302). The call destination computer system 170 sends the option selection to the online service provider system 160 (304). If the option selection corresponds to sending an IM or an e-mail, the call destination computer system 170 prompts the user to type in the contents of the IM or e-mail. The contents of the IM or e-mail are sent as part of the option selection to the online service provider system 160. If the option selection corresponds to redirecting the call to a dynamically inputted number, the call destination computer system 570 prompts the user to input the number and the number is sent as part of the option selection to the online service provider system 160.

In another implementation, a user is not prompted to type in the contents of an e-mail or IM after selecting the option to send an e-mail or IM to the caller. Rather, the user may select the contents from a list of predetermined e-mail or IM contents. For example, the user may select IM contents from a list that includes: (1) "I received your call but was not able to answer the phone. Please call my cell phone number (202) 124-7682"; (2) "I can't pick up the phone right now, but I can communicate with you through instant messaging. What is on your mind?". The predetermined e-mail or IM contents also may be dynamically constructed from predetermined content portions based on, for example, call-related information. For example, the content may include the name of the caller and may be tailored to that specific individual caller. The content also may change based on the time of the call, location of the caller, or other call-related information.

Alternatively, the account-level or identity-level preferences may include e-mail and/or IM contents set for each account or for each individual user identity that are automatically sent upon a user selecting to respond to a call by e-mail or IM. In this example, the user does not need to type in, select, or otherwise input the e-mail or IM contents after selecting the option to send an e-mail or IM to the caller.

The online service provider system 160 receives the option selection (306) and sends the option selection to the ICSS 140 (308), and does so in real time.

The ICSS 140 receives the option selection (310). The process 300 employs a "first come, first serve" conflict resolution algorithm (i.e., the first call treatment option selection received is the option selection that will be used to process the call). In other implementations, such as an implementation in which a rank-based conflict resolution algorithm is used, the ICSS 140 waits for a predetermined interval of time (e.g., 15 seconds) to receive option selections from multiple call destination computers 170, and selects one of the received options selections in accordance with the conflict resolution algorithm. The ranks may be assigned by user online identity (i.e., some user online identities have a higher rank than other user online identities and, accordingly, their option selections take precedence over the option selections received from user online identities having a lower rank) or by level of responsiveness to the call (i.e., an option to take the call takes precedence over an option to send an audio message prior to disconnecting the call).

The ICSS 140 determines whether the option selection corresponds to the option to "take a message" (i.e., the call recipient wants the caller to leave a voice message) (311). If the option selection corresponds to taking a message, process 300 proceeds to operation 340. The ICSS 140 determines whether the option selection includes a call handling instruction (i.e., an instruction to forward or ignore the call) (312). If the option selection includes a call handling instruction, the ICSS 140 sends the call handling instruction to the telephone network 130 over the signaling channel (314). The telephone network 130 processes the call handling instruction and, if necessary, forwards or redirects the voice path accordingly (316). In some implementations, the ICSS 140 accesses and sends an audio message over the voice path to the caller telephone 110 prior to sending the call handling instruction to the telephone network 130 (e.g., the audio message "The telephone you are calling is busy. Please stay on the line and you will be transferred to an alternative number" may be sent prior to sending the call handling instruction to forward the call).

If the option selection does not correspond to a call handling instruction, then the ICSS 140 accesses an audio message corresponding to the option selection (318) and sends the audio message corresponding to the option selection over the voice path to the caller telephone 110 (320). The telephone network receives and forwards the audio message to the caller phone 110 (321). The caller telephone 110 receives the audio message (322) and enables a user to hear the audio message (324). For example, the audio message may be "I am currently not able to take your call; however, please stay on the line as I may be able to pick up the phone shortly."

In some implementations, the option selection may not correspond to a call handling instruction nor to an audio message presented to the caller. Instead, the option selection may correspond to sending an IM or an e-mail to the caller.

If the option selection corresponds to sending an IM to the caller, the ICSS 140 enables an IM to be sent to the caller telephone 110 (if the caller telephone 110 has IM capabilities) or to a caller computer system (not shown) via an IM system internal or external to the ICSS 140. The ICSS 140 may provide the IM system with the corresponding call destination identity and the calling party identity which may be used, for example, as IM handles to establish an IM session between the user of the call destination computer system 170 that submitted the option to send an IM and the caller telephone 110 or caller computer system. The call destination computer system 170 then sends the IM to the caller telephone or caller computer system. The option to send an IM to the caller may be disabled if the caller is not determined to be online by the ICSS 140. The IM system may be in communication with or may be part of the online service provider system 160.

If the option selection corresponds to sending an e-mail to the caller, the ICSS 140 receives the contents of the e-mail from the call destination computer system 170 and sends an e-mail to an e-mail system accessible via the caller telephone 110 (if the caller telephone 110 has e-mail capabilities) or via the caller computer system. The ICSS 140 uses an e-mail address associated with the caller by accessing the configuration data store based on the call-related information. The e-mail system may be in communication with or may be part of the online service provider system 160.

In another implementation, the call destination computer system 170 does not send the contents of the e-mail to the ICSS 140 for delivery by the ICSS 140 to an e-mail system. Rather, the call destination computer system 170 receives the e-mail address of the caller from the ICSS 140 and directly sends the e-mail to an e-mail system accessible by the caller telephone 110 or caller computer system. The ICSS 140 is informed of the option selection to respond to the caller by e-mail but does not actually partake directly in the delivery of the e-mail.

Receiving an option selection to send an IM or an e-mail does not necessarily dispose of the call. Rather, the ICSS 140 may wait until a call treatment option selection is received to dispose of the call (e.g., by either sending an audio message and disconnecting the call, sending an audio message and redirecting the call, or redirecting the call). Alternatively, after a predetermined interval of time, a default call treatment option selection may dispose of the call. In yet another implementation, the option to send an IM or an e-mail may be coupled with a call treatment option selection. For example, after selecting the option to send an IM, the IM may be sent, an audio message may inform the caller that the IM was sent to his or her calling party identity, and the call may be disconnected.

After or contemporaneous with sending the call handling instruction to the telephone network 130 and/or sending an audio message to the caller telephone 110, the ICSS 140 generates an updated call notification message for each identified call destination identity that is online and sends the updated call notification messages to the online service provider system 160 (326). The online service provider system 160 receives the updated call notification messages (328) and sends the updated call notification messages to the corresponding call destination computer systems 170 (330).

Each call destination computer system 170 receives an updated call notification message (332) and enables a user to perceive the updated call notification message (334). In one implementation, the updated call notification message is presented to users as a dialog box or pop-up window that displays the option selection that was used for processing the call and the call destination identity that submitted that option selection, if applicable (i.e., a call destination identity is not shown if the call was processed in accordance with a default option selection as discussed below).

In another implementation, the updated call notification message is sent to call destination identities based on whether the call destination identities can trump or otherwise effect (e.g., joining) the received option selection. For example, if a rank-based conflict resolution is used, the updated call notification message is only sent to call destination identities of a higher rank than the call destination identity that submitted the option selection. The updated call notification message may provide information as to the received option selection, the call destination identity that submitted the option selection, and may indicate that the call destination identity receiving the updated call notification message may trump or otherwise overrule the received option selection by choosing a different option selection.

In yet another implementation, the updated call notification message is sent to all call destination identities but the appearance of the call notification user interface changes in accordance with the rights of each call destination identity. For example, if "joesmith3" selects an option to take a call, then "jennysmith1", the call destination identity that corresponds to the daughter of Joe Smith and Jill Smith, is only provided with the options to take the call or ignore the call in the call notification user interface because "joesmith3" is assigned a higher rank than "jennysmith1." "jillsmith2", on the other hand, is provided with the options to take the call, take a message, ignore the call, and terminate the call in the call notification user interface because "jillsmith2" is assigned a higher rank than "joesmith3" (i.e., Jill Smith's option selection trumps Joe Smith's option selection).

If the ICSS 140 does not receive an option selection within a predetermined time interval from any of the call destination computer systems 170 that received call notification messages (e.g., at 306), the ICSS 140 automatically accesses a default option selection corresponding to the account (and stored as an account-level preference) (336). The ICSS 140 processes the default option selection in accordance with operations 311-334 (338). The default option selection is typically a call treatment option selection that disposes of the call (i.e., an option selection that includes an audio message and/or a call handling instruction).

If the option selection corresponds to taking a message, the ICSS 140 accesses a greeting message associated with the account or with the call destination identity that submitted the option selection. The ICSS 140 sends the greeting message over the voice path and prompts the caller to leave a message (340). The greeting message may be accessed, for example, by accessing a greeting message identifier from the account record or from a call destination identity record and using the greeting message identifier to access the greeting message stored in a message data store. The ICSS 140 also generates an updated call notification message for each identified call destination identity that is online. The updated call notification message is sent to the call destination identities as described above to inform the corresponding users that a voice message is being deposited by the caller. In some implementations, no updated call notification message is sent out. Instead, call screening messages are sent out as described below.

The ICSS 140 generates a call screening message for each call destination identity in accordance with the identity level preferences (342). The ICSS 140 sends the call screening messages addressed to the online identities to the online service provider system 160 (344). The process 300 proceeds to operations 362-368 which enable the users of the call destination computer systems 170 corresponding to the online identities to react to the call by selecting an option in a call screening message. Meanwhile, the caller telephone 110 receives and plays the greeting message (346). The caller telephone 110 enables the caller to begin inputting a voice message (348), which is sent by the caller telephone 110 over a voice path across the telephone network 130 to the ICSS 140 (350). The ICSS 140 begins receiving the voice message (352) and records the voice message incrementally as a stream of discrete chunks of audio data as the voice message is received. The stream of audio data is copied and stored by the ICSS 140 (354). The stream of audio data is also sent by the ICSS 140 over the data network 150 to the call destination computer systems 170 corresponding to the call destination identities (356). Each call destination computer system 170 receives the stream of audio data (358), reassembles the discrete chunks of audio data, and converts the audio data to audio to enable the user of the call destination computer system 170 to hear the voice message as the voice message is being received and stored by the ICSS 140 (360). The user of the call destination computer system 170 is typically able to hear the voice message simultaneously or substantially simultaneously with the voice message being received and stored by the ICSS 140. Accordingly, the users of the call destination computer systems 170 may react to the call by selecting an option in the call screening message while concurrently listening to the voice message.

The online service provider system 160 receives the call screening message for the call destination identities (362) and sends the call screening messages along with format data to the call destination computer systems 170 corresponding to the online identities (364). The online service provider system 160 is configured to perform operations 362 and 364 in near real time to minimize transmission delays.

Each call destination computer system 170 receives a call screening message and format data (366) and enables a user to perceive the call screening message (368). In one implementation, the call destination computer systems 170 enable the users to perceive the call screening message as a pop-up window or a dialog box that appears on a visual display of the call destination computer system 170.

Figure 4:
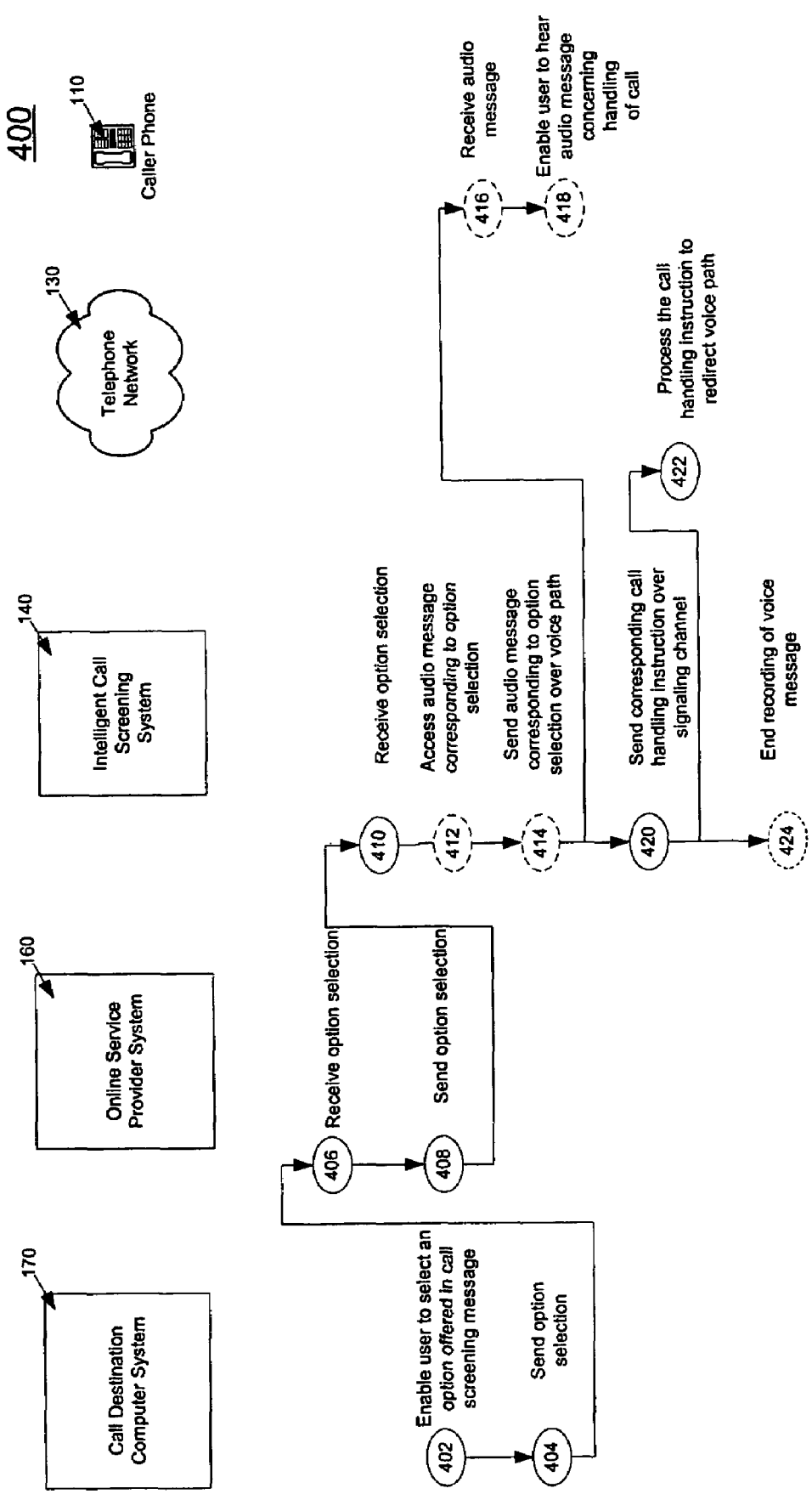
FIG. 4 is a flow chart illustrating a process for responding to a user selection of an option in a call screening message.

FIG. 4 shows a process 400 for responding to a user selection of an option in a call screening message. For convenience, particular components described with respect to FIG. 1 are referenced as performing the process 400. However, similar methodologies may be applied in other implementations where different components are used to define the structure of the system, or where the functionality is distributed differently among the components shown by FIG. 1.

The call destination computer system 170 enables a user to select an option offered in a call screening message (402). The call destination computer system 170 sends the option selection to the online service provider system 160 (404).

The online service provider system 160 receives the option selection (406) and sends the option selection to the ICSS 140 (408). The online service provider system 160 is configured to receive and send the option selection to the ICSS 140 in near real time.

The ICSS 140 receives the option selection (410). The process 400 assumes application of a "first come, first serve" conflict resolution algorithm (i.e., the first option selection received is the option selection that will be used to process the call). Process 400 also assumes that the option selection corresponds to accepting (i.e., redirecting the call back to the call destination telephone 120) or redirecting the call to another telephone number. However, if the option selection corresponds to refusing or ignoring the call, the ICSS 140 stops recording the call, disconnects the call, and in some implementations, deletes the audio file that stores the incomplete voice message. Moreover, in some implementations, a call screening message may include the option to discard the message being deposited by the caller. Selection of this option results in the ICSS 140 no longer sending the audio data stream to the call destination computer system 170 and deleting the partially stored voice message.

In some implementations, the option selection may not correspond to accepting or redirecting the call to another telephone number. Instead, the option selection may correspond to sending an IM or an e-mail to the caller as discussed previously. Receiving an option selection to send an IM or e-mail does not necessarily end the recording of the call. Rather, ICSS 140 may wait until an option selection that corresponds to accepting or redirecting the call is received before the ICSS 140 stops recording the call. In another implementation, the option to send an IM or an e-mail may be coupled with a call treatment option selection. For example, after selecting the option to send an IM, the IM may be sent, an audio message may inform the caller that the IM was sent to his or her calling party identity, and the call may be disconnected.

As shown in process 400, if the option selection corresponds to accepting the call or forwarding the call to another telephone number, the ICSS 140, in some implementations, accesses a stored outbound audio message corresponding to the option selection (412) and sends the outbound audio message corresponding to the option selection over the voice path to the caller telephone 110 (414). The caller telephone 110 receives the outbound audio message (416) and enables a user to hear the audio message concerning the handling of the call (418). For example, the outbound audio message may be: "The phone you are calling is unavailable. Please stay on the line and you will be transferred to an alternative number" or "At the direction of the call recipient, your call is being forwarded." An audio identifier for the outbound audio message or a pointer to the audio identifier may be included in the received option selection. The ICSS 140 may access the outbound audio message based on the audio identifier from a local or remote data store communicatively coupled to the ICSS 140.

The ICSS 140 identifies the call handling instruction associated with the option selection and sends the call handling instruction to the telephone network 130 over the signaling channel (420). The telephone network 130 processes the call handling instruction by forwarding or redirecting the voice path accordingly (422). For example, the option selection may include a forwarding telephone number dynamically inputted by the call recipient (e.g., a user inputs a phone number convenient to them while using the computer to which the call notification/screening message was sent, or the phone number of another user to whom they wish to have the call redirected, such as their secretary) or a pointer used to access the forwarding telephone number from a data store based on input by the call recipient or information known about the call recipient (e.g., if they respond using their cell phone, the cell phone number may be assigned as the forwarding number). The forwarding telephone number is included in the call handling instruction which is sent to the telephone network over the signaling channel and which is processed by the telephone network to redirect the call destination from the ICSS 140 to the phone line corresponding to the forwarding telephone number.

After sending the call handling instruction to the telephone network 130 and, in some implementations, sending an outbound audio message to the caller telephone 110 in response to selection of an option in a call screening message, the ICSS 140 ends the recording of the voice message, stops sending the stream of audio data to the call destination computer systems 170, and closes the audio file in which the copy of the audio data stream was being stored (424). The audio file may then be subsequently accessed by the call recipient or call recipients to hear the incomplete voice message.

Figure 5:
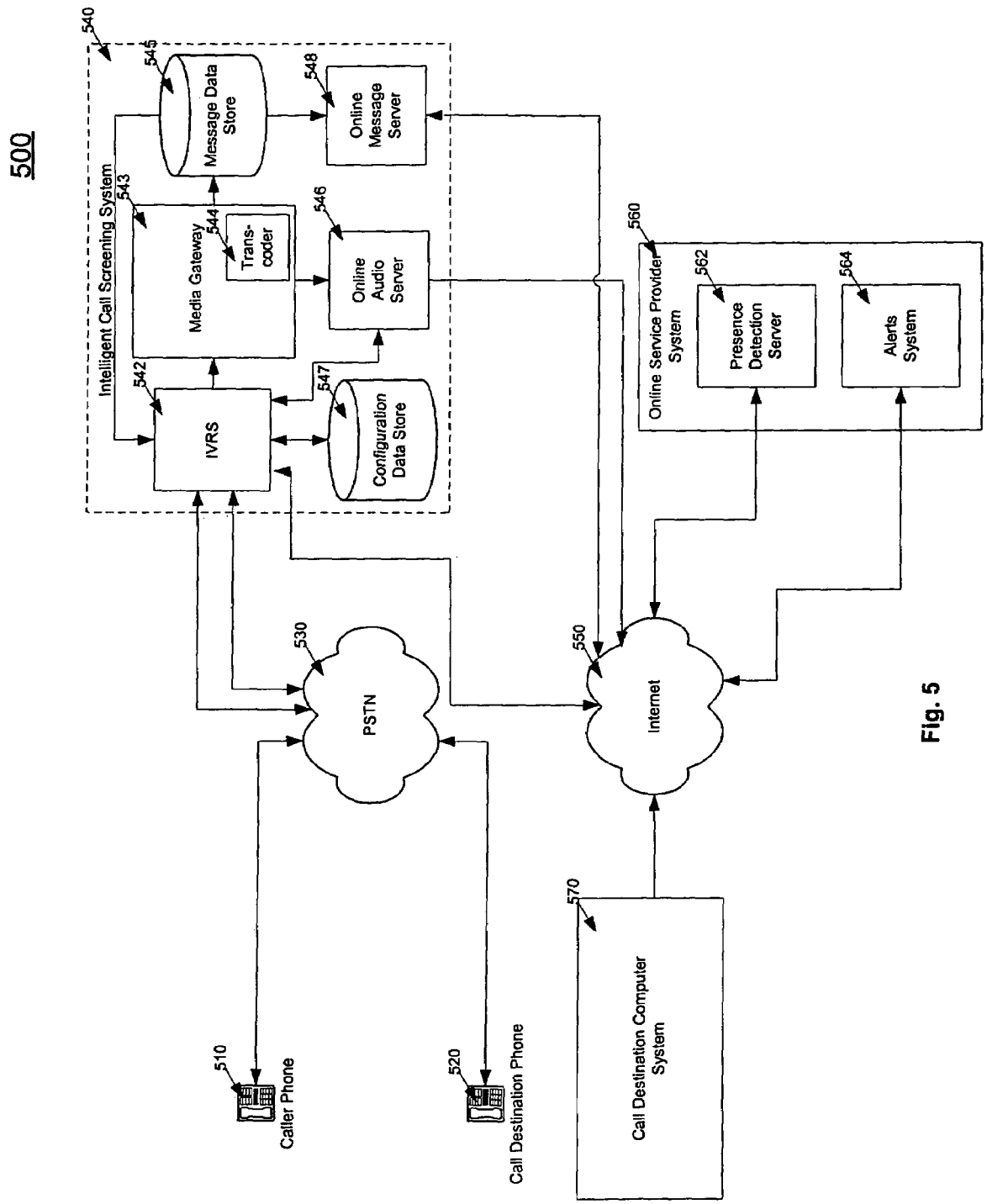
FIG. 5 is a block diagram of an exemplary implementation of aspects of the communications system of FIG. 1 used for multi-user intelligent call screening.

FIG. 5 shows one exemplary implementation 500 of the communications system 100 of FIG. 1 configured to provide multi-user screening of telephone calls. The communications system 500 includes a caller telephone 510, a call destination telephone 520, an ICSS 540, an online service provider system 560, and one or more call destination computer systems 570. In this implementation, the voice path of the call that is screened traverses the PSTN 530, and the screening audio data stream traverses the Internet 550.

Examples of several elements within the communications system 500 of FIG. 5 are described broadly above with respect to FIG. 1. In particular, the caller telephone 510, the call destination telephone 520, and the call destination computer systems 570 typically have attributes comparable to those described with respect to the caller telephone 110, the call destination telephone 120, and the call destination computer systems 170 of FIG. 1, respectively. Likewise, the ICSS 540 and the online service provider system 560 typically have attributes comparable to and may illustrate one possible implementation of the ICSS 140 and the online service provider system 160 of FIG. 1.

The ICSS 540 includes an interactive voice response system (IVRS) 542, a media gateway 543, a message data store 545, an online audio server 546, a configuration data store 547, and an online message server 548. The online service provider system 560 includes a presence detection server 562 and an alerts system 564.

The IVRS 542 is a telephony-facing and IP-facing computer system configured to receive a call from the caller telephone 510, validate the call, generate and send call notification and call screening messages to the alerts system 564, receive option selections from the alerts system 564, send call handling instructions to the PSTN 530, and store, record, and send audio messages to the caller telephone 510 through the PSTN 530. The call handling instructions may include, for example, accepting a call, rejecting a call, and redirecting a call. The IVRS 542 accesses the configuration data store 546 to validate a call received by the IVRS 542 and to access account-level and identity-level call handling preferences. The IVRS 542 also requests online status of identities from the presence detection server 562 of the online service provider system 560.

When processing a call notification message option selection instructing the IVRS 542 to take a message, the IVRS 542 is configured to send a greeting message to the caller telephone 510. The IVRS 542 requests an internal and an external resource identifier from the online audio server 546. Each resource identifier may be, for example, a universal resource locator (URL). The IVRS 542 sends the internal resource identifier and an audio file identifier to the media gateway 543 which uses the internal resource identifier to establish a connection with the online audio server 546 and uses the audio file identifier to identify the audio file in the message data store 545 in which the voice message of the caller will be stored. The IVRS 542 also generates and sends call screening messages along with the external resource identifier to the alerts system 564 for delivery to the call destination computer systems 570 corresponding to all or a subset of the call destination identities in accordance with identity-level call handling preferences. The external resource identifier is used by the call destination computer systems 570 to establish a connection with the online audio server 546. In another implementation the IVRS 542 requests a unique external resource identifier for each call destination computer system 570 associated with available call destination identities. The IVRS 542 sends each call destination computer system 570 its corresponding unique external resource identifier. Once the IVRS 542 sends the audio file identifier and the internal and external resource identifiers, the IVRS 542 prompts the caller to leave a voice message.

The IVRS 542 records the voice message incrementally as discrete chunks of audio data. The size of the chunks of audio data may be chosen to enhance or optimize the balance between latency and system throughput. Smaller chunks result in smaller latency but also result in decreased system throughput. A typical chunk size is approximately 0.5 seconds of recorded audio data. The chunks of audio data are packetized and sent as a stream to the media gateway 543 using, for example, an IP-based protocol.

The IVRS 542 is configured to receive call screening message option selections and call notification message option selections from the call destination computer systems 570 via the alerts system 564. The IVRS 542 typically processes multiple received call treatment option selections in accordance with a conflict resolution algorithm as discussed previously. If the option selections are received in response to a call screening message rather than a call notification message, the conflict resolution algorithm is typically a "first come first serve" algorithm. Accordingly, the IVRS 542 typically processes the first call treatment option selection received in response to a call screening message. Processing a call treatment option selection includes sending a call handling instruction and, in some implementations, an outbound audio message corresponding to the received option selection to the caller telephone 510 through the PSTN 530. The call handling instruction may include, for example, accepting the call (i.e., redirecting the call to the call destination telephone 520), rejecting the call, and redirecting the call to another telephone.

If the received option selection is not a call treatment option selection but instead corresponds to sending an IM or an e-mail to the caller, the IVRS 542 uses the calling party identity or e-mail address accessed from the configuration data store 547 to generate and forward an IM or e-mail to an external IM or e-mail system, respectively. In one implementation, the IM or e-mail system is part of the online service provider system 560. In another implementation, the IVRS 542 sends e-mails to the online message server 548 for storage. In this implementation, the caller is able to access the e-mails in the online message server 548 using the caller telephone 510 (provided it has e-mail functionality) or using a caller computer system.

The media gateway 543 is a computer system configured to receive a stream of audio data corresponding to a voice message from the IVRS 542, transcode the stream of audio data using a transcoder 544, and send the transcoded stream of audio data to the online audio server 546. The media gateway 543 also copies the stream of audio data and sends the audio file identifier received from the IVRS 542 and the copy of the stream to the message data store 545 for storage in a file identified by the audio file identifier. The stream of audio data typically is received by the media gateway 543 after the media gateway 543 has established a connection with the online audio server 446 using the internal resource identifier.

The transcoder 544 of the media gateway 543 transcodes the original stream of audio data using an audio compression scheme such as, for example, MPEG Layer III Audio (MP3). Transcoding the stream of audio data decreases the transmission time across the Internet and enables the audio data stream to be received by the call destination computer systems 570 in near real time.

The message data store 545 is a storage device that is communicatively coupled to the IVRS 542, the media gateway 543, and the online message server 548. The message data store 545 stores greeting messages and outbound messages of subscribers and also stores audio messages deposited by callers. The message data store 545 stores these messages in audio files corresponding to audio file identifiers received from the IVRS 542 or from the media gateway 543. The messages in the message data store 545 may be accessed by the IVRS 542 (e.g., the outbound messages and the greeting messages) and by the online message server 548 (e.g., the caller deposited messages). In other implementations, the files stored in the message data store 545 are sent or made accessible to an external voice mail or messaging system for access by users associated with the direct number of the call destination telephone 520.

The online audio server 546 is a computer system configured to receive a stream of audio data from the media gateway 543 and relay the stream of audio data to one or more call destination computer systems 570. The stream of audio data is received over a connection established between the online audio server 546 and the media gateway 543 and is delivered over a connection established between the online audio server 546 and the one or more call destination computer system 570. The media gateway 543 uses an internal resource identifier to establish a connection with the online audio server 546, and the one or more call destination computer systems 570 use one or more external resource identifiers to establish connections across the Internet with the online audio server 546. The resource identifiers are generated by the online audio server 546 at the request of the IVRS 542 and are delivered to the media gateway 543 and to the call destination computer systems 570 by the IVRS 542.

Typically, all of the connections are setup prior to the online audio server 546 receiving the stream of audio data from the media gateway 543. When the online audio server 546 receives the stream of audio data, the online audio server 546 relates the internal resource identifier associated with the connection between the online audio server 546 and the media gateway 543 to one or more external resource identifiers associated with a connection between the online audio server 546 and the call destination computer systems 570. The online audio server 546 relays the stream across the Internet to the one or more call destination computer systems 570 over the connections that are identified as being established using the related one or more external resource identifiers.

The configuration data store 547 is a data storage device that is communicatively coupled to the IVRS 542 and that stores account records and call destination identity records. The account records store account-level call handling preferences and may be indexed by subscriber phone number (i.e., the direct number of the call destination telephone 420). The call destination identity records store identity-level call handling preferences and may be indexed by account number or by subscriber phone number. The account records and/or the call destination identity records may store audio file identifiers. The audio file identifiers include identifiers for the audio files storing outbound voice messages, greeting messages, and deposited voice messages.

The online message server 548 is a computer system configured to enable a user of the call destination computer system 570 to access or retrieve the messages stored in the message data store 545 across the Internet. In one implementation, the online message server 548 is an e-mail system configured to enable access to e-mails with audio file attachments. In this case, the audio file attachments are the voice message audio files stored in the message data store 545. A user may access the voice messages stored in the message data store 545 by using a call destination computer system 570 to communicate with the online message server 548 across the Internet. Additionally or alternatively, the user may use a telephone to call the IVRS 542 over the PSTN to access voice messages stored in the message data store 545.

In another implementation, the online message server 548 is an e-mail system configured to store e-mails sent by users of call destination computer systems 570 to callers. In this implementation, the callers are able to connect to the online message server 548 to access e-mails via the caller telephone 510 or a caller computer system.

The presence server 562 is a server that receives, updates, and publishes online presence data for each identity (i.e., call destination and calling party identities). The presence server 562 enables the IVRS 542 to access online status data for particular calling party and call destination identities. In one implementation, the presence server 562 is functionally similar to the central server in an instant messaging system that receives periodic online status updates from call destination computer systems 570. In another implementation, the presence server 562 is functionally similar to the presence detection system disclosed in application Ser. No. 10/414,167 that receives communication device status data and user availability to perceive communications data from a device monitor coupled to the device 570B of the call destination computer system 570. In this implementation, the IVRS 542 includes the functionality of a device monitoring system.

The alerts system 564 is a computer system configured to enable near real time transmission of call notification and call screening messages to call destination computer systems 570 from the IVRS 542 and transmission of the option selections from call destination computer systems 570 to the IVRS 542. The alerts system 564 may be configured to provide this functionality in a manner similar to that used by instant messaging systems, or even to leverage instant messaging systems to enable transmission and receipt of instant messages in near real time. Moreover, the alerts system 564, in communication with the presence server 562, tracks the communication device(s) currently being used by the identities and generates and sends format data to configure the display of the call notification and call screening messages in accordance with the capabilities of the corresponding call destination computer systems 570.

The format data may vary based on device type. For example, with limited capabilities, the format data for a PDA may enable the PDA to limit the call notification message to a visual indication of the incoming call (e.g., illumination of a light and a graphical display of a call icon and the caller phone direct number or identity proxy thereof) and may further limit the call handling options that are presented to the user in a call notification/screening message to a subset of the full suite of options (e.g., the option to forward the call to one other phone number). In contrast, the format data sent to a home computer may enable the home computer to provide, for example, an audio and visual indication of the call and to display full caller identity information including address, return phone number, and other information about the caller accessible based on the caller phone number. The format data sent to the home computer also may enable the home computer to present to the user a significantly larger number of call handling options (e.g., the option to play various audio messages, take a message, and forward the call to a phone number selected by the user from a large number of possible phone numbers).

Figure 6A:
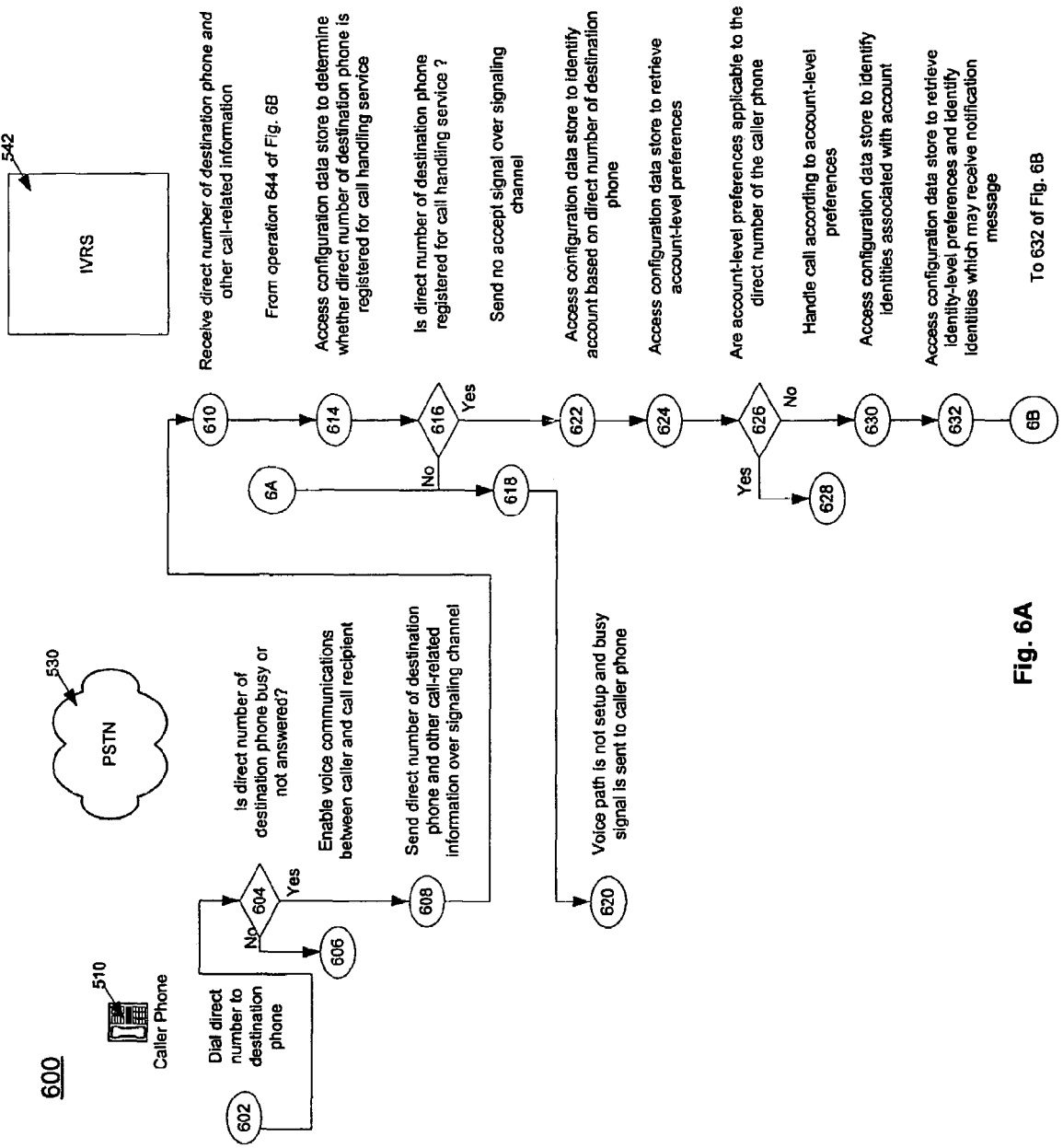
FIGS. 6A and 6B are flow charts illustrating a process for generating and delivering call notification messages.
Figure 6B:
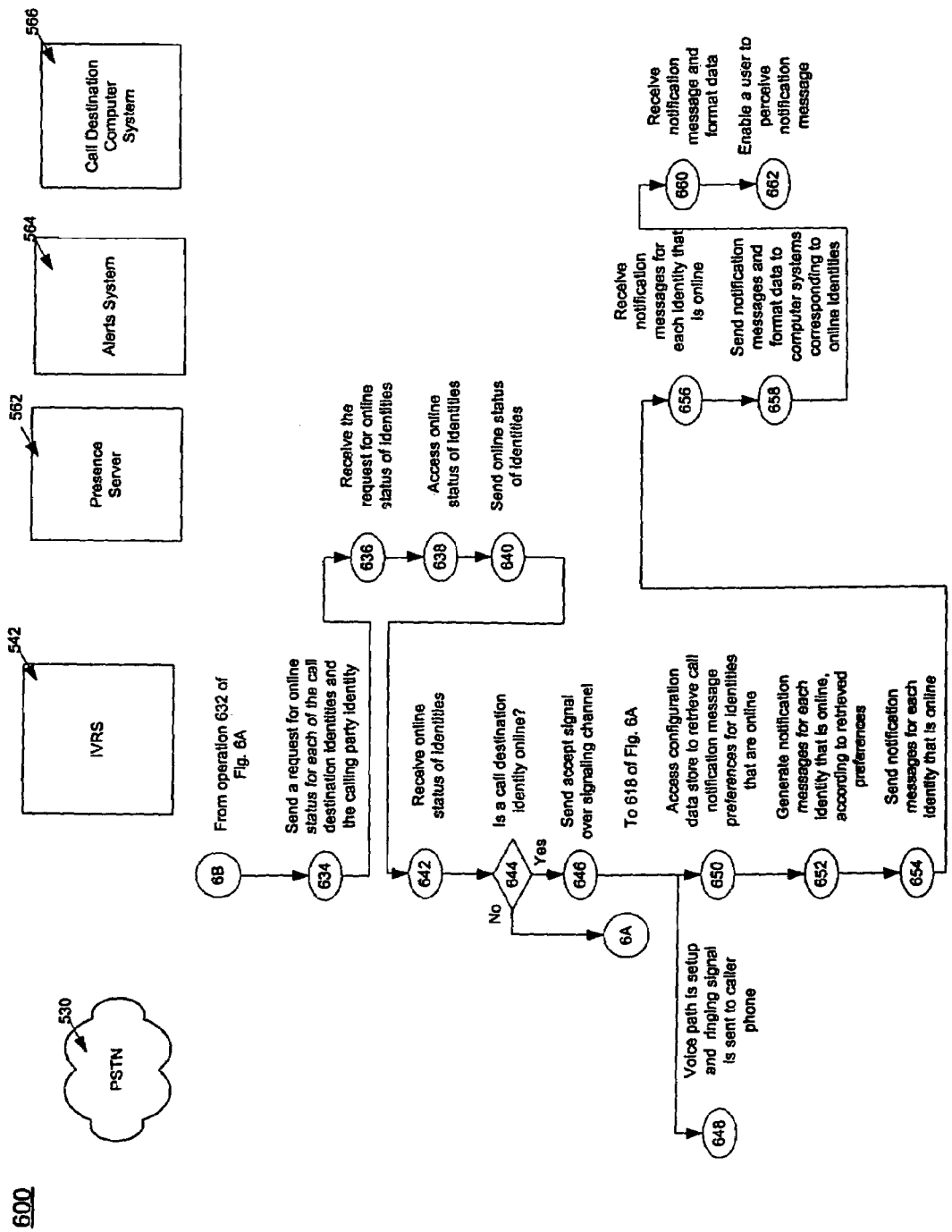

FIGS. 6A and 6B show a process 600 for generating and delivering call notification messages. For ease of discussion, particular components described with respect to FIG. 5 are referenced as performing the process 600. However, similar methodologies may be applied in other implementations where different components are used to define the structure of the system, or where the functionality is distributed differently among the components shown by FIG. 5. Process 600 is similar to an implementation of process 200 but applied to the communications system 500 rather than to the communications system 100.

The user of the caller telephone 510 dials the direct number of the call destination telephone 520 (602). The PSTN 530 determines whether the direct number of the call destination telephone 520 is busy, not answered, or otherwise unavailable (604). If the direct number of the call destination telephone 520 is available and answered, the PSTN 530 completes the call setup between the caller telephone 510 and the call destination telephone 520 (606).

If the direct number of the call destination telephone 520 is busy or otherwise unavailable, the PSTN 530 sends the call destination telephone direct number and other call-related information over a signaling channel to the IVRS 542 (608). The IVRS 542 receives the direct number of the call destination telephone 520 and the other call-related information (610) and accesses the configuration data store 547 (614) to determine whether the direct number of the call destination telephone 520 is registered for call handling service (616). If the direct number of the call destination telephone 520 is not registered for call handling service, the IVRS 542 sends a no accept signal over the signaling channel to the PSTN 530 (618). In response to the no accept signal, the PSTN 530 sends a busy signal to the caller telephone 510 and does not setup a voice path between the caller telephone 510 and the IVRS 542 (620).). In another implementation, the IVRS 542 instructs the PSTN 530 to redirect the voice path to a direct number corresponding to a voice messaging or voice mail system rather than instructing the PSTN 530 to send a busy signal.

If the direct number of the call destination telephone 520 is registered for call waiting service, the IVRS 542 accesses the configuration data store 547 to identify an account based on the direct number of the call destination telephone 520 (622) and to retrieve account-level preferences (624). The account may be identified, for example, by accessing an account record stored in the configuration data store 547 and indexed by direct number of the call destination telephone 520. The account-level preferences also may be included in the account record. The IVRS 542 determines whether account-level preferences are applicable to the direct number of the caller telephone 510 (626). If account-level preferences are applicable, then the call is handled according to specified account-level preferences (628). For example, the call may be handled as described in operations 712-734 (FIG. 7) using the account-level preference option stored in the account record. For example, the account-level preference option may redirect the call to another number (i.e., caller number is on white list), may redirect the call to the call destination phone 520 (i.e., caller number is on white list), or may ignore or disconnect the call (i.e., caller number is on black list). In another implementation, the black list/white list information is associated directly with the call destination number and the determination whether account-level preferences are applicable to the direct number of the caller phone is determined substantially concurrent with the determination of whether the call destination direct number is registered for call waiting/handling service. The registration information associated with the direct number may include the black list/white list information.

If account-level preferences are not applicable to the direct number of the caller telephone 510 (e.g., the direct number of the caller telephone 510 is not on a white list or a black list), or if appropriate, after applying account-level preferences, the IVRS 542 accesses the account record stored in the configuration data store 547 to identify call destination identities associated with the account (630). The IVRS 542 accesses corresponding call destination identity records to retrieve identity-level preferences (632). The IVRS 542 also may access the configuration data store 547 to identify a calling party identity associated with the caller. For example, the calling party identity may be stored in records indexed by the direct number of the caller telephone 510.

The IVRS 542 identifies which call destination identities may be able to receive a call notification message based on the online identity-level preferences (e.g., the direct number of the caller telephone 510 may be on the prohibited list of some of the call destination identities or parental controls may prohibit some of the call destination identities from receiving a call notification message) (632). The IVRS 542 sends a request to the presence server 562 for the online status of the identified call destination identities (634). The IVRS 542 also may send a request to the presence server 562 for the online status of the calling party identity.

The presence server 562 receives the request for the online status of the call destination identities and the calling party identity (636) and accesses the online status for each of the call destination identities and the calling party identity from a data store (638).

Obtaining the online status of the calling party identity from the data store is useful in determining the options available to call recipients in communicating with the calling party or in simply providing a more granular notification to the call recipients regarding the calling party's status. The online status of the calling party may be reported as general online status or may be reported with more granularity to enable different kinds of options to call recipients. For example, the calling party may be reported as being present at an IM client, and, therefore, the call recipients may be presented with an option to respond to the call by sending an IM to the calling party. Additionally or alternatively, the calling party may be reported as being present at a mobile device, and the call recipients may be presented with the option to forward an IM to the mobile device and/or to send a short text message to the mobile device via, for example, Short Message Service (SMS).

The presence server 562 sends the online status of the identified online identities to the message transfer point 444 (640). The IVRS 542 receives the online status of the identities (642) and determines whether at least one call destination identity is online (644). If no call destination identities are online, process 600 proceeds to operation 618. If at least one call destination identity is online, the IVRS 542 sends an accept signal over the signaling channel to the PSTN 530 (646). In response to the accept signal, the PSTN 530 sends a ringing signal to the caller telephone 510 and sets up a voice path between the caller telephone 510 and the IVRS 542 (648).

The IVRS 542 accesses the configuration data store 547 to retrieve call notification format information corresponding to the identified call destination identities that are online (650). The call notification format information may be stored in the identity records as an identity-level call handling preference. The IVRS 542 generates a call notification message for each call destination identity that is online in accordance with the retrieved call notification message formats (652) and sends the call notification messages to the alerts system 564 (654). The IVRS 542 call notification messages generated by the IVRS 542 may omit an option to send an IM to the caller if the calling party identity is not online. The call notification messages generated by the IVRS 542 also may omit an option to send an IM or e-mail to the caller if the e-mail address or calling party identity are not stored in the configuration data store 547 or otherwise not available.

The alerts system 564 receives the call notification messages (656) and sends the call notification messages along with format data to call destination computer systems 570 corresponding to the call destination identities (658). The receiving of the call notification messages and sending of the call notification messages and format data are performed in real time.

Each call destination computer system 570 receives the call notification message and format data (660) and enables a user to perceive the call notification message (662). In one implementation, the call destination computer system 570 enables the user to perceive the call notification message as a pop-up window or dialog box that appears on a visual display of the call destination computer system 570.

Figure 7B:
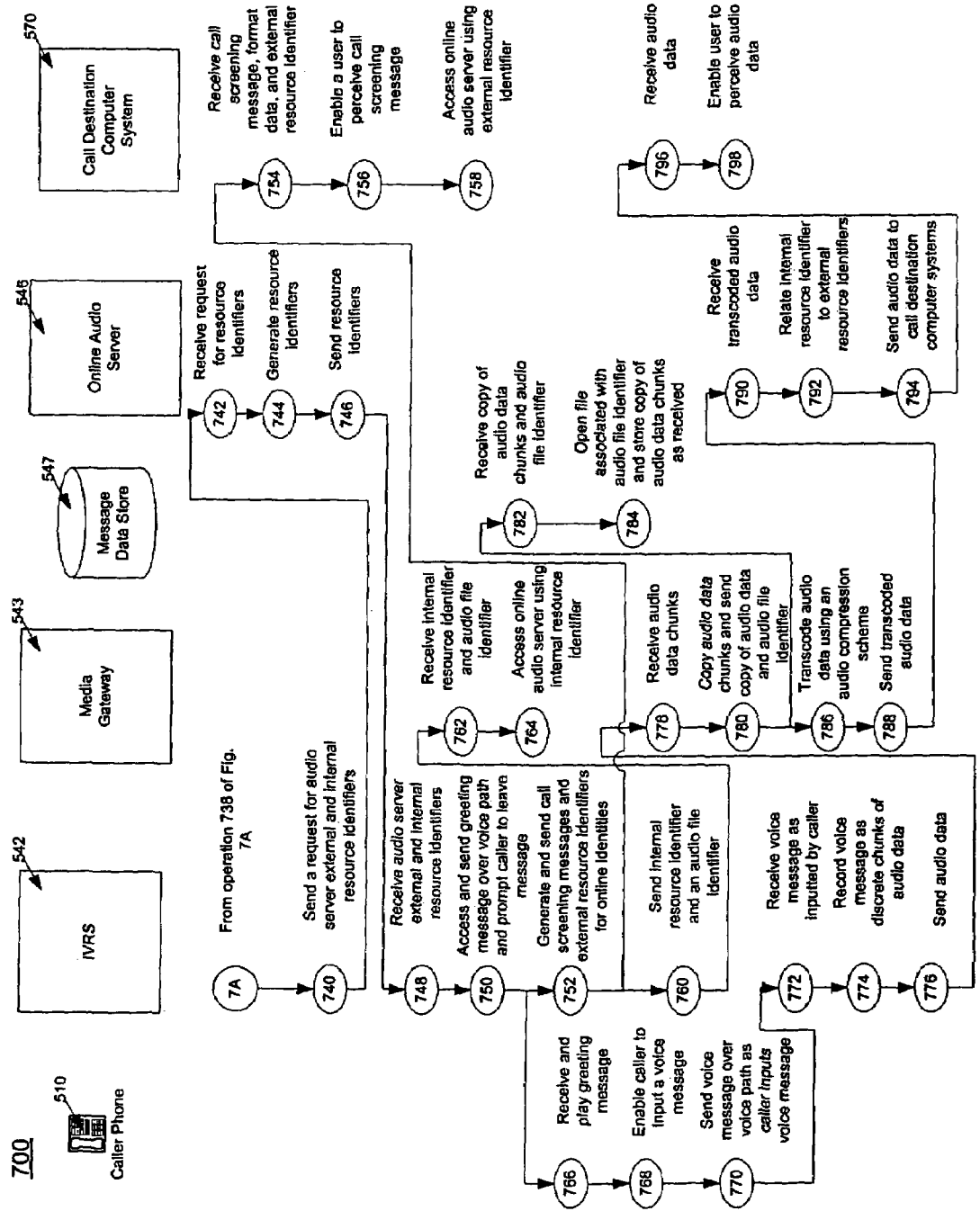

FIGS. 7A and 7B show a process 700 for responding to a user selection of an option in a call notification message. For ease of discussion, particular components described with respect to FIG. 5 are referenced as performing the process 700. However, similar methodologies may be applied in other implementations where different components are used to define the structure of the system, or where the functionality is distributed differently among the components shown by FIG. 5. Process 700 is similar to an implementation of process 300 but applied to the communications system 500 rather than to the communications system 100.

The call destination computer system 570 enables a user to select an option offered in the call notification message prior to expiration of a predetermined time interval (e.g., 15 seconds) (702). The call destination computer system 570 sends the option selection to the alerts system 564 (704). If the option selection corresponds to sending an IM or an e-mail, the call destination computer system 570 prompts the user to input the contents of the IM or e-mail. The contents of the e-mail are sent as part of the option selection to the alerts system 564.

The alerts system 564 receives the option selection (706) and sends the option selection to the IVRS 542 (708). The alerts system 564 is configured to receive and send the option selection to the IVRS 542 in real time.

The IVRS 542 receives the option selection (710). Process 500 employs a "first come, first serve" conflict resolution algorithm. Other implementations may use different conflict resolution algorithms as discussed above with respect to process 300.

The IVRS 542 determines whether the option selection corresponds to the option to "take a message" (i.e., the call recipient wants the caller to leave a voice message) (712). If the option selection corresponds to taking a message, process 700 proceeds to operation 740. In this implementation, selection of the option to "take a message" results in the call recipients being able to screen the message while the voice message is being deposited by the calling party. In another implementation, the "take a message" option may be replaced by two options: (1) "take a message" and (2) "screen a message while taking a message". Selection of the first option results in the call being redirected to a voicemail system and the call recipient not hearing the voice message being deposited. Selection of the second option results in the call recipient hearing the voice message being deposited and being able to react to the call while the voice message is being deposited (i.e., the second option selection corresponds to the "take a message" option of the implementation shown in FIGS. 7A and 7B).

The IVRS 542 determines whether the option selection includes a call handling instruction (i.e., an instruction to forward, disconnect, or ignore the call) to dispose of the call (714). The option selection to "take a message" does not include a call handling instruction to dispose of the call. Rather, this option selection initiates delivery of call screening messages through which a new set of option selections will be received that may be used to dispose of the call.

If the option selection includes a call handling instruction to dispose of the call, the IVRS 542 sends a corresponding call handling instruction to the PSTN 530 over the signaling channel (716). The PSTN 530 processes the call handling instruction and, if necessary, disconnects, forwards, or redirects the voice path accordingly (718). In another implementation, an audio message is sent to the caller informing the caller of the disposition of the call.

If the option selection does not correspond to a call handling instruction to dispose of the call, then the option selection typically corresponds to sending an audio message to the caller. Then the IVRS 542 accesses an audio message and sends the audio message over the voice path to the caller telephone 510 (720). The caller telephone 510 receives the audio message (722) and enables a user to hear the audio message (724).

As discussed previously with respect to process 300, in some implementations, the option selection may not correspond to a call handling instruction nor to an audio message presented to the caller. Instead, the option selection may correspond to sending an IM or an e-mail to the caller.

If the option selection corresponds to sending an IM to the caller, the IVRS 542 enables the IM to be sent to the caller telephone 510 (if the caller telephone 510 has IM capabilities) or to a caller computer system (not shown) via an IM system internal or external to the ICSS 540. The IVRS 542 may provide the IM system with the corresponding call destination identity and the calling party identity which may be used, for example, as IM handles to establish an IM session between the user of the call destination computer system 570 that submitted the option to send an IM and the caller telephone 510 or caller computer system. The call destination computer system 570 then sends the IM to the caller telephone 510 or caller computer system. Subsequent IM communications between the caller and the call recipient may then ensue. The IM system may be in communication with or may be part of the online service provider system 160.

In another implementation, the option selection corresponds to sending a voice IM to the caller which may be directed to the caller telephone 510 and played as if responsive. This implementation enables the call recipient to select among several prerecorded soundtracks with which to respond.

If the option selection corresponds to sending an e-mail to the caller, the IVRS 542 sends the e-mail to an e-mail system accessible via the caller telephone 510 (if the caller telephone 510 has e-mail capabilities) or via the caller computer system. The IVRS 542 identifies an e-mail address associated with the caller by accessing the configuration data store based on the call-related information. The e-mail system may be in communication with or may be part of the online service provider system 560. Alternatively, the e-mail system may include the online message server 548.

In another implementation, the call destination computer system 570 does not send the contents of the e-mail to the IVRS 542 for delivery by the IVRS 542 to an e-mail system. Rather, the call destination computer system 570 receives the e-mail address of the caller from the IVRS 542 and directly sends the e-mail to an e-mail system accessible by the caller telephone 510 or caller computer system. The IVRS 542 is informed of the option selection to respond to the caller by e-mail but does not actually partake directly in the delivery of the e-mail.

Receiving an option selection to send an IM or an e-mail does not necessarily dispose of the call. Rather, the IVRS 542 may wait until a call treatment option selection is received to dispose of the call (e.g., by either sending an audio message and disconnecting the call, sending an audio message and redirecting the call, or redirecting the call). Alternatively, after a predetermined interval of time, a default call treatment option selection may dispose of the call. In yet another implementation, the option to send an IM or an e-mail may be coupled with a call treatment option selection. For example, after selecting the option to send an IM, the IM may be sent, an audio message may inform the caller that the IM was sent to his or her calling party identity, and the call may be disconnected.

After or contemporaneous with sending a call handling instruction to the PSTN 530 and/or an audio message to the caller telephone 510, the IVRS 542 generates an updated call notification message for each identified call destination identity that is online and sends the updated call notification messages to the alerts system 564 (726). The alerts system 564 receives the updated call notification messages (728) and sends the updated call notification messages to the corresponding call destination computer systems 570 (730). Each call destination computer system 570 receives an updated call notification message (732) and enables a user to perceive the updated call notification message (734).

If the IVRS 542 does not receive an option selection that disposes of the call after a predetermined interval of time from any of the call destination computer systems 570 that received call notification messages, the IVRS 542 automatically accesses a default option selection corresponding to the account (and stored as an account-level preference) to dispose of the call (736). The IVRS 542 processes the default option selection in accordance with operations 712-734 (738).

If the received option selection corresponds to taking the call, the IVRS 542 generates and sends a request for audio server external and internal resource identifiers to the online audio server 546 (740). The online audio server 546 receives the request for resource identifiers (742), generates the internal and external resource identifiers (744), and sends the resource identifiers to the IVRS 542 (746).

The IVRS 542 receives the audio server internal and external resource identifiers (748). The IVRS 542 accesses and sends a greeting message over the voice path and prompts the caller to leave a message (750). For example, the IVRS 542 may access a greeting message audio file identifier associated with the direct number of the call destination phone 520 from the account record stored in the configuration data store 547. The IVRS 542 may access the message data store 545 using the greeting message audio file identifier to retrieve a greeting message associated with the account. The process 700 may proceed to operations 766-798 which enable the caller to input a voice message, which is recorded and streamed as audio data to the call destination computer systems 570.

Meanwhile, the IVRS 542 generates a call screening message for each call destination identity that is online based on the call screening preferences and sends the call screening message and the external resource identifiers to the call destination computer systems 570 via the alerts system 564 (752). In particular, the alerts system 564 receives the call screening messages for the call destination identities and the external resource identifiers and sends the call screening messages along with format data and the external resource identifiers to the call destination computer systems 570 corresponding to the call destination identities. The receiving of the call screening message and external resource identifier and sending of the call screening message, external resource identifier, and format data is performed in near real time.

Each call destination computer system 570 receives the call screening message, external resource identifier, and format data (754) and enables a user to perceive the call screening message (756). In one implementation, the call destination computer system 570 enables the user to perceive the call screening message as a pop-up window or dialog box that appears on a visual display of the call destination computer system 570. The call destination computer system 570 also establishes a connection with the online audio server 546 using the external resource identifier (758).

The IVRS 542 sends an internal resource identifier and an audio file identifier to the media gateway 543 (760). The media gateway 543 receives the internal resource identifier and audio file identifier (762) and accesses the online audio server 546 using the internal resource identifier (764).

The IVRS 542 receives and plays a greeting message and prompts the caller to input a voice message (766). The greeting message may vary depending on recipient selections made in real time response to the call or may vary according to stored preferences that may be invoked based on calling party identity or phone number.

The caller telephone 510 enables the caller to input a voice message (768). The caller telephone 510 sends the voice message over the voice path as the caller inputs the voice message (770). The IVRS 542 receives the voice message as inputted by the caller (772) and records the voice message as discrete chunks of audio data (774). The IVRS 542 sends the audio data as a data stream to the media gateway 543 (776).

The media gateway 543 receives the stream of audio data (778), copies the stream of audio data, one stream for storage and the other for streaming to the user, and sends the audio file identifier and the copy of the stream of audio data to the message data store 545 (780). The message data store receives the audio file identifier and a copy of the stream of audio data (782). The message data store 545 opens a file associated with the audio file identifier and stores the audio data incrementally as the stream of audio data is received from the media gateway 443 (784). The message data store 545 typically stores the data incrementally and simultaneously as the stream of audio data is received from the media gateway 443.

The media gateway 543 transcodes the stream of audio data using an audio compression scheme such as, for example, MP3 (786) and sends the transcoded audio data stream to the online audio server 546 (788). The online audio server 546 receives the transcoded audio data stream (790) and relates the internal resource identifier to the external resource identifiers (792). The online audio server 546 sends the transcoded audio data to the call destination computer systems 570 over the connections established between the call destination computer systems 570 and the online audio server 546 in operation 758 (794). Alternatively, the call destination computer systems 570 may pull or access the transcoded audio data over the connections established with the online audio server 546 in operation 758.

The call destination computer system 570 receives the audio data (796) and enables a user to perceive the audio data (798). In one implementation example, the call destination computer system 470 enables a user to perceive the audio data by converting the audio data to audio.

The account record containing the audio file identifiers of deposited voice messages for a given account may be subsequently accessed by the online message server 548 or by an external voice mail or unified messaging system to retrieve the audio file identifiers. The audio file identifiers may then be used to access the deposited voice messages in the message data store 545 associated with the account. The IVRS 542 also may access the account record to retrieve deposited voice messages associated with the account.

Figure 8:
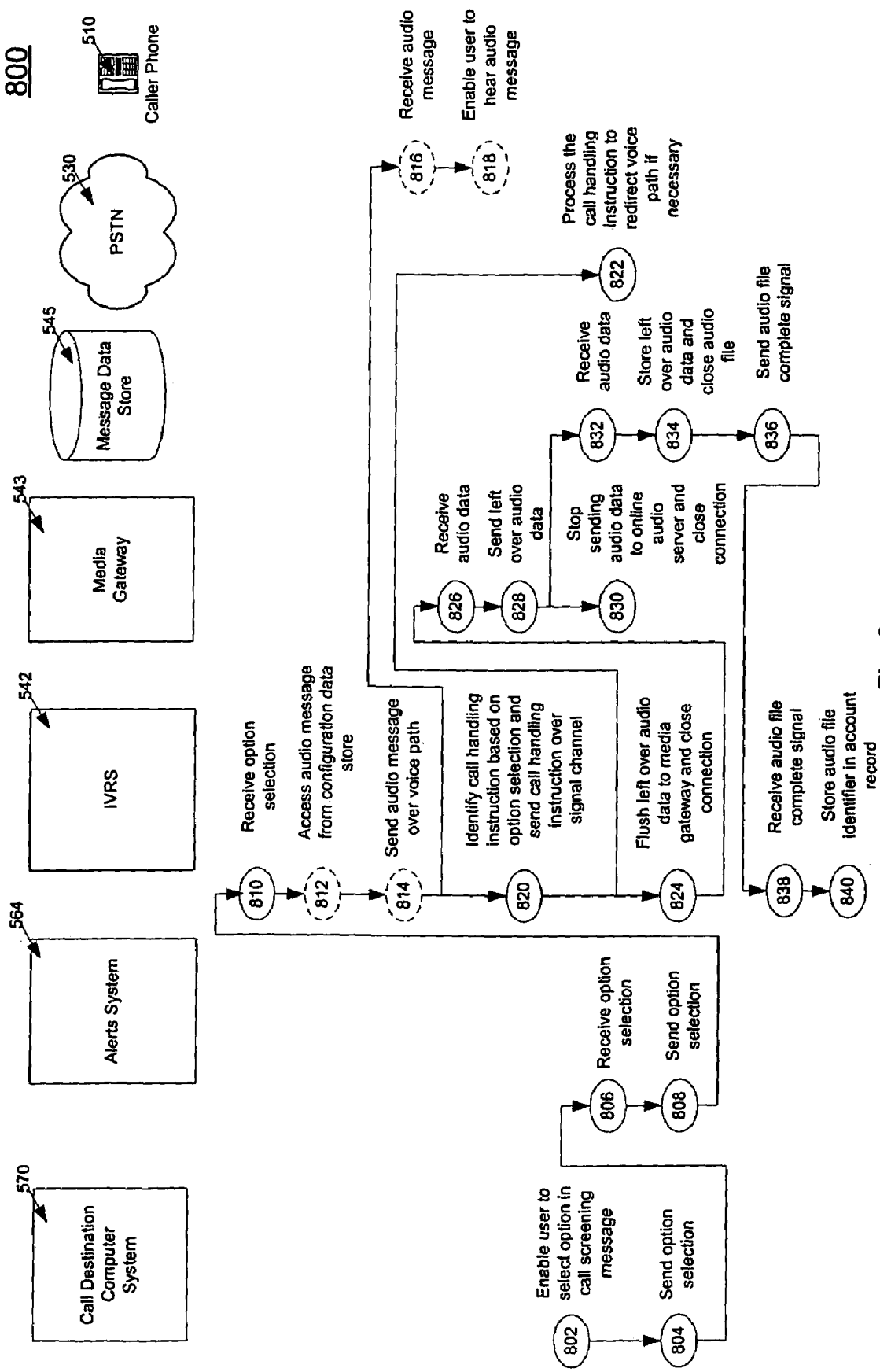
FIG. 8 is a flow chart illustrating a process for responding to a user selection of an option in a call screening message.

While a call recipient is listening to a voicemail being deposited, the call recipient may elect among various call handling options. For example, the call recipient may elect to terminate the call, to redirect the call to an inputted number, or to take the call. FIG. 8 describes an implementation of a process useful in enabling such selections. In particular, FIG. 8 shows a process 800 for responding to a user selection of an option in a call screening message. For convenience, particular components described with respect to FIG. 5 are referenced as performing the process 800. However, similar methodologies may be applied in other implementations where different components are used to define the structure of the system, or where the functionality is distributed differently among the components shown by FIG. 5.

The call destination computer system 570 enables a user to select an option offered in the call screening message prior to completion of the deposit of the voice message by the caller (802). The call destination computer system 570 sends the option selection to the alerts system 564 (804). If the option selection corresponds to sending an IM or an e-mail, the call destination computer system 570 prompts the user to input the contents of the IM or e-mail. The contents of the IM or e-mail are sent as part of the option selection to the alerts system 564. If the option selection corresponds to redirecting the call to a dynamically inputted number, the call destination computer system 570 prompts the user to input the number and the number is sent as part of the option selection to the alerts system 564.

The alerts system 564 receives the option selection (806) and sends the option selection to the IVRS 542 (808). The alerts system 564 is configured to receive and send the option selection to the IVRS 542 in near real time.

The IVRS 542 receives the option selection (810). Like process 400, process 800 assumes that that the option selection corresponds to accepting (i.e., redirecting the call back to the direct number of the call destination phone 520) or redirecting the call to another telephone number. However, if the option selection corresponds to refusing or ignoring the call, the IVRS 542 stops recording the call, disconnects the call, and in some implementations, deletes the audio file that stores the incomplete voice message.

In some implementations, the option selection may not correspond to accepting or redirecting the call to another telephone number. Instead, the option selection may correspond to sending an IM or an e-mail to the caller as discussed previously. Receiving an option selection to send an IM or e-mail does not necessarily end the recording of the call. In some implementations, the option to send an IM or an e-mail may be coupled with a call treatment option selection.

As shown in process 800, if the option selection corresponds to accepting the call or forwarding the call to another telephone number, the IVRS 542 may access a stored outbound audio message from the message data store 545 using the appropriate outbound audio message identifier corresponding to the option selection (812). The IVRS 542 may send the outbound audio message to the caller telephone 510 over the voice path (814). The caller telephone 510 receives the outbound audio message (816) and enables a user to hear the outbound audio message (818).

The IVRS 542 also identifies a call handling instruction corresponding to the option selection and sends the call handling instruction over the signal channel to the PSTN 530 (820). The PSTN 530 processes the call handling instruction and forwards or redirects the voice path accordingly (822). The call handling instruction may include the direct number of the redirected call destination.

If the option selection is offered in a call screening message and corresponds to a call handling instruction that interrupts the deposit of the voice message, the IVRS 542 flushes any left over audio data to the media gateway 543 prior to closing the connection between the IVRS 542 and the media gateway 543 (824). The media gateway 543 receives the last audio data from the IVRS 542 (826) and sends a copy of the audio data along with a copy of any left over audio data within the media gateway 543 to the message data store 545 (828). The media gateway 543 also stops sending audio data to the online audio server 546 and closes the connection between the media gateway 543 and the online audio server 546 (830).

The message data store 545 receives the audio data (832), stores the audio data, and closes the audio file (834). The message data store 545 sends an audio file complete signal (836) to the IVRS 542. The IVRS 542 receives the audio file complete signal (838) and stores the audio file identifier in the account record corresponding to the direct number of the call destination phone 520 (840). The partial voice message is thus stored in the message data store 545 and available for subsequent retrieval and playback.

Figure 9A:
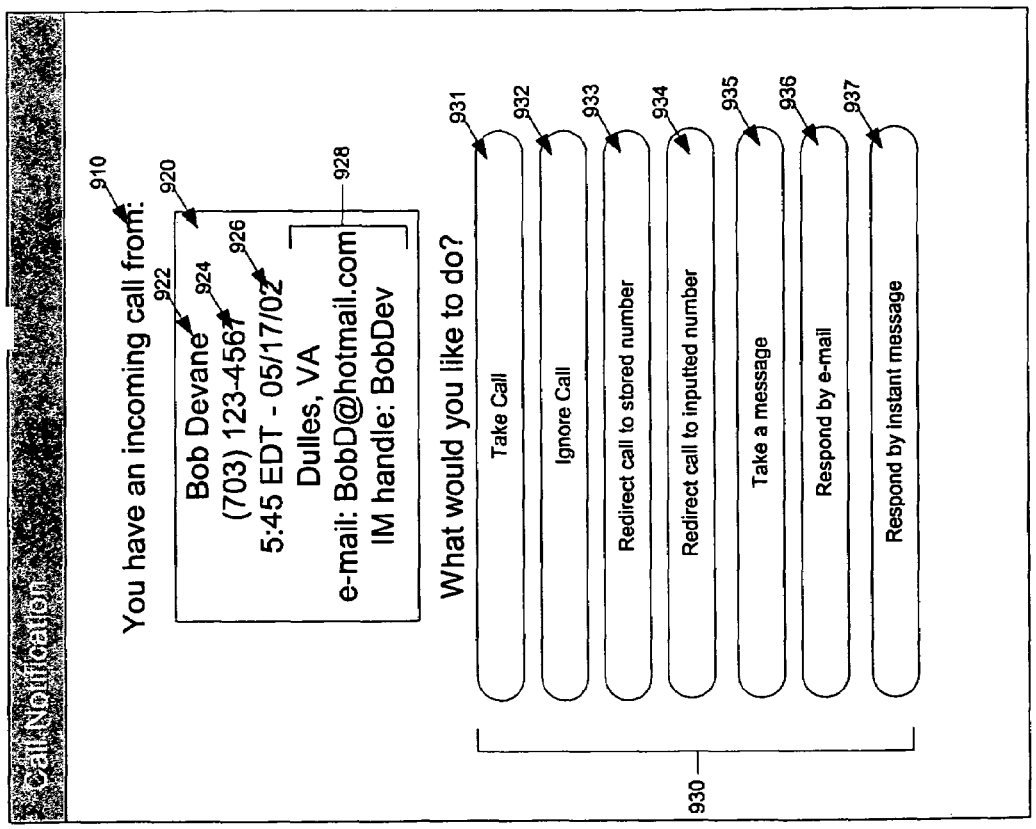
FIG. 9A is a user interface generated in response to receipt of a call notification message.

FIG. 9A shows a user interface 900 that may be presented to the user by the call destination computer system 170, 570 upon receipt of a call notification message. The user interface 900 includes a statement 910 informing the user of the existence of an incoming call and includes caller-related information 920. The caller-related information 920 may include the name of the caller 922 (e.g., Bob Devane), the direct number of the caller telephone 924 (e.g., (703) 123-4567), the time and date when the call was received 926 (e.g., 5:45 EDT on May 17, 2002), and other caller-related information 728 that may be determined based on the direct number of the caller phone 110, 510. The other caller-related information 728 may include, for example, the geographic location of the caller (e.g., Dulles, Va.), the—email address, and the online identity or IM handle of the caller. Moreover, the caller-related information may include information stored in an address book or calendar that is accessible based on the direct number of the caller phone 110, 510 (e.g., Meeting scheduled with Bob on Saturday Jul. 12, 2003). Such information may be stored locally at the call destination computer system 170, 570 or may be accessible from a remote device across the data network 150, 550.

The call notification user interface 900 also includes a set of option buttons 930 that may be selected by the user to react to the call. The option buttons 930 may include, for example, an option button to take the call 931, an option button to ignore the call 932, an option button to redirect the call to a stored number 933 (i.e., a number previously stored by the user), an option button to redirect the call to an inputted number 934 (i.e., a number not previously stored by the user and dynamically inputted by the user upon selection of this option), an option button to take a message 935, an option button to respond to the call by sending an e-mail 936, and an option button to respond to the call by sending an IM 937.

Selecting the option button to take the call 931 results in the call being redirected to the direct number of the call destination phone 120, 520. Selecting the option button to ignore the call 932 closes or otherwise disables the call notification user interface 900.

Figure 9B:
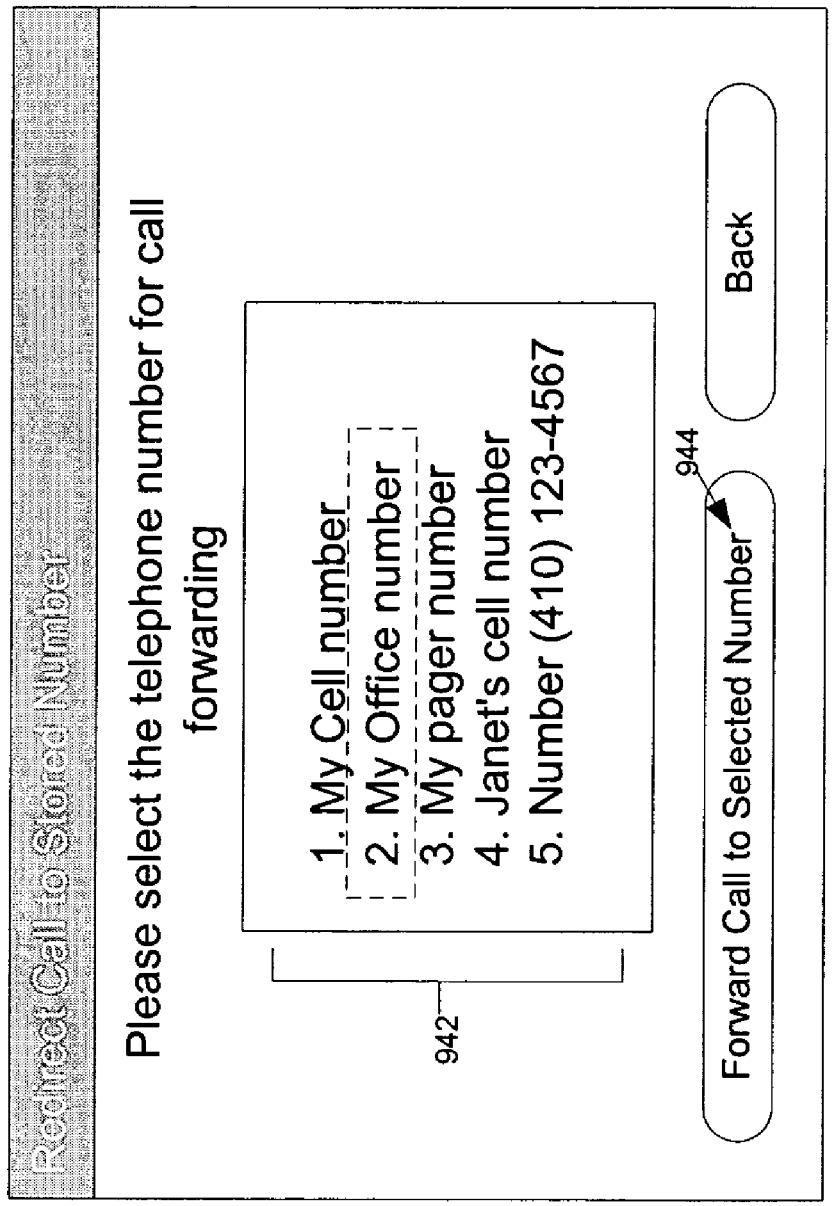
FIGS. 9B, 9C, 9D, and 9E are user interfaces generated in response to selection of call handling options.

Selecting the option button to redirect the call to a stored number results in the user being able to select from one or more stored numbers to which the call will be redirected. For example, the user may be provided with a list that includes his or her cell telephone number, office telephone number, and home telephone number and may be prompted to select one telephone number from the list for call redirection. The corresponding direct numbers are typically setup by the user when configuring their call notification/screening preferences. In another implementation, the call destination computer system 170, 570 does not prompt the user to select from a list but rather automatically determines which telephone number is appropriate based on information related to the call recipient (e.g., if the call destination computer system 170, 570 has telephone capabilities, the call may be redirected to the direct number associated with the call destination computer system 170, 570). FIG. 9B is an example of a user interface 940 that may be used to enable a call recipient to select a stored number to which the call may be redirected. The call recipient selects a number from a list 942 and selects a redirect call button 944 to complete the call redirection.

Figure 9C:
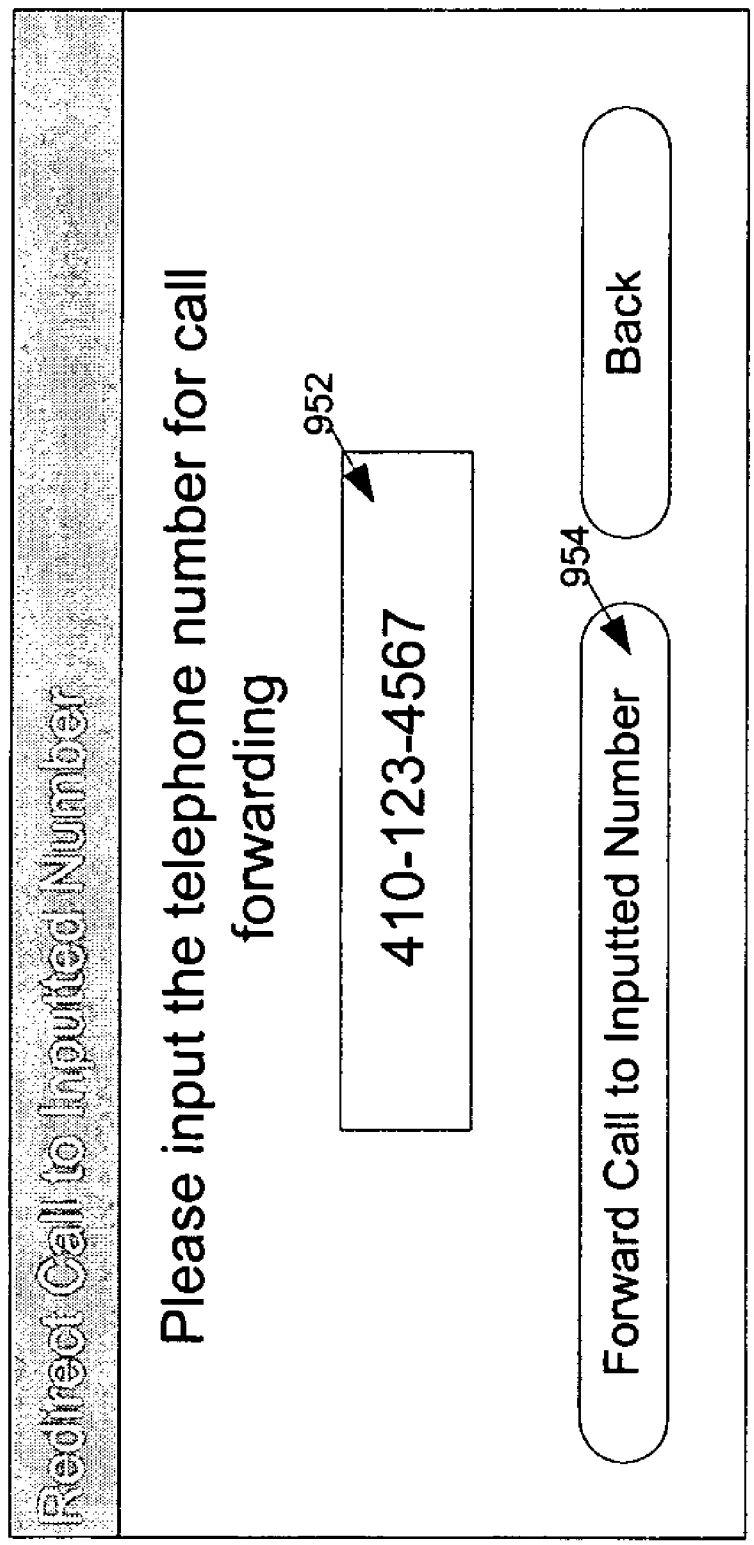

Selecting the option button to redirect the call to an inputted telephone number 934 enables the call recipient to manually specify the direct number to which the call should be redirected. For example, selection of the option button 934 may result in a pop-up window in which the call recipient may manually input or type-in the direct number of the specified phone. The direct number of the specified phone is sent by the call destination computer system 170, 570 to the ICSS 140, 540, and the ICSS 140, 540 instructs the telephone network 130, 530 to redirect the call accordingly. FIG. 9C is an example of a user interface 950 that may be used to enable a call recipient to manually specify the direct number to which the call should be redirected. The call recipient manually inputs the direct number in a direct number field 952 and selects a redirect call button 954 to complete the call redirection.

Selecting the option button to take a message 935 results in the ICSS 140, 540 prompting the caller to deposit a voice message. The ICSS 140 sends call screening messages to the call destination computer systems 170, 570 which are then displayed to the users via a call screening user interface 1000 (see FIG. 10). Typically, the call screening user interface 1000 replaces the call notification user interface 900.

In another implementation, selection of the option button 935 results in the call recipient being asked whether he or she wishes to screen the voice message as it is being deposited. If the call recipient indicates a desire to screen the voice message, the ICSS 140 sends a call screening message and audio data to the call destination computer system 170, 570 which is then presented to the call recipient. If the call recipient does not indicate a desire to screen the voice message, the ICSS 140 does not send a call screening message nor audio data to the call recipient's call destination computer system 170, 570, and accordingly, the call recipient is neither able to hear the voice message as it is being deposited nor react to the call while the voice message is being deposited. Alternatively, the user interface 900 may include two option buttons to replace option button 935. One of the two option buttons may be selected to take a voice message and screen the voice message while the message is being deposited, and the other option button may be selected to take a voice message without screening the voice message as it is being deposited.

Selecting the option button to send an e-mail 936 or instant message 937 to the caller results in the call destination computer system 170, 570 prompting the user to input the contents of the IM or e-mail. In some implementations, the call destination computer system 170, 570 also may prompt the user to input an IM handle or e-mail address associated with the caller and/or user. The IM/e-mail content and the IM handle(s)/e-mail address(es) are sent as part of the option selection to the ICSS 170, 570. The option button to send an instant message 937 may be disabled, removed, or grayed out if the calling party is not online. Sending an instant message to the caller begins an instant messaging session between the caller and the call recipient.

In some implementations, an outbound audio message may be sent to the call destination telephone 170, 570 prior to carrying out the task associated with a selected option button. For example, selecting the take the call button 931 may result in an outbound audio message being sent to the caller prior to the call being redirected to the direct number of the call destination telephone 120, 520 or another previously specified or determined telephone. The audio message may be: "Please stay on the line. I will be picking up the phone shortly." The outbound audio message also may be chosen by the caller through, for example, a pop-up window after selecting one of the option buttons 930. For example, selecting the option button 933 to redirect the call to a stored cell phone number may launch a pop-up window containing two different outbound audio messages that may be selected: (1) "Please stay on the line. Your call is being redirected to my cell phone"; and (2) "I am currently extremely busy. If this call is important, stay on the line and you will be redirected to my cell phone, otherwise, please hang up and I will call you back shortly."

In another implementation, the user interface 900 may include an additional option to customize audio to be played to the calling party. For example, the user interface 900 may enable a call recipient to select prestored clips to be heard by the calling party or type into a text box which is then converted to audio and delivered to the caller telephone 110, 510 or caller computer system.

The user interface 900 may vary depending on the capabilities of the call destination computer system 170, 570 and the format data received from the online service provider system 160, 560. As mentioned before, call destination computer systems 170, 570 with more limited capabilities may provide less caller-related information 920 and less options 930 while call destination computer systems 170, 570 with greater capabilities may provide more caller-related information 920 and more options 930.

Figure 9D:
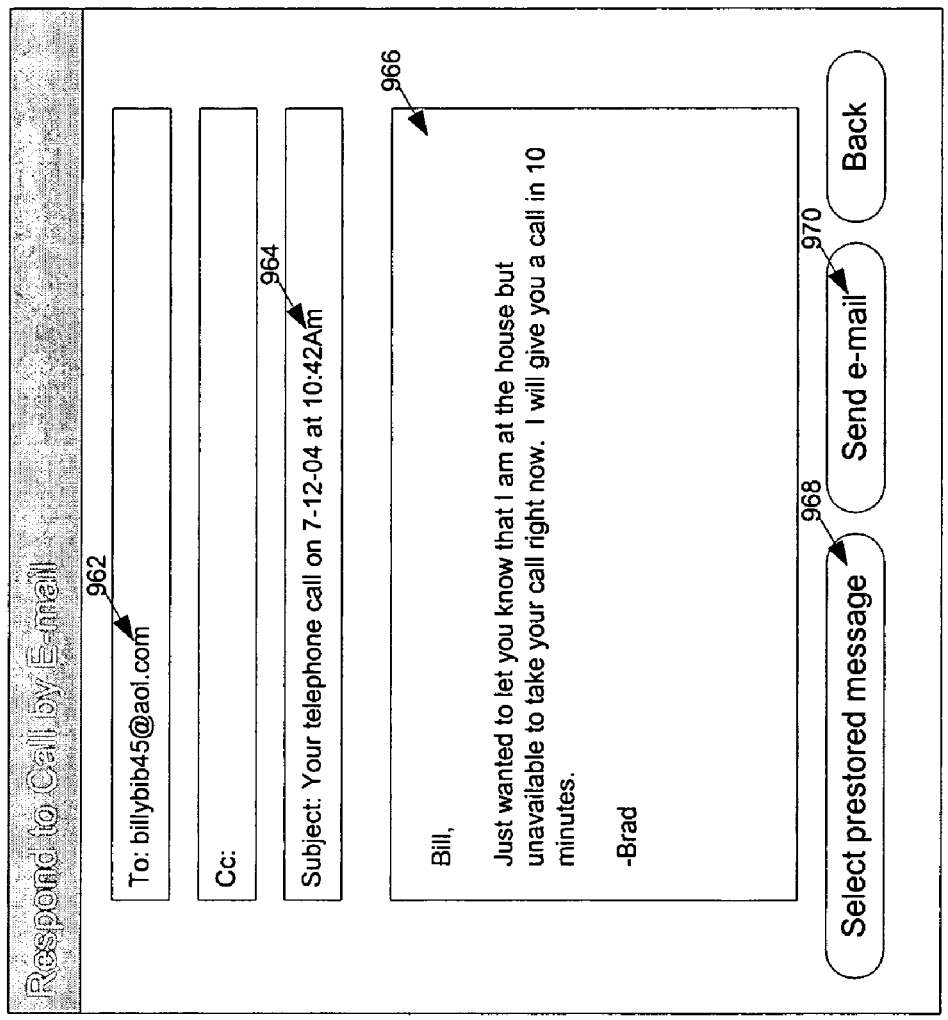

FIG. 9D shows an example of a user interface 960 which may be presented to a call recipient upon selection of the option button to send an e-mail 936. Population of a caller e-mail address field 962 with the e-mail address of the caller is triggered in response to selection of the option button 936 (assuming the e-mail address of the caller is stored by or otherwise accessible to the ICSS 140, 540 or the call destination computer system 170, 570). The call recipient may change the contents of the address field 962 as desired (e.g., the call recipient may change the contents of the address field 962 if the e-mail address provided by the ICSS 140, 540 no longer corresponds to the caller).

A subject field 964 is typically automatically populated with a statement indicating that the e-mail is in response to a call and may optionally include call-related information to identify the call (e.g., the time and date of the call). The call-related information may include, for example, ANI information. The call recipient may change the contents of the subject field 964 as desired.

The call recipient may input a message into a message field 966. In some implementations, the message field 966 may be automatically populated with a default message to the caller. The call recipient also may input a message by selecting a prestored message button 968 and choosing from one or more prestored messages generic or specific to the caller and/or call recipient. All or a portion of the prestored messages may dynamically change based on call-related information (e.g., the time of the call and/or the identity/type of device that received the call). The call recipient may send the e-mail to the caller by selecting the send e-mail button 970.

Figure 9E:
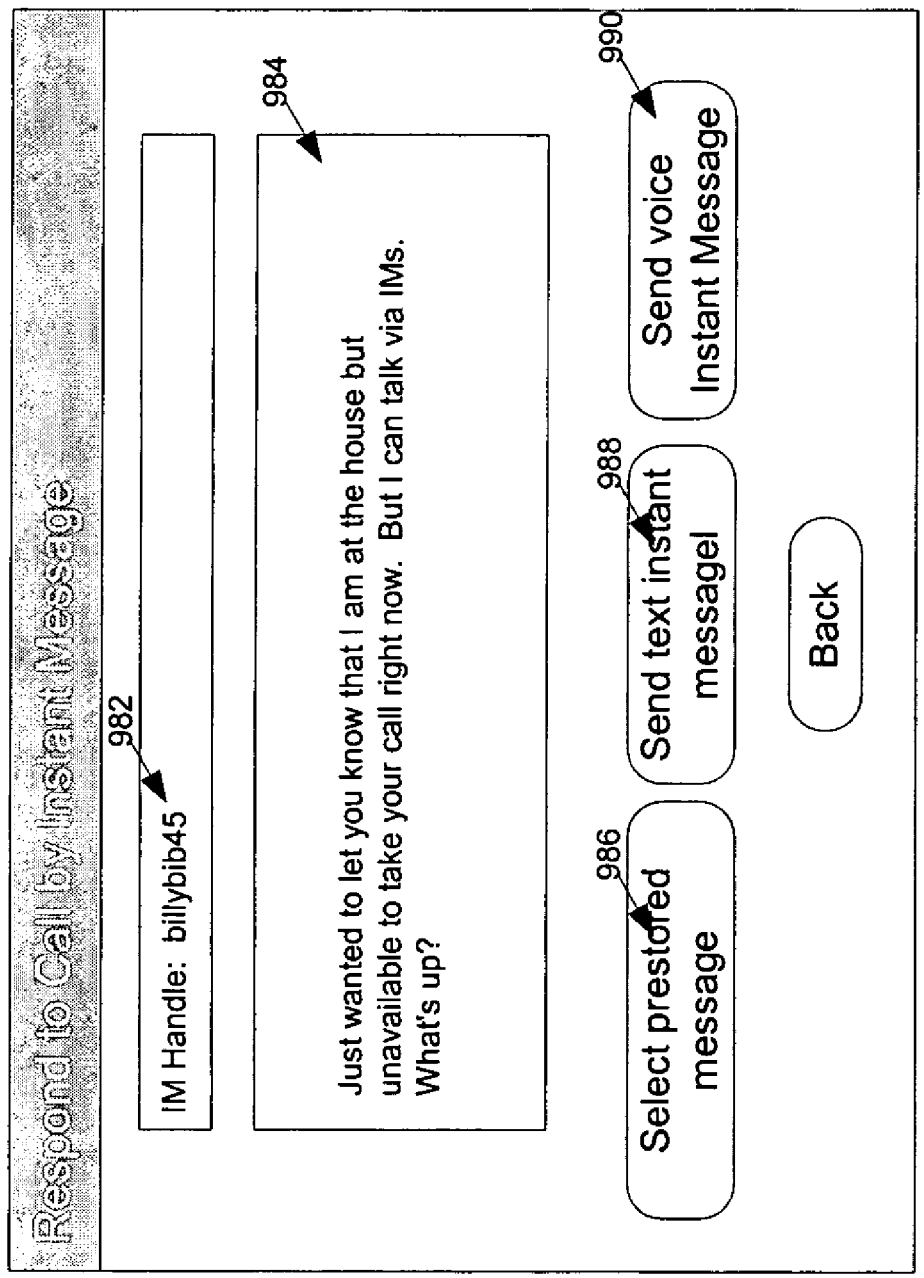

FIG. 9E shows an example of a user interface 980 which may be presented to a call recipient upon selection of the option button to send an instant message 937. A caller IM handle field 982 is typically automatically populated with the IM handle of the caller (assuming the IM handle of the caller is stored by or otherwise accessible to the ICSS 140, 540 or the call destination computer system 170, 570). The call recipient may change the contents of the IM handle field 982 as desired (e.g., the call recipient may change the contents of the IM handle field 982 if the IM handle provided by the ICSS 140, 540 no longer corresponds to the caller).

The call recipient may input a message into a message field 984. In some implementations, the message field 984 may be automatically populated with a default message to the caller. For example, the message field 984 may include a default initial statement such as "I can't come to the phone right now, but I can talk with you through instant messaging." The call recipient may then input additional text into the message field 984 to follow the default initial statement. The call recipient also may input a message by selecting a prestored message button 986 and choosing from one or more prestored messages generic or specific to the caller and/or call recipient. All or a portion of the prestored messages may dynamically change based on call-related information (e.g., ANI information and/or the identity/type of device that received the call). The call recipient may send the instant message to the caller by selecting the send instant message button 988.

If the call recipient wishes to send a voice instant message to the caller, the call recipient may select a send voice instant message button 990. After selecting the send voice instant message button 990, the call recipient is prompted to input an audio message for delivery to the caller telephone 110, 510 (or to a caller computer system). The audio message may be inputted using an audio input device of the call destination computer system 170, 570. Alternatively, the audio message may be selected from one or more prestored audio messages generic or specific to the caller and/or call recipient. All or a portion of the prestored audio messages may dynamically change based on call-related information.

Figure 10A:
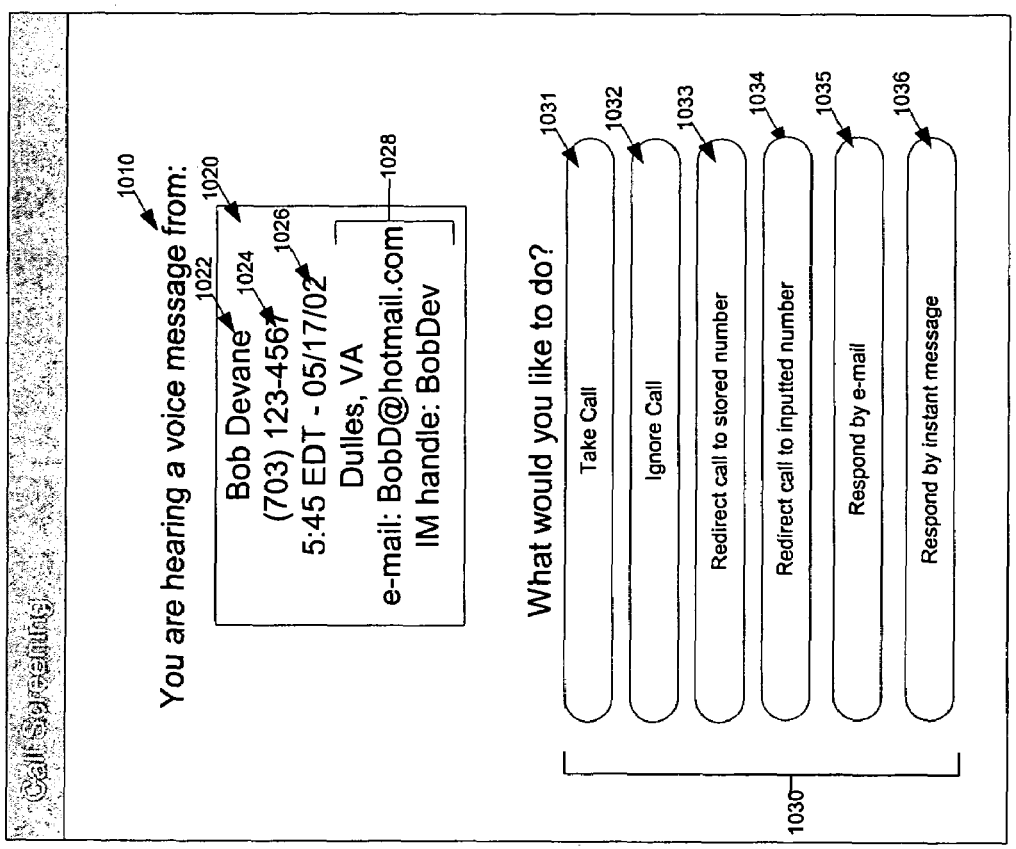
FIGS. 10A and 10B are user interfaces generated in response to receipt of a call screening message.

FIG. 10A shows a user interface 1000 that may be presented to the user by the call destination computer system 170, 570 upon receipt of a call screening message. The call screening user interface 1000 includes a statement 1010 informing the user that the user is hearing a voice message being deposited by a caller. The call screening user interface 1000 is similar to the call notification user interface 900 generated by the call destination computer system 170, 570 in response to receipt of a call notification message. The main difference between the two user interfaces is that the call screening user interface 1000 is presented when the user of the call destination computer system 170, 570 is able to listen to a voice message being deposited by the caller. In contrast, the call notification user interface 900 for a call notification message is presented prior to the ICSS 140, 540 accepting the call.

The call screening user interface 1000 includes option buttons 1030 corresponding to option buttons 930 of the call notification user interface 900. Selecting the option button to take the call 1031 results in the call being redirected to the direct number of the call destination phone 120, 520. Selecting the option button to ignore the call 1032 closes or otherwise disables the user interface 1000 and stops converting the audio data received from the ICSS 140, 540 into audio. Voice message, however, is still deposited by the calling party. In another implementation, selecting the option button to ignore the call 1032 does not close the user interface 1000 but rather disables further selections of option buttons 1030 while continuing to convert the audio data received from the ICSS 140, 540 into audio. The call screening user interface 1000 may subsequently close when the audio message finishes. Selecting the option buttons 1033-1036 results in the call being processed as discussed above with respect to option buttons 933, 934, 936, and 937, respectively. Option buttons 1036 and/or 1037 may be optionally presented depending upon the presence of the caller in an online context (e.g., whether logged into an IM system or e-mail system) or the availability or lack thereof of the caller's screen name (i.e., IM handle) or e-mail address. The call screening user interface 1000 also may optionally include a status section that lists the identities that received call screening messages.

Figure 10B:
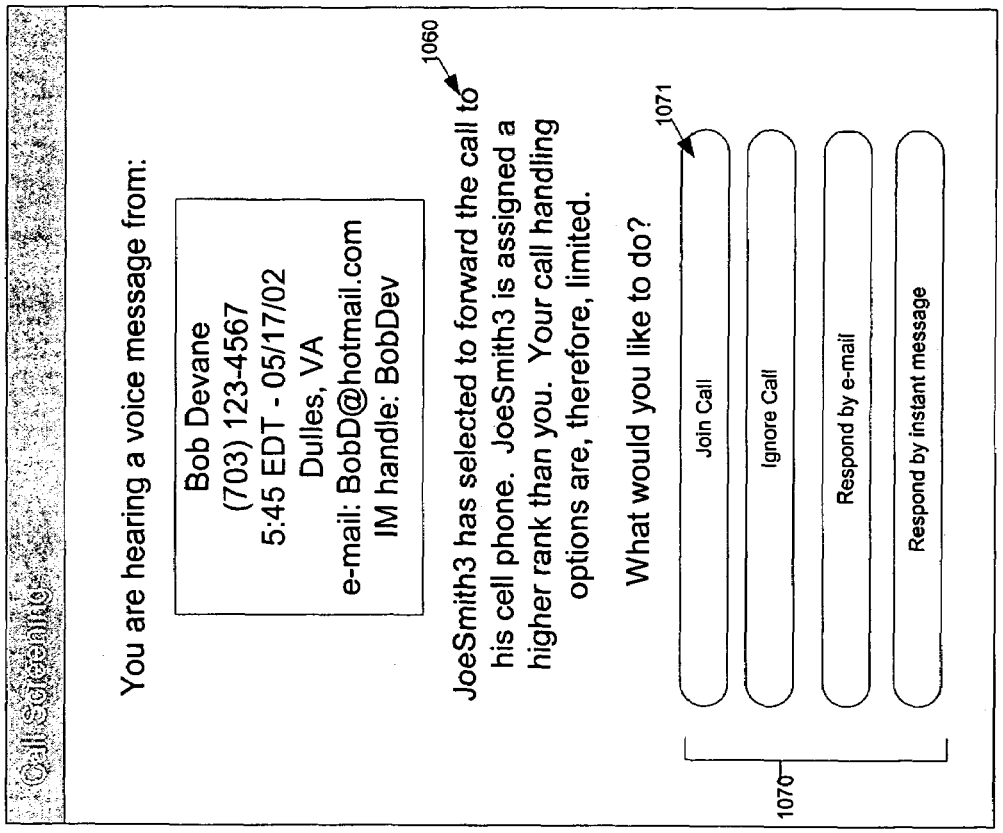
Figure 10C:
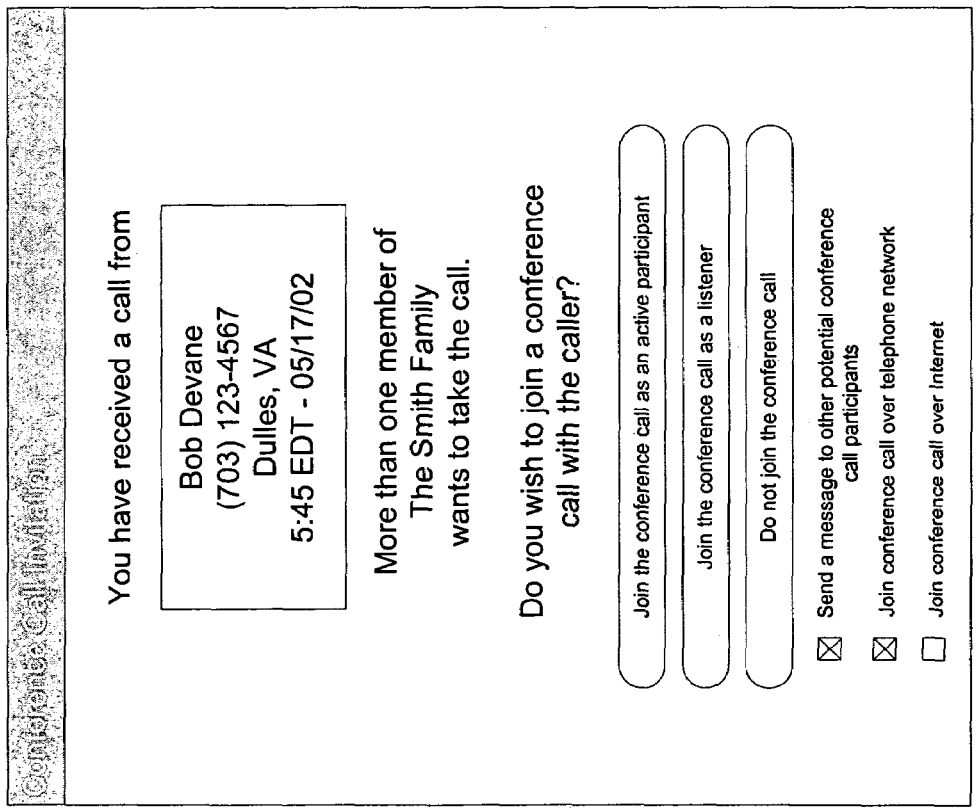
FIG. 10C is a user interface illustrating a conference call invitation.

In implementations in which the ICSS 140, 540 waits a predetermined interval of time to receive option selections in response to call screening messages (i.e., the ICSS 140, 540 does not use a first-come first-serve conflict resolution algorithm), the ICSS 140, 540 may send updated call screening messages to call recipients. FIG. 10B shows an example of an updated call screening message user interface 1050 displayed to a call destination identity "jennysmith3" after a call destination identity "joesmith3" selected the option to "redirect the call to a stored number" in response to a call screening message. The call screening user interface 1050 includes a statement 1060 informing the user identity jennysmith3 that an option selection has been received from joesmith3 at the ICSS 140, 540. The statement 1060 also identifies which option was selected and informs jennysmith3 whether she may trump or otherwise modify the option selected by joesmith3. In this example, the ICSS 140, 540, uses a rank-based conflict resolution algorithm, and joesmith3 has been assigned a rank higher than that assigned to jennysmith3. Jennysmith3, therefore, may not trump the option selected by joesmith3. Accordingly, call handling option buttons 1070 presented to jennysmith3 are limited to options that do not conflict with the option already selected by joesmith3. The call handling option buttons 1070 also may include an option button 1071 to join the call that was redirected by joesmith3. Selection of option button 1071 may launch a conference call between the caller, jennysmith3 and joesmith3 in the same manner as discussed in U.S. patent application Ser. No. 10/895,389, hereby incorporated by reference in its entirety. FIG. 10C shows an example of a conference call invitation user interface 1080 that may be presented to the call recipient upon selection of the option button 1071.

Figure 11:
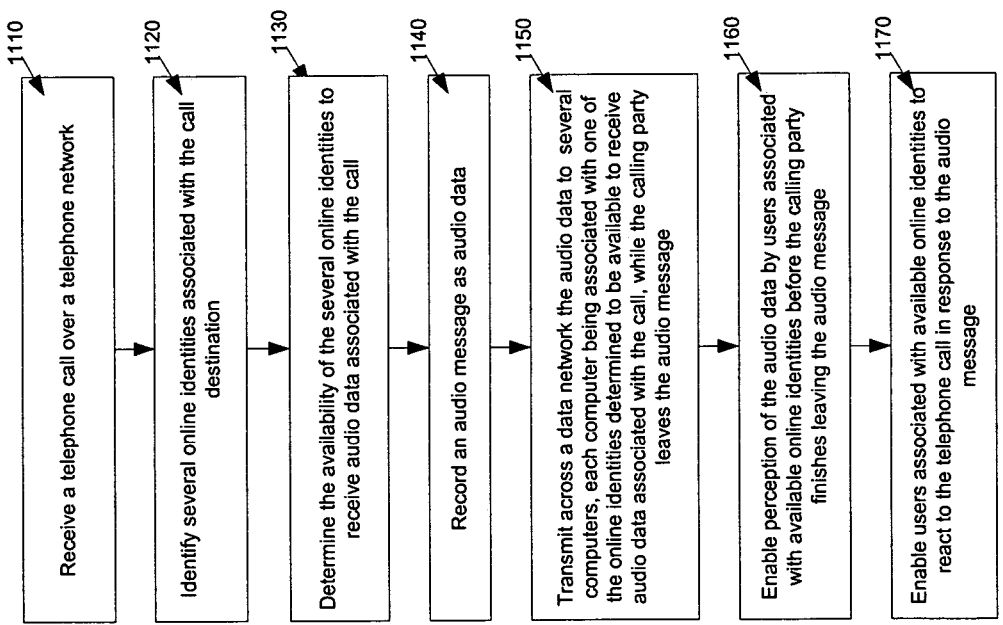
FIG. 11 is a flow chart illustrating a process for screening a telephone call from a calling party to multiple called parties.

FIG. 11 shows a process 1100 for screening a telephone call from a calling party to multiple called parties associated with a call destination telephone number. A telephone call is received over a telephone network (1110). Several online identities associated with the call destination telephone number are identified (1120). Each online identity typically corresponds to a called party related to the call destination telephone number (e.g., the members of a family when the call destination telephone number is the telephone number corresponding to the family's residence). The availability of the online identities to receive audio data associated with the call is determined (1130). An online identity may be presumed to be available to receive audio data if the online identity is currently online and the called party has not otherwise expressed a preference to not receive audio data associated with the calling party.

An audio message from the calling party is recorded as audio data (1140). The audio data is transmitted across a data network to several computers, each computer being associated with an available online identity, while the calling party is leaving the audio message (1150). The audio data is typically recorded while simultaneously or substantially simultaneously being transmitted across the data network to the several computers. In some implementations, the audio data is transcoded using an audio compression scheme prior to transmitting the transcoded audio data to the several computers of the called parties.

The called parties perceive the audio data before the called party finishes leaving the audio message (1160). The called parties typically perceive the audio data through conversion of the audio data into audio. The called parties may react to the telephone call in response to the audio message (1170). For example, the called parties may react to the telephone call by ignoring the call, taking the call, or redirecting the call to another direct number. Additionally or alternatively, the called parties may send an outbound audio message to the calling party. If conflicting reactions are received from the called parties, a conflict resolution algorithm may be used to select which reaction controls disposition of the call.

Figure 12:
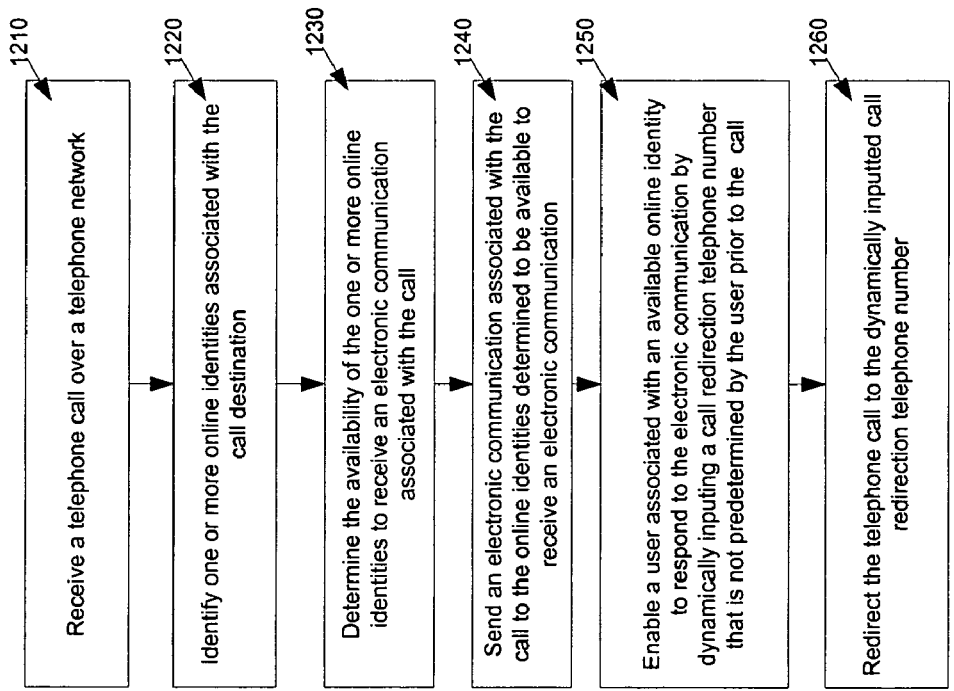
FIG. 12 is a flow chart illustrating a process for responding to a telephone call by redirecting the telephone call to a telephone number dynamically inputted by a called party.

FIG. 12 shows a process 1200 for responding to a telephone call directed to a call destination telephone number by redirecting the telephone call to a telephone number that is dynamically inputted by a called party. A telephone call from a calling party is received over a telephone network (1210). One or more online identities associated with the call destination telephone number are identified (1220). Each online identity typically corresponds to a called party related to the call destination telephone number. The availability of the one or more online identities to receive an electronic communication associated with the call is determined (1230). An online identity may be presumed to be available to receive an electronic communication if the online identity is currently online and the called party has not otherwise expressed a preference to not receive an electronic communication associated with the calling party.

An electronic communication associated with the call is sent to the available online identities of the call (1240). The electronic communication may be a call notification message or a call screening message. The called parties corresponding to the available online identities may respond to the electronic communication by dynamically inputting a call redirection telephone number (1250). The call redirection telephone number is "dynamically inputted" in that it is not stored or determined by the called party prior to the call. Rather, the called party determines the telephone number after the call by, for example, directly inputting the call redirection telephone number. Referring to the user interface 950 shown in FIG. 9C, the called party may input or type in the call redirection telephone number in the direct number field 952 and may then select the redirect call button 954. The call is then redirected to the call redirection telephone number (1260).

Figure 13:
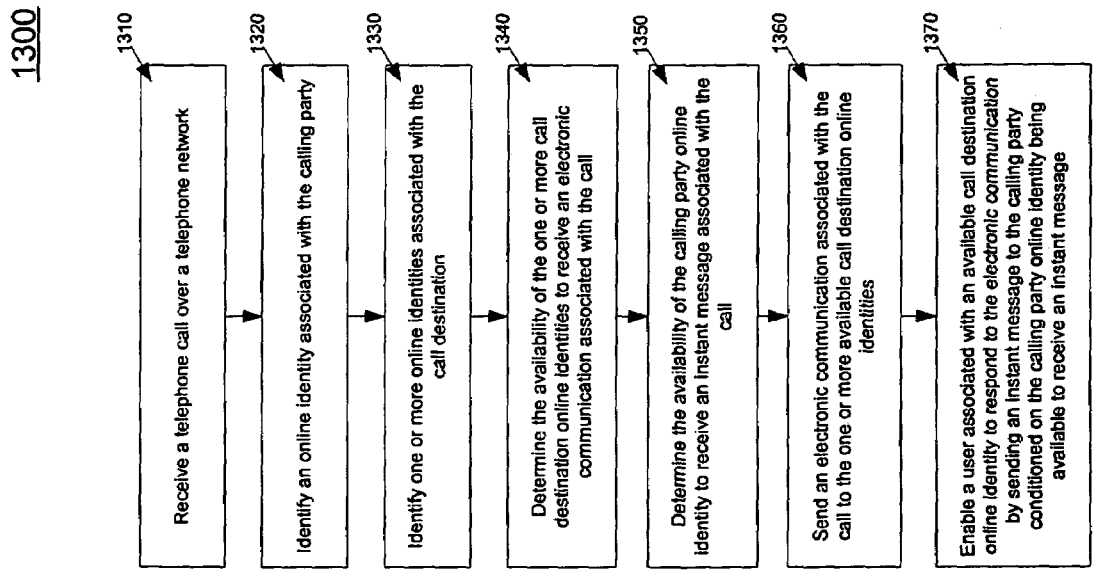
FIGS. 13 and 14 are flow charts illustrating processes for responding to a telephone call by sending an instant message from a called party to the calling party.

FIG. 13 shows a process 1300 for responding to a telephone call from a calling party to one or more called parties by sending an instant message from a called party to the calling party. The called parties are associated with a call destination telephone number. A telephone call from a calling party is received over a telephone network (1310). An online identity associated with the calling party is identified ("calling party online identity")(1320). The calling party online identity may be an IM handle. One or more online identities associated with the call destination telephone number are identified ("call destination online identities") (1330). Each call destination online identity maybe an IM handle and typically corresponds to a called party related to the call destination telephone number.

The availability to receive an electronic communication associated with the call is determined for the one or more call destination online identities (1340). A call destination online identity may be available to receive an electronic communication if the call destination online identity is currently online and the called party has not otherwise expressed a preference to not receive an electronic communication associated with the calling party (e.g., the preferences associated with the call destination online identity may indicate that the calling party is on a "black list").

The availability to receive an instant message associated with the call is determined for the calling party online identity (1350). The calling party online identity may be available to receive an instant message if the calling party online identity is currently online.

An electronic communication associated with the call is sent to the one or more available call destination online identities (1340). The electronic communication may be a call notification message or a call screening message. A user corresponding to an available call destination online identity may respond to the electronic communication by sending an instant message to the calling party conditioned on the calling party online identity being available to receive an instant message (1350).

In another implementation, the user may respond to the electronic communication by sending an instant message to the calling party conditioned on the calling party online identity being available to receive an electronic communication specifically from the user. The calling party online identity may be available to receive an electronic communication specifically from the user if the calling party online identity is currently online and the calling party has not otherwise expressed a preference to not receive an electronic communication associated with the user (e.g., the preferences associated with the calling party online identity may indicate that the user is on a "black list").

In another implementation, the user may respond to the electronic communication by sending an e-mail to the calling party. In this implementation, operation 1320 is replaced by identifying an e-mail address associated with the calling party; operation 1350 is eliminated; and operation 1370 is replaced by enabling a user associated with a call destination online identity to respond to the electronic communication by sending an e-mail to the calling party.

Figure 14:
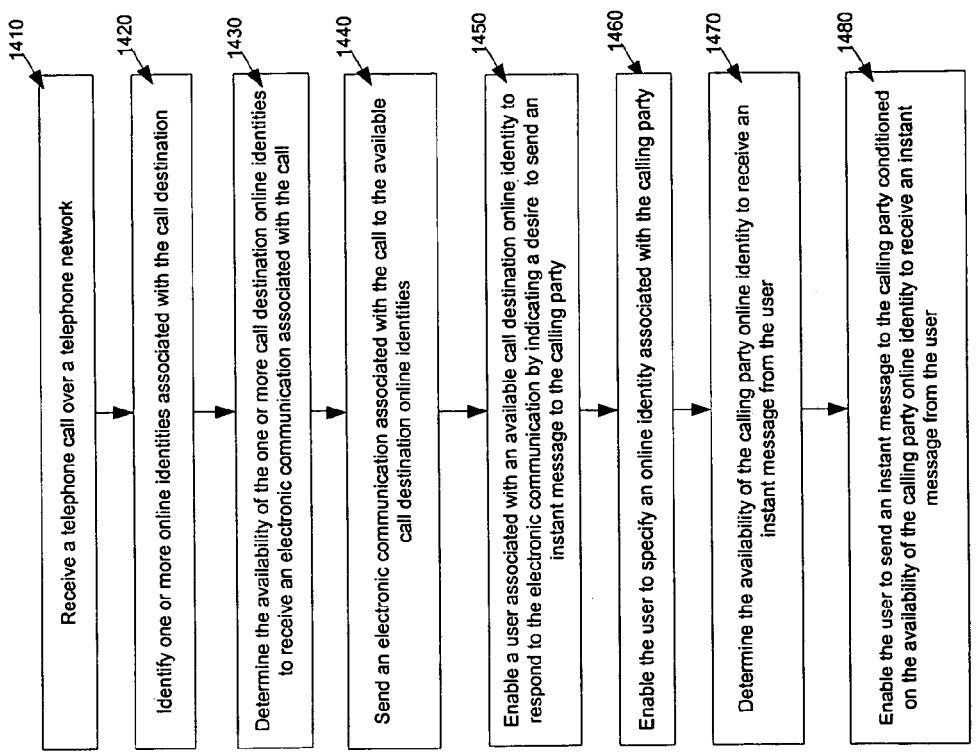

FIG. 14 shows another process 1400 for responding to a telephone call from a calling party to one or more called parties by sending an instant message from a called party to the calling party. The called parties are associated with a call destination telephone number. A telephone call from a calling party is received over a telephone network (1410). One or more online identities associated with the call destination telephone number are identified ("call destination online identities") (1420). The availability to receive an electronic communication associated with the call is determined for the one or more call destination online identities and for the calling party online identity (1430). A call destination online identity may be available to receive an electronic communication if the call destination online identity is currently online and the called party has not otherwise expressed a preference to not receive an electronic communication associated with the calling party.

An electronic communication associated with the call is sent to the available call destination online identities (1440). The electronic communication may be a call notification message or a call screening message. A user corresponding to an available call destination online identity may respond to the electronic communication by indicating a desire to send an instant message to the calling party (1450). For example, the user may indicate a desire to send an instant message by selecting an option presented in a user interface to send an instant message to the calling party (e.g., selecting an option button presented in a user interface).

The user may specify an online identity associated with the calling party (1460). For example, the user may input the calling party online identity directly via a user interface or may select the calling party online identity from among a list of online identities presented by a user interface. The calling party online identity may be the IM handle of the calling party. In another implementation, the user also may input or select his or her IM handle, which may differ from his or her call destination online identity. In another implementation, the calling party is informed that the user wishes to send an IM to the calling party and is prompted to input his or her online identity.

The availability to receive an instant message from the user is determined for the calling party online identity (1470). A calling party online identity may be presumed to be available to receive an electronic communication if the calling party online identity is currently online and the calling party has not otherwise expressed a preference to not receive an electronic communication associated with the user. The user may then send an instant message to the calling party conditioned on the calling party online identity being available to receive an instant message from the user (1480).

In another implementation, the user may respond to the electronic communication by sending an e-mail to the calling party. In this implementation, operation 1450 is replaced by enabling a user associated with an available call destination online identity to respond to the electronic communication by indicating a desire to send an e-mail to the calling party; operation 1460 is replaced by enabling the user the specify an e-mail address associated with the calling party; operation 1470 is eliminated; and operation 1480 is replaced by enabling the user to send an e-mail to the calling party.

A number of features have been described. Nevertheless, it will be understood that various modifications may be made. For example, the systems and processes refer to a voice path and a signaling channel. In some implementations, the voice path and the signaling channel are separated (i.e., out-of-band signaling). In other implementations, the voice path and the signaling channel are integrated into one channel (i.e., in-band signaling) that handles the transmission of audio data as well as the transmission of call handling data.

In another implementation, the call notification message is not used. Instead, the ICSS 140 automatically accepts the call from the caller phone 110, prompts the caller to leave a message, and generates and sends a call screening message to call destination computer systems 170 in the same manner as described previously. In yet another implementation, the call notification message is displayed visually by the call destination computer system 170 as, for example, a pop-up window. When the subsequent call screening message is received, the call destination computer system 170 updates selected portions of the pop-up window (e.g., the options presented in the pop-up window) to correspond to information related to the call screening message. In yet another implementation, the pop-up window corresponding to the call notification message is closed automatically after selection of an option by the user and a new pop-up window corresponding to the call screening message is presented to the user upon the call destination computer system 170 receiving the call screening message.

In another implementation, the call screening and call notification messages include the calling party online identity and/or all or a subset of the call destination online identities that are online. The call screening user interface and the call notification user interface may enable the user to perceive the calling party online identity and/or all or a subset of the call destination online identities that are online. The call screening user interface and call notification user interface also may display the option selections associated with each online identity as it is received by the ICCS 140 (i.e., the ICSS 140 sends an update message after receiving an option selection that updates the user interfaces to display the received option selection and corresponding online identity).

In another implementation, multiple online identities or e-mail addresses are associated with a particular calling party. The call recipients may specify one or more of the multiple calling party online identities/e-mail addresses that will receive the e-mail or IM response to the call. In this way, the call recipient may establish multiple IM sessions, one with each calling party online identity. Alternatively, a chat room may be launched in response to selection by a call recipient of the option to respond by IM to multiple calling party online identities. The other call recipients may be informed that the chat room exists and optionally may be informed of the participants in the chat. The other call recipients may then be provided with an option to join the chat in progress.

The calling party may set identity-level preferences that limit the options presented to call recipients. For example, the calling party may not want to receive IMs or e-mails from specific call recipients or from any call recipient. The calling party also may limit the types of call treatment options that may be selected by call recipients. For example, the calling party may not want specific call recipients or all call recipients to be allowed to redirect the call. The ICSS 140 modifies the options available to call recipients in accordance with the calling party's identity-level preferences.

In another implementation, the calling party is informed by the ICSS 140 of the users/call destination online identities that are online (i.e., available to receive electronic communications), and the calling party may select which, if any, of the online identities will receive a call notification and/or a call screening message. For example, Claire calls the Smith family's home phone number with the intention of speaking with the daughters of the household: Janet Smith, Sarah Smith, or Sue Smith. Claire is informed that the online identities of Janet, Sarah, Tom, and Dave are currently online and is asked by the ICSS 140 which identities should receive a call notification message and/or a call screening message. Claire indicates that she wants the children Janet, Sarah, and Tom to be informed of the call by receiving a call notification message but only wants Janet and Sarah to receive a call screening message since the message Claire intends to leave is really directed to Janet and Sarah.

In another implementation, the predetermined amount of time that the ICSS 140 may wait to receive option selections in response to call notification/call screening messages and the conflict resolution algorithm used to identify the controlling option selection from among multiple received option selections may vary based on the type of option selections received (e.g., whether the option selection ignores the call or is responsive to the call by taking the call or redirecting the call) and/or whether any option selections have been received. For example, if one or more option selections have been received during the first 10 seconds that the ICSS 140 waits, the ICSS 140 applies a rank-based conflict resolution algorithm to determine which of the received conflicting option selections disposes of the call. If, however, no option selections are received after 10 seconds, the ICSS 140 may wait up to another 10 seconds and may act upon the first option selection received to dispose of the call (i.e., for the next 10 seconds the ICSS 140 uses a first-come first-serve conflict resolution protocol). Finally, if no option selections are received after 20 seconds have passed, the ICSS 140 may dispose of the call in accordance with a default option selection as discussed previously.

In another implementation, the identity-level and/or account-level call handling preferences include preferences that control whether or not call screening messages are sent to call destination identities based on the type of options selected by the call destination identities in response to call notification messages. If a call screening message is generated and sent to a call destination identity in response to an incoming call, the account-level call handling preferences may indicate that some or all of the call destination identities that are online and associated with the account also receive call screening messages, irrespective of their option selections in response to call notification messages. For example, a call destination identity that chose the option to ignore a call in response to a call notification message nevertheless still receives a call screening message if another call destination identity chose to take the call in response to a call notification message and the option to take the call was chosen by the conflict resolution algorithm.

In another implementation, upon a call being disconnected or redirected, the options presented by the call notification user interface 900 and/or the call screening user interface 1000 that correspond to call treatment options may be removed (e.g., the options to take or redirect the call may be removed). The options to send an instant message or an e-mail to the caller may persist even after disposition of the call.

Accordingly, other features are within the scope of the following claims.

What is claimed is:

1. A computer-implemented method for responding to a telephone call made by a calling party, the method comprising:

receiving a first telephone call;

electronically identifying an account associated with a telephone number to which the first calling party directed the first telephone call;

electronically accessing configuration data related to the account;

electronically identifying a group of identities associated with the account based on the configuration data accessed, the group of identities including a first identity identifying a first user and a second identity identifying a second and different user;

electronically determining that the first identity is available to receive electronic communications;

in response to determining that the first identity is available, electronically sending a first electronic communication to a computer of the first identity, the first electronic communication causing the computer of the first identity to present to the first user a first set of options selectable by the first user to respond to the first telephone call, the first set of options including an option selectable to respond to the first telephone call by redirecting the first telephone call to a call redirection telephone number that is dynamically and manually inputted by the first user subsequent to receipt of the first telephone call;

electronically receiving a selection of an option from the first user to respond to the first telephone call, the option selection received from the first user being a selection by the first user of an option from among the first set of options;

electronically determining that the second identity is available to receive electronic communications;

in response to determining that the second identity is available, electronically sending a second electronic communication to a computer of the second identity, the second electronic communication causing the computer of the second identity to present to the second user a second set of options selectable by the second user to respond to the first telephone call;

electronically receiving a selection of an option from the second user to respond to the first telephone call, the option selection received from the second user being a selection of an option by the second user from among the second set of options and being a selection of an option that is a different option than the option selected by the first user;

electronically determining to respond to the first telephone call in accordance with the option selection received from the first user and not in accordance with the option selection received from the second user; and electronically responding to the first telephone call in accordance with the option selection received from the first user and not in accordance with the option selection received from the second user.

2. The method of claim 1, wherein the call redirection telephone number is not stored by the computer prior to receiving the first telephone call.

3. The method of claim 1, wherein the call redirection telephone number is typed in by the first called party through a user interface of the computer.

4. The method of claim 1, wherein the calling redirection telephone number is not the telephone number to which the first calling party directed the incoming first telephone call.

5. The method of claim 1, wherein identifying an account comprises identifying an account based on call related information received from a telephone network.

6. The method of claim 5, wherein the call related information includes a call destination telephone number and is extracted from an integrated services digital network call setup.

7. The method of claim 1, wherein the first identity comprises a user identifier that can be used to determine the online status of the first user and the second identity comprises a user identifier that can be used to determine the online status of the second user.

8. The method of claim 7:
wherein the first identity comprises a screen name registered for use in conjunction with an instant messaging application,
wherein the second identity comprises a screen name registered for use in conjunction with the instant messaging application,
wherein electronically determining that the first identity is available to receive electronic communications comprises receiving online status information that indicates that the first identity is presently logged into the instant messaging application, and
wherein electronically determining that the second identity is available to receive electronic communications comprises receiving online status information that indicates that the second identity is presently logged into the instant messaging application.

9. The method of claim 1, further comprising the computer of the first identity enabling the first user to perceive a first display corresponding to the first electronic communication, the first display displaying the first set of options,
further comprising the computer of the second identity enabling the second user to perceive a second display corresponding to the second electronic communication, the second display displaying the second set of options.

10. The method of claim 9, wherein the first display includes calendar or address book information associated with the first calling party.

11. The method of claim 9, wherein the first display includes an e-mail address of the first calling party or a first calling party screen name registered for use in conjunction with an instant messaging application.

12. The method of claim 9, wherein the first display includes a graphical representation of the first calling party.

13. The method of claim 9, further comprising receiving call origin information from a telephone network, wherein the call origin information includes a first calling party telephone number and is received through an automatic number identification service and wherein the first display includes at least a portion of the call origin information.

14. The method of claim 9,
wherein the computer of the first identity enabling the first user to perceive the first display includes the computer of the first identity enabling the first user to perceive the first display while concurrently enabling the first user to listen to a voice mail being deposited by the first calling party, and
wherein the computer of the second identity enabling the second user to perceive the second display includes the computer of the second identity enabling the second user to perceive the second display while concurrently enabling the second user to listen to the voice mail being deposited by the first calling party.

15. The method of claim 1, wherein the first set of options is tailored to the first identity and the second set of options is tailored to the second identity such that the first set of options includes at least one option that is not included in the second set of options.

16. The method of claim 1, wherein the first set of options includes sending an outbound audio message to be perceived by the first calling party.

17. The method of claim 1, wherein the first set of options includes sending the first telephone call to a predetermined call destination.

18. The method of claim 17, wherein the predetermined call destination is the telephone number to which the first calling party directed the incoming first telephone call.

19. The method of claim 1, wherein the first set of options includes responding to the first telephone call by sending an instant message to the first calling party.

20. The method of claim 1, wherein the first set of options includes responding to the first telephone call by sending an e-mail to the first calling party.

21. The method of claim 1, wherein electronically receiving a selection of an option from the first user comprises electronically receiving a selection of an option to redirect the first telephone call to the call redirection telephone number.

22. The method of claim 21, wherein electronically responding to the first telephone call comprises redirecting the first telephone call to the call redirection telephone number.

23. The method of claim 22, wherein electronically responding to the first telephone call in accordance with the option selection received from the first user and not in accordance-with the option selection received from the second user includes sending an outbound audio message to be perceived by the first calling party prior to redirecting the first telephone call to the call redirection telephone number.

24. The method of claim 21,
wherein electronically receiving a selection of an option from the second user comprises electronically receiving a selection of an option indicating that the second user wishes to answer the first telephone call at the telephone number to which the calling party directed the first telephone call; and
wherein electronically responding to the first telephone call in accordance with the option selection received from the first user and not in accordance with the option selection received from the second user comprises redirecting the first telephone call to the call redirection telephone number and not enabling the second user to answer the first telephone call at the telephone number to which the calling party directed the first telephone call.

25. The method of claim 1, wherein electronically determining to respond to the first telephone call in accordance with the option selection received from the first user and not in accordance with the option selection received from the second user comprises:
electronically detecting that the option selection received from the first user was received before receipt of the option selection received from the second user; and
electronically determining to respond to the first telephone call in accordance with the option selection received from the first user and not in accordance with the option selection received from the second user in response to detecting that the option selection received from the first user was received before receipt of the option selection received from the second user.

26. The method of claim 1, wherein electronically determining to respond to the first telephone call in accordance with the option selection received from the first user and not in accordance with the option selection received from the second user comprises:
electronically accessing a rank for the option selection received from the first user;
electronically accessing a rank for the option selection received from the second user;
electronically determining that the rank for the option selection received from the first user is higher than the rank for the option selection received from the second user; and
electronically determining to respond to the first telephone call in accordance with the option selection received from the first user and not in accordance with the option selection received from the second user in response to determining that the rank for the option selection received from the first user is higher than the rank for the option selection received from the second user.

27. The method of claim 1, wherein electronically determining to respond to the first telephone call in accordance with the option selection received from the first user and not in accordance with the option selection received from the second user comprises:
electronically accessing a rank for the first identity;
electronically accessing a rank for the second identity;
electronically determining that the rank for the first identity is higher than the rank for the second identity; and
electronically determining to respond to the first telephone call in accordance with the option selection received from the first user and not in accordance with the option selection received from the second user in response to determining that the rank for the first identity is higher than the rank for the second identity.

28. The method of claim 1,
wherein electronically receiving a selection of an option from the first user comprises electronically receiving a selection of an option to redirect the first telephone call to the call redirection telephone number;
wherein electronically receiving a selection of an option from the second user comprises electronically receiving a selection of an option to redirect the first telephone call to a second call redirection number that is different from the first call redirection number; and
wherein electronically responding to the first telephone call in accordance with the option selection received from the first user and not in accordance with the option selection received from the second user comprises redirecting the first telephone call to the call redirection telephone number and not redirecting the telephone number to the second call redirection number.

29. The method of claim 1, wherein electronically identifying a group of identities associated with the account based on the configuration data accessed comprises electronically identifying a group that includes the first identity, the second identity, and a third identity that identifies a third user, the third user being different from the first user and the second user.

30. The method of claim 29, further comprising:
determining an identity of the calling party;
accessing user preferences for the first user, the second user, and the third user;
determining, based on the user preferences for the first user and the identity of the calling party, that the first user wants to receive a notification of the first telephone call;
determining, based on the user preferences for the second user and the identity of the calling party, that the second user wants to receive a notification of the first telephone call; and
determining, based on the user preferences for the third user and the identity of the calling party, that the third user does not want to receive a notification of the first telephone call.

31. The method of claim 30,
wherein electronically sending the first electronic communication comprises electronically sending the first electronic communication in response to determining that the first user wants to receive a notification of the first telephone call;
wherein electronically sending the second electronic communication comprises electronically sending the second electronic communication in response to determining that the second user wants to receive a notification of the first telephone call; and
further comprising not electronically sending a third electronic communication to notify the third user of the first telephone call in response to determining that the third user does not want to receive a notification of the first telephone call.

32. A computer system for screening a telephone call made by a calling party, the computer system comprising:
a data store for storing configuration data;
a telephony interface element configured to receive a telephone call; and
a call processing element configured to:
identify an account associated with a telephone number to which the first calling party directed the first telephone call;
access configuration data related to the account from the data store;
identify a group of identities associated with the account based on the configuration data accessed, the group of identities including a first identity identifying a first user and a second identity identifying a second and different user;
determine that the first identity is available to receive electronic communications;
in response to determining that the first identity is available, send a first electronic communication to a computer of the first identity, the first electronic communication causing the computer of the first identity to present to the first user a first set of options selectable by the first user to respond to the first telephone call, the first set of options including an option selectable to respond to the first telephone call by redirecting the first telephone call to a call redirection telephone number that is dynamically and manually inputted by the first user subsequent to receipt of the first telephone call;
receive a selection of an option from the first user to respond to the first telephone call, the option selection received from the first user being a selection by the first user of an option from among the first set of options;
determine that the second identity is available to receive electronic communications;
in response to determining that the second identity is available, send a second electronic communication to a computer of the second identity, the second electronic communication causing the computer of the second identity to present to the second user a second set of options selectable by the second user to respond to the first telephone call;
receive a selection of an option from the second user to respond to the first telephone call, the option selection received from the second user being a selection of an option by the second user from among the second set of options and being a selection of an option that is a different option than the option selected by the first user;
determine to respond to the first telephone call in accordance with the option selection received from the first user and not in accordance with the option selection received from the second user; and
respond to the first telephone call in accordance with the option selection received from the first user and not in accordance with the option selection received from the second user.

33. An apparatus for responding to a telephone call made by a calling party, the apparatus comprising:
means for receiving a first telephone call;

means for identifying an account associated with a telephone number to which the first calling party directed the first telephone call;

means for accessing configuration data related to the account;

means for identifying a group of identities associated with the account based on the configuration data accessed, the group of identities including a first identity identifying a first user and a second identity identifying a second and different user;

means for determining that the first identity is available to receive electronic communications;

means for, in response to determining that the first identity is available, sending a first electronic communication to a computer of the first identity, the first electronic communication causing the computer of the first identity to present to the first user a first set of options selectable by the first user to respond to the first telephone call, the first set of options including an option selectable to respond to the first telephone call by redirecting the first telephone call to a call redirection telephone number that is dynamically and manually inputted by the first user subsequent to receipt of the first telephone call;

means for receiving a selection of an option from the first user to respond to the first telephone call, the option selection received from the first user being a selection by the first user of an option from among the first set of options;

means for determining that the second identity is available to receive electronic communications;

means for, in response to determining that the second identity is available, sending a second electronic communication to a computer of the second identity, the second electronic communication causing the computer of the second identity to present to the second user a second set of options selectable by the second user to respond to the first telephone call;

means for receiving a selection of an option from the second user to respond to the first telephone call, the option selection received from the second user being a selection of an option by the second user from among the second set of options and being a selection of an option that is a different option than the option selected by the first user;

means for determining to respond to the first telephone call in accordance with the option selection received from the first user and not in accordance with the option selection received from the second user; and means for responding to the first telephone call in accordance with the option selection received from the first user and not in accordance with the option selection received from the second user.

34. A computer-implemented method for responding to a telephone call made by a calling party, the method comprising:

receiving a telephone call made by a calling party;

electronically identifying an account associated with a telephone number to which the calling party directed the incoming telephone call;

electronically accessing configuration data related to the account;

electronically identifying a first call destination identity associated with the account based on the configuration data accessed;

electronically identifying a calling party identity associated with the calling party;

electronically determining the availability of the first call destination identity to receive a first electronic communication associated with the call;

electronically sending the first electronic communication associated with the call to a computer of a first called party associated with the first call destination identity conditioned on whether the first call destination identity is determined to be available to receive the first electronic communication;

electronically determining the present availability of the calling party identity to receive an instant message from the first called party;

electronically determining a set of options to be presented to the first called party for responding to the telephone call, the set of options being determined to include, conditioned on the calling party identity being determined to be presently available to receive an instant message, an option selectable by the first called party to send an instant message to the calling party identity; and electronically enabling the computer of the first called party to display the set of options to the first called party for responding to the telephone call.

35. The method of claim 34, wherein identifying a calling party identity associated with the calling party comprises enabling the calling party to specify the calling party identity.

36. The method of claim 34, wherein identifying a calling party identity associated with the calling party comprises enabling the first called party to specify the calling party identity.

37. The method of claim 34, wherein identifying the first call destination identity associated with the account comprises:

identifying several call destination identities associated with the account based on the configuration data accessed; and determining the first call destination identity from among the several identities based on the configuration data accessed.

38. The method of claim 37, wherein the set of options is tailored to the first call destination identity such that the options differ for at least two of the several identities associated with the account.

39. The method of claim 34, wherein identifying an account comprises identifying an account based on call related information received from a telephone network.

40. The method of claim 39, wherein the call related information includes a call destination telephone number that is extracted from an integrated services digital network call setup.

41. The method of claim 34, wherein the first call destination identity comprises a user identifier through which an online status of the first called party may be determined.

42. The method of claim 41, wherein the first call destination identity comprises a screen name registered for use in conjunction with an instant messaging application.

43. The method of claim 34, wherein enabling the computer of the first called party to display the set of options comprises enabling the computer of the first called party to present a display corresponding to the first electronic communication that includes the set of options and additional information associated with the calling party.

44. The method of claim 43, wherein the display includes calendar or address book information associated with the calling party.

45. The method of claim 43, wherein the display includes an e-mail address of the calling party or a calling party screen name registered for use in conjunction with an instant messaging application.

46. The method of claim 43, wherein the display includes a graphical representation of the calling party.

47. The method of claim 43, further comprising receiving call origin information from a telephone network, wherein the call origin information includes a calling party telephone number and is received through an automatic number identification service and wherein the display includes at least a portion of the call origin information.

48. The method of claim 34, wherein the set of options includes sending an outbound audio message to be perceived by the calling party.

49. The method of claim 34, wherein the set of options includes sending the telephone call to a predetermined call destination.

50. The method of claim 49, wherein the predetermined call destination is the telephone number to which the calling party directed the incoming telephone call.

51. The method of claim 34, wherein the set of options includes redirecting the telephone call to a telephone number dynamically and manually inputted by the first called party.

52. The method of claim 51, wherein the set of options includes redirecting the telephone call to a telephone number typed into the computer of the first called party by the first called party in response to the first electronic communication.

53. The method of claim 34, wherein the set of options includes responding to the telephone call by sending an e-mail to the calling party.

54. The method of claim 34, further comprising receiving an option selection from the computer of the first called party.

55. The method of claim 54, further comprising handling the telephone call in accordance with the received option selection.

56. The method of claim 55, wherein handling the telephone call includes sending an outbound audio message to be perceived by the calling party prior to or concurrent to sending the instant message to the calling party.

57. The method of claim 34, wherein enabling the computer of the first called party to display the set of options to the first called party for responding to the telephone call comprises enabling the computer of the first called party to display the set of options to the first called party while concurrently enabling the first called party to listen to a voice mail being deposited by the calling party.

58. The method of claim 34, wherein:
electronically determining the present availability of the calling party identity to receive an instant message from the first called party comprises electronically determining that the calling party identity is not presently available to receive an instant message from the first called party; and
electronically determining the set of options comprises electronically determining the set of options to not include the option selectable by the first called party to send an instant message to the calling party identity in response to determining that the calling party identity is not presently available to receive an instant message from the first called party.

59. The method of claim 34, wherein:
electronically determining the present availability of the calling party identity to receive an instant message from the first called party comprises electronically determining that the calling party identity is presently available to receive an instant message from the first called party; and
electronically determining the set of options comprises electronically determining the set of options to include the option selectable by the first called party to send an instant message to the calling party identity in response to determining that the calling party identity is presently available to receive an instant message from the first called party.

60. The method of claim 59, further comprising enabling the called party to select, from among the displayed set of options, the option to send an instant message to the calling party identity.

61. The method of claim 60, further comprising:
receiving, from the called party, a selection of the option to send an instant message to the calling party identity,
establishing an instant messaging session between the calling party identity and the first call destination identity, and
enabling an instant message to be sent by the first call destination identity to the calling party identity.

62. The method of claim 61, wherein establishing an instant messaging session includes establishing a direct connection between a computer of the calling party and the computer of the first called party.

63. The method of claim 61, further comprising disconnecting the telephone call subsequent to establishing the instant messaging session.

64. The method of claim 63, further comprising sending an audio message to the calling party prior to disconnecting the telephone call.

65. The method of claim 34, wherein determining a set of options to be presented to the first called party for responding to the telephone call comprises selecting a set of options that includes an option selectable by the first called party to send an instant message to the calling party identity only if the calling party identity has been determined to be presently available to receive an instant message from the first called party.

66. A computer system for screening a telephone call made by a calling party, the computer system comprising:
a data store for storing configuration data;
a telephony interface element configured to receive a telephone call made by a calling party; and
a call processing element configured to:
identify an account associated with a telephone number to which the calling party directed the incoming telephone call;
access configuration data related to the account from the data store;
identify a first call destination identity associated with the account based on the configuration data accessed;
identify a calling party identity associated with the calling party;
determine the availability of the first call destination identity to receive a first electronic communication associated with the call;
send the first electronic communication associated with the call to a computer of a first called party associated with the first call destination identity conditioned on whether the first call destination identity is determined to be available to receive the first electronic communication;
determine the present availability of the calling party identity to receive an instant message from the first called party; and determine a set of options to be presented to the first called party for responding to the telephone call, the set of options being determined to include, conditioned on the calling party identity being determined to be presently available to receive an instant message, an option selectable by the first called party to send an instant message to the calling party identity; and enable the computer of the first called party to display the set of options to the first called party for responding to the telephone call.

67. An apparatus for responding to a telephone call made by a calling party, the apparatus comprising:

means for receiving a telephone call made by a calling party;

means for identifying an account associated with a telephone number to which the calling party directed the incoming telephone call;

means for accessing configuration data related to the account;

means for identifying a first call destination identity associated with the account based on the configuration data accessed;

means for identifying a calling party identity associated with the calling party;

means for determining the availability of the first call destination identity to receive a first electronic communication associated with the call;

means for sending the first electronic communication associated with the call to a computer of a first called party associated with the first call destination identity conditioned on whether the first call destination identity is determined to be available to receive the first electronic communication;

means for determining the present availability of the calling party identity to receive an instant message from the first called party;

means for determining a set of options to be presented to the first called party for responding to the telephone call, the set of options being determined to include, conditioned on the calling party identity being determined to be presently available to receive an instant message, an option selectable by the first called party to send an instant message to the calling party identity; and means for enabling the computer of the first called party to display the set of options to the first called party for responding to the telephone call.

\* \* \* \* \*